US009285802B2

(12) United States Patent
Arensmeier

(10) Patent No.: US 9,285,802 B2
(45) Date of Patent: Mar. 15, 2016

(54) RESIDENTIAL SOLUTIONS HVAC MONITORING AND DIAGNOSIS

(75) Inventor: Jeffrey N. Arensmeier, Fenton, MO (US)

(73) Assignee: Emerson Electric Co., St. Louis, MO (US)

( * ) Notice: Subject to any disclaimer, the term of this patent is extended or adjusted under 35 U.S.C. 154(b) by 695 days.

(21) Appl. No.: 13/407,180

(22) Filed: Feb. 28, 2012

(65) Prior Publication Data

US 2012/0221150 A1    Aug. 30, 2012

Related U.S. Application Data

(60) Provisional application No. 61/447,681, filed on Feb. 28, 2011, provisional application No. 61/548,009, filed on Oct. 17, 2011.

(51) Int. Cl.
*G05B 23/02* (2006.01)
*F24F 11/00* (2006.01)

(52) U.S. Cl.
CPC .......... *G05B 23/0221* (2013.01); *F24F 11/006* (2013.01); *G05B 23/0224* (2013.01); *F24F 2011/0052* (2013.01); *F24F 2011/0071* (2013.01)

(58) Field of Classification Search
CPC .................................................. G05B 23/0221
USPC .................................... 700/91, 276, 277, 278
See application file for complete search history.

(56) References Cited

U.S. PATENT DOCUMENTS

| 2,054,542 A | 9/1936 | Hoelle |
| 2,296,822 A | 9/1942 | Wolfert |
| 2,631,050 A | 3/1953 | Haeberlein |
| 2,804,839 A | 9/1957 | Hallinan |
| 2,962,702 A | 11/1960 | Derr et al. |

(Continued)

FOREIGN PATENT DOCUMENTS

| CA | 1147440 A1 | 5/1983 |
| CA | 2528778 A1 | 12/2004 |

(Continued)

OTHER PUBLICATIONS

Honeywell, Excel 5000® System, Excel Building Supervisor—Integrated, 74-2034, Copyright © 1994, Rev. 11-94, 12 pages.

(Continued)

*Primary Examiner* — Mohammad Ali
*Assistant Examiner* — Ziaul Karim
(74) *Attorney, Agent, or Firm* — Harness, Dickey & Pierce, P.L.C.

(57) ABSTRACT

A monitoring system for a heating, ventilation, and air conditioning (HVAC) system of a residence includes a monitoring device installed at the residence and a server located remotely from the residence. The monitoring device measures an aggregate current supplied to a plurality of components of the HVAC system and transmits current data based on the measured aggregate current. The server receives the transmitted current data and, based on the received current, assesses whether a failure has occurred in a first component of the plurality of components of the HVAC system and assesses whether a failure has occurred in a second component of the plurality of components of the HVAC system.

19 Claims, 33 Drawing Sheets

(56) References Cited

U.S. PATENT DOCUMENTS

| | | |
|---|---|---|
| 2,978,879 A | 4/1961 | Heidorn |
| 3,027,865 A | 4/1962 | Kautz et al. |
| 3,047,696 A | 7/1962 | Heidorn |
| 3,082,951 A | 3/1963 | Kayan |
| 3,107,843 A | 10/1963 | Finn |
| 3,170,304 A | 2/1965 | Hale |
| 3,232,519 A | 2/1966 | Long |
| 3,278,111 A | 10/1966 | Parker |
| 3,327,197 A | 6/1967 | Marquis |
| 3,339,164 A | 8/1967 | Landis et al. |
| 3,400,374 A | 9/1968 | Schumann |
| 3,513,662 A | 5/1970 | Golber |
| 3,581,281 A | 5/1971 | Martin et al. |
| 3,585,451 A | 6/1971 | Day, III |
| 3,653,783 A | 4/1972 | Sauder |
| 3,660,718 A | 5/1972 | Pinckaers |
| 3,665,339 A | 5/1972 | Liu |
| 3,665,399 A | 5/1972 | Zehr et al. |
| 3,697,953 A | 10/1972 | Schoenwitz |
| 3,707,851 A | 1/1973 | McAshan, Jr. |
| 3,729,949 A | 5/1973 | Talbot |
| 3,735,377 A | 5/1973 | Kaufman |
| 3,742,302 A | 6/1973 | Neill |
| 3,742,303 A | 6/1973 | Dageford |
| 3,767,328 A | 10/1973 | Ladusaw |
| 3,777,240 A | 12/1973 | Neill |
| 3,783,681 A | 1/1974 | Hirt et al. |
| 3,820,074 A | 6/1974 | Toman |
| 3,882,305 A | 5/1975 | Johnstone |
| 3,924,972 A | 12/1975 | Szymaszek |
| 3,927,712 A | 12/1975 | Nakayama |
| 3,935,519 A | 1/1976 | Pfarrer et al. |
| 3,950,962 A | 4/1976 | Odashima |
| 3,960,011 A | 6/1976 | Renz et al. |
| 3,978,382 A | 8/1976 | Pfarrer et al. |
| 3,998,068 A | 12/1976 | Chirnside |
| 4,006,460 A | 2/1977 | Hewitt et al. |
| 4,014,182 A | 3/1977 | Granryd |
| 4,018,584 A | 4/1977 | Mullen |
| 4,019,172 A | 4/1977 | Srodes |
| 4,024,725 A | 5/1977 | Uchida et al. |
| 4,027,289 A | 5/1977 | Toman |
| 4,034,570 A | 7/1977 | Anderson et al. |
| 4,038,061 A | 7/1977 | Anderson et al. |
| 4,045,973 A | 9/1977 | Anderson et al. |
| 4,046,532 A | 9/1977 | Nelson |
| RE29,450 E | 10/1977 | Goldsby et al. |
| 4,060,716 A | 11/1977 | Pekrul et al. |
| 4,066,869 A | 1/1978 | Apaloo et al. |
| 4,090,248 A | 5/1978 | Swanson et al. |
| 4,102,150 A | 7/1978 | Kountz |
| 4,102,394 A | 7/1978 | Botts |
| 4,104,888 A | 8/1978 | Reedy et al. |
| 4,105,063 A | 8/1978 | Bergt |
| 4,112,703 A | 9/1978 | Kountz |
| 4,132,086 A | 1/1979 | Kountz |
| 4,136,730 A | 1/1979 | Kinsey |
| 4,137,057 A | 1/1979 | Piet et al. |
| 4,137,725 A | 2/1979 | Martin |
| 4,142,375 A | 3/1979 | Abe et al. |
| 4,143,707 A | 3/1979 | Lewis et al. |
| 4,146,085 A | 3/1979 | Wills |
| RE29,966 E | 4/1979 | Nussbaum |
| 4,151,725 A | 5/1979 | Kountz et al. |
| 4,153,003 A | 5/1979 | Willis |
| 4,156,350 A | 5/1979 | Elliott et al. |
| 4,161,106 A | 7/1979 | Savage et al. |
| 4,165,619 A | 8/1979 | Girard |
| 4,171,622 A | 10/1979 | Yamaguchi et al. |
| 4,173,871 A | 11/1979 | Brooks |
| RE30,242 E | 4/1980 | del Toro et al. |
| 4,197,717 A | 4/1980 | Schumacher |
| 4,205,381 A | 5/1980 | Games et al. |
| 4,209,994 A | 7/1980 | Mueller et al. |
| 4,211,089 A | 7/1980 | Mueller et al. |
| 4,217,761 A | 8/1980 | Cornaire et al. |
| 4,220,010 A | 9/1980 | Mueller et al. |
| 4,227,862 A | 10/1980 | Andrew et al. |
| 4,232,530 A | 11/1980 | Mueller |
| 4,233,818 A | 11/1980 | Lastinger |
| 4,236,379 A | 12/1980 | Mueller |
| 4,244,182 A | 1/1981 | Behr |
| 4,246,763 A | 1/1981 | Mueller et al. |
| 4,248,051 A | 2/1981 | Darcy et al. |
| 4,251,988 A | 2/1981 | Allard et al. |
| 4,257,795 A | 3/1981 | Shaw |
| 4,259,847 A | 4/1981 | Pearse, Jr. |
| 4,267,702 A | 5/1981 | Houk |
| 4,270,174 A | 5/1981 | Karlin et al. |
| 4,271,898 A | 6/1981 | Freeman |
| 4,281,358 A | 7/1981 | Plouffe et al. |
| 4,284,849 A | 8/1981 | Anderson et al. |
| 4,286,438 A | 9/1981 | Clarke |
| 4,290,480 A | 9/1981 | Sulkowski |
| 4,296,727 A | 10/1981 | Bryan |
| 4,301,660 A | 11/1981 | Mueller et al. |
| 4,306,293 A | 12/1981 | Marathe |
| 4,307,775 A | 12/1981 | Saunders et al. |
| 4,308,725 A | 1/1982 | Chiyoda |
| 4,311,188 A | 1/1982 | Kojima et al. |
| 4,319,461 A | 3/1982 | Shaw |
| 4,321,529 A | 3/1982 | Simmonds et al. |
| 4,325,223 A | 4/1982 | Cantley |
| 4,328,678 A | 5/1982 | Kono et al. |
| 4,328,680 A | 5/1982 | Stamp, Jr. et al. |
| 4,333,316 A | 6/1982 | Stamp, Jr. et al. |
| 4,333,317 A | 6/1982 | Sawyer |
| 4,336,001 A | 6/1982 | Andrew et al. |
| 4,338,790 A | 7/1982 | Saunders et al. |
| 4,338,791 A | 7/1982 | Stamp, Jr. et al. |
| 4,345,162 A | 8/1982 | Hammer et al. |
| 4,346,755 A | 8/1982 | Alley et al. |
| 4,350,021 A | 9/1982 | Lundstrom |
| 4,350,023 A | 9/1982 | Kuwabara et al. |
| 4,351,163 A | 9/1982 | Johannsen |
| 4,356,703 A | 11/1982 | Vogel |
| 4,361,273 A | 11/1982 | Levine et al. |
| 4,365,983 A | 12/1982 | Abraham et al. |
| 4,370,098 A | 1/1983 | McClain et al. |
| 4,372,119 A | 2/1983 | Gillbrand et al. |
| 4,376,926 A | 3/1983 | Senor |
| 4,381,549 A | 4/1983 | Stamp, Jr. et al. |
| 4,382,367 A | 5/1983 | Roberts |
| 4,384,462 A | 5/1983 | Overman et al. |
| 4,387,368 A | 6/1983 | Day, III et al. |
| 4,387,578 A | 6/1983 | Paddock |
| 4,390,058 A | 6/1983 | Otake et al. |
| 4,390,321 A | 6/1983 | Langlois et al. |
| 4,390,922 A | 6/1983 | Pelliccia |
| 4,395,886 A | 8/1983 | Mayer |
| 4,395,887 A | 8/1983 | Sweetman |
| 4,399,548 A | 8/1983 | Castleberry |
| 4,402,054 A | 8/1983 | Osborne et al. |
| 4,406,133 A | 9/1983 | Saunders et al. |
| 4,407,138 A | 10/1983 | Mueller |
| 4,408,660 A | 10/1983 | Sutoh et al. |
| 4,412,788 A | 11/1983 | Shaw et al. |
| 4,415,896 A | 11/1983 | Allgood |
| 4,418,388 A | 11/1983 | Allgor et al. |
| 4,420,947 A | 12/1983 | Yoshino |
| 4,425,010 A | 1/1984 | Bryant et al. |
| 4,429,578 A | 2/1984 | Darrel et al. |
| 4,432,232 A | 2/1984 | Brantley et al. |
| 4,434,390 A | 2/1984 | Elms |
| 4,441,329 A | 4/1984 | Dawley |
| 4,448,038 A | 5/1984 | Barbier |
| 4,449,375 A | 5/1984 | Briccetti |
| 4,451,929 A | 5/1984 | Yoshida |
| 4,460,123 A | 7/1984 | Beverly |
| 4,463,571 A | 8/1984 | Wiggs |
| 4,463,574 A | 8/1984 | Spethmann et al. |
| 4,463,576 A | 8/1984 | Burnett et al. |
| 4,465,229 A | 8/1984 | Kompelien |
| 4,467,230 A | 8/1984 | Rovinsky |

(56) References Cited

U.S. PATENT DOCUMENTS

| | | |
|---|---|---|
| 4,467,385 A | 8/1984 | Bandoli et al. |
| 4,467,613 A | 8/1984 | Behr et al. |
| 4,470,092 A | 9/1984 | Lombardi |
| 4,470,266 A | 9/1984 | Briccetti et al. |
| 4,474,024 A | 10/1984 | Eplett et al. |
| 4,474,542 A | 10/1984 | Kato et al. |
| 4,479,389 A | 10/1984 | Anderson, III et al. |
| 4,484,452 A | 11/1984 | Houser, Jr. |
| 4,489,551 A | 12/1984 | Watanabe et al. |
| 4,490,986 A | 1/1985 | Paddock |
| 4,494,383 A | 1/1985 | Nagatomo et al. |
| 4,495,779 A | 1/1985 | Tanaka et al. |
| 4,496,296 A | 1/1985 | Arai et al. |
| 4,497,031 A | 1/1985 | Froehling et al. |
| 4,498,310 A | 2/1985 | Imanishi et al. |
| 4,499,739 A | 2/1985 | Matsuoka et al. |
| 4,502,084 A | 2/1985 | Hannett |
| 4,502,833 A | 3/1985 | Hibino et al. |
| 4,502,842 A | 3/1985 | Currier et al. |
| 4,502,843 A | 3/1985 | Martin |
| 4,505,125 A | 3/1985 | Baglione |
| 4,506,518 A | 3/1985 | Yoshikawa et al. |
| 4,507,934 A | 4/1985 | Tanaka et al. |
| 4,510,547 A | 4/1985 | Rudich, Jr. |
| 4,510,576 A | 4/1985 | MacArthur et al. |
| 4,512,161 A | 4/1985 | Logan et al. |
| 4,516,407 A | 5/1985 | Watabe |
| 4,517,468 A | 5/1985 | Kemper et al. |
| 4,520,674 A | 6/1985 | Canada et al. |
| 4,523,435 A | 6/1985 | Lord |
| 4,523,436 A | 6/1985 | Schedel et al. |
| 4,527,247 A | 7/1985 | Kaiser et al. |
| 4,527,399 A | 7/1985 | Lord |
| 4,535,607 A | 8/1985 | Mount |
| 4,538,420 A | 9/1985 | Nelson |
| 4,538,422 A | 9/1985 | Mount et al. |
| 4,539,820 A | 9/1985 | Zinsmeyer |
| 4,540,040 A | 9/1985 | Fukumoto et al. |
| 4,545,210 A | 10/1985 | Lord |
| 4,545,214 A | 10/1985 | Kinoshita |
| 4,548,549 A | 10/1985 | Murphy et al. |
| 4,549,403 A | 10/1985 | Lord et al. |
| 4,549,404 A | 10/1985 | Lord |
| 4,550,770 A | 11/1985 | Nussdorfer et al. |
| 4,553,400 A | 11/1985 | Branz |
| 4,555,057 A | 11/1985 | Foster |
| 4,555,910 A | 12/1985 | Sturges |
| 4,557,317 A | 12/1985 | Harmon, Jr. |
| 4,558,181 A | 12/1985 | Blanchard et al. |
| 4,561,260 A | 12/1985 | Nishi et al. |
| 4,563,624 A | 1/1986 | Yu |
| 4,563,877 A | 1/1986 | Harnish |
| 4,563,878 A | 1/1986 | Baglione |
| 4,567,733 A | 2/1986 | Mecozzi |
| 4,568,909 A | 2/1986 | Whynacht |
| 4,574,871 A | 3/1986 | Parkinson et al. |
| 4,575,318 A | 3/1986 | Blain |
| 4,577,977 A | 3/1986 | Pejsa |
| 4,580,947 A | 4/1986 | Shibata et al. |
| 4,583,373 A | 4/1986 | Shaw |
| 4,589,060 A | 5/1986 | Zinsmeyer |
| 4,593,367 A | 6/1986 | Slack et al. |
| 4,598,764 A | 7/1986 | Beckey |
| 4,602,484 A | 7/1986 | Bendikson |
| 4,603,556 A | 8/1986 | Suefuji et al. |
| 4,604,036 A | 8/1986 | Sutou et al. |
| 4,611,470 A * | 9/1986 | Enstrom .................. 62/127 |
| 4,612,775 A | 9/1986 | Branz et al. |
| 4,614,089 A | 9/1986 | Dorsey |
| 4,617,804 A | 10/1986 | Fukushima et al. |
| 4,620,286 A | 10/1986 | Smith et al. |
| 4,620,424 A | 11/1986 | Tanaka et al. |
| 4,621,502 A | 11/1986 | Ibrahim et al. |
| 4,627,245 A | 12/1986 | Levine |
| 4,627,483 A | 12/1986 | Harshbarger, III et al. |
| 4,627,484 A | 12/1986 | Harshbarger, Jr. et al. |
| 4,630,572 A | 12/1986 | Evans |
| 4,630,670 A | 12/1986 | Wellman et al. |
| 4,642,034 A | 2/1987 | Terauchi |
| 4,642,782 A | 2/1987 | Kemper et al. |
| 4,644,479 A | 2/1987 | Kemper et al. |
| 4,646,532 A | 3/1987 | Nose |
| 4,648,044 A | 3/1987 | Hardy et al. |
| 4,649,515 A | 3/1987 | Thompson et al. |
| 4,649,710 A | 3/1987 | Inoue et al. |
| 4,653,280 A | 3/1987 | Hansen et al. |
| 4,653,285 A | 3/1987 | Pohl |
| 4,655,688 A | 4/1987 | Bohn et al. |
| 4,660,386 A | 4/1987 | Hansen et al. |
| 4,662,184 A | 5/1987 | Pohl et al. |
| 4,674,292 A | 6/1987 | Ohya et al. |
| 4,677,830 A | 7/1987 | Sumikawa et al. |
| 4,680,940 A | 7/1987 | Vaughn |
| 4,682,473 A | 7/1987 | Rogers, III |
| 4,684,060 A | 8/1987 | Adams et al. |
| 4,685,615 A | 8/1987 | Hart |
| 4,686,835 A | 8/1987 | Alsenz |
| 4,689,967 A | 9/1987 | Han et al. |
| 4,697,431 A | 10/1987 | Alsenz |
| 4,698,978 A | 10/1987 | Jones |
| 4,698,981 A | 10/1987 | Kaneko et al. |
| 4,701,824 A | 10/1987 | Beggs et al. |
| 4,703,325 A | 10/1987 | Chamberlin et al. |
| 4,706,152 A | 11/1987 | DeFilippis et al. |
| 4,706,469 A | 11/1987 | Oguni et al. |
| 4,712,648 A | 12/1987 | Mattes et al. |
| 4,713,717 A | 12/1987 | Pejouhy et al. |
| 4,715,190 A | 12/1987 | Han et al. |
| 4,715,792 A | 12/1987 | Nishizawa et al. |
| 4,716,582 A | 12/1987 | Blanchard et al. |
| 4,716,957 A | 1/1988 | Thompson et al. |
| 4,720,980 A | 1/1988 | Howland |
| 4,722,018 A | 1/1988 | Pohl |
| 4,722,019 A | 1/1988 | Pohl |
| 4,724,678 A | 2/1988 | Pohl |
| 4,735,054 A | 4/1988 | Beckey |
| 4,735,060 A | 4/1988 | Alsenz |
| 4,744,223 A | 5/1988 | Umezu |
| 4,745,765 A | 5/1988 | Pettitt |
| 4,745,766 A | 5/1988 | Bahr |
| 4,745,767 A | 5/1988 | Ohya et al. |
| 4,750,332 A | 6/1988 | Jenski et al. |
| 4,750,672 A | 6/1988 | Beckey et al. |
| 4,751,501 A | 6/1988 | Gut |
| 4,751,825 A | 6/1988 | Voorhis et al. |
| 4,754,410 A | 6/1988 | Leech et al. |
| 4,755,957 A | 7/1988 | White et al. |
| 4,765,150 A | 8/1988 | Persem |
| 4,768,346 A | 9/1988 | Mathur |
| 4,768,348 A | 9/1988 | Noguchi |
| 4,783,752 A | 11/1988 | Kaplan et al. |
| 4,787,213 A | 11/1988 | Gras et al. |
| 4,790,142 A | 12/1988 | Beckey |
| 4,796,142 A | 1/1989 | Libert |
| 4,796,466 A | 1/1989 | Farmer |
| 4,798,055 A | 1/1989 | Murray et al. |
| 4,805,118 A | 2/1989 | Rishel |
| 4,807,445 A | 2/1989 | Matsuoka et al. |
| 4,820,130 A | 4/1989 | Eber et al. |
| 4,829,779 A | 5/1989 | Munson et al. |
| 4,831,560 A | 5/1989 | Zaleski |
| 4,831,832 A | 5/1989 | Alsenz |
| 4,831,833 A | 5/1989 | Duenes et al. |
| 4,835,706 A | 5/1989 | Asahi |
| 4,835,980 A | 6/1989 | Oyanagi et al. |
| 4,838,037 A | 6/1989 | Wood |
| 4,841,734 A | 6/1989 | Torrence |
| 4,843,575 A | 6/1989 | Crane |
| 4,845,956 A | 7/1989 | Berntsen et al. |
| 4,848,099 A | 7/1989 | Beckey et al. |
| 4,848,100 A | 7/1989 | Barthel et al. |
| 4,850,198 A | 7/1989 | Helt et al. |
| 4,850,204 A | 7/1989 | Bos et al. |
| 4,852,363 A | 8/1989 | Kampf et al. |

(56) References Cited

U.S. PATENT DOCUMENTS

| | | | |
|---|---|---|---|
| 4,853,693 | A | 8/1989 | Eaton-Williams |
| 4,856,286 | A | 8/1989 | Sulfstede et al. |
| 4,858,676 | A | 8/1989 | Bolfik et al. |
| 4,866,635 | A | 9/1989 | Kahn et al. |
| 4,866,944 | A | 9/1989 | Yamazaki |
| 4,869,073 | A | 9/1989 | Kawai et al. |
| 4,873,836 | A | 10/1989 | Thompson |
| 4,875,589 | A | 10/1989 | Lacey et al. |
| 4,877,382 | A | 10/1989 | Caillat et al. |
| 4,878,355 | A | 11/1989 | Beckey et al. |
| 4,881,184 | A | 11/1989 | Abegg, III et al. |
| 4,882,747 | A | 11/1989 | Williams |
| 4,882,908 | A | 11/1989 | White |
| 4,884,412 | A | 12/1989 | Sellers et al. |
| 4,885,707 | A | 12/1989 | Nichol et al. |
| 4,885,914 | A | 12/1989 | Pearman |
| 4,887,436 | A | 12/1989 | Enomoto et al. |
| 4,887,857 | A | 12/1989 | VanOmmeren |
| 4,889,280 | A | 12/1989 | Grald et al. |
| 4,893,480 | A | 1/1990 | Matsui et al. |
| 4,899,551 | A | 2/1990 | Weintraub |
| 4,903,500 | A | 2/1990 | Hanson |
| 4,903,759 | A | 2/1990 | Lapeyrouse |
| 4,904,993 | A | 2/1990 | Sato |
| 4,909,041 | A | 3/1990 | Jones |
| 4,909,076 | A | 3/1990 | Busch et al. |
| 4,910,966 | A | 3/1990 | Levine et al. |
| 4,913,625 | A | 4/1990 | Gerlowski |
| 4,916,633 | A | 4/1990 | Tychonievich et al. |
| 4,916,909 | A | 4/1990 | Mathur et al. |
| 4,916,912 | A | 4/1990 | Levine et al. |
| 4,918,690 | A | 4/1990 | Markkula, Jr. et al. |
| 4,918,932 | A | 4/1990 | Gustafson et al. |
| 4,924,404 | A | 5/1990 | Reinke, Jr. |
| 4,924,418 | A | 5/1990 | Bachman et al. |
| 4,928,750 | A | 5/1990 | Nurczyk |
| 4,932,588 | A | 6/1990 | Fedter et al. |
| 4,939,909 | A | 7/1990 | Tsuchiyama et al. |
| 4,943,003 | A | 7/1990 | Shimizu et al. |
| 4,944,160 | A | 7/1990 | Malone et al. |
| 4,945,491 | A | 7/1990 | Rishel |
| 4,948,040 | A | 8/1990 | Kobayashi et al. |
| 4,949,550 | A | 8/1990 | Hanson |
| 4,953,784 | A | 9/1990 | Yasufuku et al. |
| 4,959,970 | A | 10/1990 | Meckler |
| 4,964,060 | A | 10/1990 | Hartsog |
| 4,964,125 | A | 10/1990 | Kim |
| 4,966,006 | A | 10/1990 | Thuesen et al. |
| 4,967,567 | A | 11/1990 | Proctor et al. |
| 4,970,496 | A | 11/1990 | Kirkpatrick |
| 4,974,427 | A | 12/1990 | Diab |
| 4,974,665 | A | 12/1990 | Zillner, Jr. |
| 4,975,024 | A | 12/1990 | Heckel |
| 4,977,751 | A | 12/1990 | Hanson |
| 4,985,857 | A | 1/1991 | Bajpai et al. |
| 4,987,748 | A | 1/1991 | Meckler |
| 4,990,057 | A | 2/1991 | Rollins |
| 4,990,893 | A | 2/1991 | Kiluk |
| 4,991,770 | A | 2/1991 | Bird et al. |
| 5,000,009 | A | 3/1991 | Clanin |
| 5,005,365 | A | 4/1991 | Lynch |
| 5,009,074 | A | 4/1991 | Goubeaux et al. |
| 5,009,075 | A | 4/1991 | Okoren |
| 5,009,076 | A | 4/1991 | Winslow |
| 5,012,629 | A | 5/1991 | Rehman et al. |
| 5,018,357 | A | 5/1991 | Livingstone et al. |
| 5,018,665 | A | 5/1991 | Sulmone |
| RE33,620 | E | 6/1991 | Persem |
| 5,022,234 | A | 6/1991 | Goubeaux et al. |
| 5,039,009 | A | 8/1991 | Baldwin et al. |
| 5,042,264 | A | 8/1991 | Dudley |
| 5,051,720 | A | 9/1991 | Kittirutsunetorn |
| 5,056,036 | A | 10/1991 | Van Bork |
| 5,056,329 | A | 10/1991 | Wilkinson |
| 5,058,388 | A | 10/1991 | Shaw et al. |
| 5,062,278 | A | 11/1991 | Sugiyama |
| 5,065,593 | A | 11/1991 | Dudley et al. |
| 5,067,099 | A | 11/1991 | McCown et al. |
| RE33,775 | E | 12/1991 | Behr et al. |
| 5,070,468 | A | 12/1991 | Niinomi et al. |
| 5,071,065 | A | 12/1991 | Aalto et al. |
| 5,073,091 | A | 12/1991 | Burgess et al. |
| 5,073,862 | A | 12/1991 | Carlson |
| 5,076,067 | A | 12/1991 | Prenger et al. |
| 5,076,494 | A | 12/1991 | Ripka |
| 5,077,983 | A | 1/1992 | Dudley |
| 5,083,438 | A | 1/1992 | McMullin |
| 5,086,385 | A | 2/1992 | Launey et al. |
| 5,088,297 | A | 2/1992 | Maruyama et al. |
| 5,094,086 | A | 3/1992 | Shyu |
| 5,095,712 | A | 3/1992 | Narreau |
| 5,095,715 | A | 3/1992 | Dudley |
| 5,099,654 | A | 3/1992 | Baruschke et al. |
| 5,102,316 | A | 4/1992 | Caillat et al. |
| 5,103,391 | A | 4/1992 | Barrett |
| 5,107,500 | A | 4/1992 | Wakamoto et al. |
| 5,109,222 | A | 4/1992 | Welty |
| 5,109,676 | A | 5/1992 | Waters et al. |
| 5,109,700 | A | 5/1992 | Hicho |
| 5,109,916 | A | 5/1992 | Thompson |
| 5,115,406 | A | 5/1992 | Zatezalo et al. |
| 5,115,643 | A | 5/1992 | Hayata et al. |
| 5,115,644 | A | 5/1992 | Alsenz |
| 5,115,967 | A | 5/1992 | Wedekind |
| 5,118,260 | A | 6/1992 | Fraser, Jr. |
| 5,119,466 | A | 6/1992 | Suzuki |
| 5,119,637 | A | 6/1992 | Bard et al. |
| 5,121,610 | A | 6/1992 | Atkinson et al. |
| 5,123,017 | A | 6/1992 | Simpkins et al. |
| 5,123,252 | A | 6/1992 | Hanson |
| 5,123,253 | A | 6/1992 | Hanson et al. |
| 5,123,255 | A | 6/1992 | Ohizumi |
| 5,125,067 | A | 6/1992 | Erdman |
| RE34,001 | E | 7/1992 | Wrobel |
| 5,127,232 | A | 7/1992 | Paige et al. |
| 5,131,237 | A | 7/1992 | Valbjorn |
| 5,141,407 | A | 8/1992 | Ramsey et al. |
| 5,142,877 | A | 9/1992 | Shimizu |
| 5,150,584 | A | 9/1992 | Tomasov et al. |
| 5,156,539 | A | 10/1992 | Anderson et al. |
| 5,167,494 | A | 12/1992 | Inagaki et al. |
| 5,170,935 | A | 12/1992 | Federspiel et al. |
| 5,170,936 | A | 12/1992 | Kubo et al. |
| 5,181,389 | A | 1/1993 | Hanson et al. |
| 5,186,014 | A | 2/1993 | Runk |
| 5,197,666 | A | 3/1993 | Wedekind |
| 5,199,855 | A | 4/1993 | Nakajima et al. |
| 5,200,872 | A | 4/1993 | D'Entremont et al. |
| 5,200,987 | A | 4/1993 | Gray |
| 5,201,862 | A | 4/1993 | Pettitt |
| 5,203,178 | A | 4/1993 | Shyu |
| 5,203,179 | A | 4/1993 | Powell |
| 5,209,076 | A | 5/1993 | Kauffman et al. |
| 5,209,400 | A | 5/1993 | Winslow et al. |
| 5,219,041 | A | 6/1993 | Greve |
| 5,224,354 | A | 7/1993 | Ito et al. |
| 5,224,835 | A | 7/1993 | Oltman |
| 5,226,472 | A | 7/1993 | Benevelli et al. |
| 5,228,300 | A | 7/1993 | Shim |
| 5,228,304 | A | 7/1993 | Ryan |
| 5,228,307 | A | 7/1993 | Koce |
| 5,230,223 | A | 7/1993 | Hullar et al. |
| 5,231,844 | A | 8/1993 | Park |
| 5,233,841 | A | 8/1993 | Jyrek |
| 5,235,526 | A | 8/1993 | Saffell |
| 5,237,830 | A | 8/1993 | Grant |
| 5,241,664 | A | 8/1993 | Ohba et al. |
| 5,241,833 | A | 9/1993 | Ohkoshi |
| 5,243,827 | A | 9/1993 | Hagita et al. |
| 5,243,829 | A | 9/1993 | Bessler |
| 5,245,833 | A | 9/1993 | Mei et al. |
| 5,248,244 | A | 9/1993 | Ho et al. |
| 5,251,453 | A | 10/1993 | Stanke et al. |
| 5,251,454 | A | 10/1993 | Yoon |

(56) References Cited

U.S. PATENT DOCUMENTS

| | | | |
|---|---|---|---|
| 5,255,977 A | 10/1993 | Eimer et al. | |
| 5,257,506 A | 11/1993 | DeWolf et al. | |
| 5,262,704 A | 11/1993 | Farr | |
| 5,265,434 A | 11/1993 | Alsenz | |
| 5,269,458 A | 12/1993 | Sol | |
| 5,271,556 A | 12/1993 | Helt et al. | |
| 5,274,571 A | 12/1993 | Hesse et al. | |
| 5,276,630 A | 1/1994 | Baldwin et al. | |
| 5,279,458 A | 1/1994 | DeWolf et al. | |
| 5,282,728 A | 2/1994 | Swain | |
| 5,284,026 A | 2/1994 | Powell | |
| 5,289,362 A | 2/1994 | Liebl et al. | |
| 5,290,154 A | 3/1994 | Kotlarek et al. | |
| 5,291,752 A | 3/1994 | Alvarez et al. | |
| 5,299,504 A | 4/1994 | Abele | |
| 5,303,112 A | 4/1994 | Zulaski et al. | |
| 5,303,560 A | 4/1994 | Hanson et al. | |
| 5,311,451 A | 5/1994 | Barrett | |
| 5,311,562 A | 5/1994 | Palusamy et al. | |
| 5,316,448 A | 5/1994 | Ziegler et al. | |
| 5,320,506 A | 6/1994 | Fogt | |
| 5,333,460 A | 8/1994 | Lewis et al. | |
| 5,335,507 A | 8/1994 | Powell | |
| 5,336,058 A | 8/1994 | Yokoyama | |
| 5,347,476 A | 9/1994 | McBean, Sr. | |
| 5,351,037 A | 9/1994 | Martell et al. | |
| 5,362,206 A | 11/1994 | Westerman et al. | |
| 5,362,211 A | 11/1994 | Iizuka et al. | |
| 5,368,446 A | 11/1994 | Rode | |
| 5,369,958 A | 12/1994 | Kasai et al. | |
| 5,381,669 A | 1/1995 | Bahel et al. | |
| 5,381,692 A | 1/1995 | Winslow et al. | |
| 5,388,176 A | 2/1995 | Dykstra et al. | |
| 5,395,042 A | 3/1995 | Riley et al. | |
| 5,410,230 A | 4/1995 | Bessler et al. | |
| 5,414,792 A | 5/1995 | Shorey | |
| 5,415,008 A | 5/1995 | Bessler | |
| 5,416,781 A | 5/1995 | Ruiz | |
| 5,423,190 A | 6/1995 | Friedland | |
| 5,423,192 A | 6/1995 | Young et al. | |
| 5,426,952 A | 6/1995 | Bessler | |
| 5,431,026 A | 7/1995 | Jaster | |
| 5,432,500 A | 7/1995 | Scripps | |
| 5,435,145 A | 7/1995 | Jaster | |
| 5,435,148 A | 7/1995 | Sandofsky et al. | |
| 5,440,890 A | 8/1995 | Bahel et al. | |
| 5,440,891 A | 8/1995 | Hindmon, Jr. et al. | |
| 5,440,895 A | 8/1995 | Bahel et al. | |
| 5,446,677 A | 8/1995 | Jensen et al. | |
| 5,450,359 A | 9/1995 | Sharma et al. | |
| 5,452,291 A | 9/1995 | Eisenhandler et al. | |
| 5,454,229 A | 10/1995 | Hanson et al. | |
| 5,457,965 A | 10/1995 | Blair et al. | |
| 5,460,006 A | 10/1995 | Torimitsu | |
| 5,467,011 A | 11/1995 | Hunt | |
| 5,467,264 A | 11/1995 | Rauch et al. | |
| 5,469,045 A | 11/1995 | Dove et al. | |
| 5,475,986 A | 12/1995 | Bahel et al. | |
| 5,478,212 A | 12/1995 | Sakai et al. | |
| 5,481,481 A | 1/1996 | Frey et al. | |
| 5,481,884 A | 1/1996 | Scoccia | |
| 5,483,141 A | 1/1996 | Uesugi | |
| 5,491,978 A | 2/1996 | Young et al. | |
| 5,495,722 A | 3/1996 | Manson et al. | |
| 5,499,512 A | 3/1996 | Jurewicz et al. | |
| 5,509,786 A | 4/1996 | Mizutani et al. | |
| 5,511,387 A | 4/1996 | Tinsler | |
| 5,512,883 A | 4/1996 | Lane, Jr. | |
| 5,515,267 A | 5/1996 | Alsenz | |
| 5,515,692 A | 5/1996 | Sterber et al. | |
| 5,519,301 A | 5/1996 | Yoshida et al. | |
| 5,528,908 A | 6/1996 | Bahel et al. | |
| 5,532,534 A | 7/1996 | Baker et al. | |
| 5,533,347 A | 7/1996 | Ott et al. | |
| 5,535,136 A | 7/1996 | Standifer | |
| 5,535,597 A | 7/1996 | An | |
| 5,546,015 A | 8/1996 | Okabe | |
| 5,546,073 A | 8/1996 | Duff et al. | |
| 5,546,756 A | 8/1996 | Ali | |
| 5,546,757 A | 8/1996 | Whipple, III | |
| 5,548,966 A | 8/1996 | Tinsler | |
| 5,555,195 A * | 9/1996 | Jensen et al. | 700/276 |
| 5,562,426 A | 10/1996 | Watanabe et al. | |
| 5,563,490 A | 10/1996 | Kawaguchi et al. | |
| 5,564,280 A | 10/1996 | Schilling et al. | |
| 5,566,084 A | 10/1996 | Cmar | |
| 5,570,085 A | 10/1996 | Bertsch | |
| 5,570,258 A | 10/1996 | Manning | |
| 5,572,643 A | 11/1996 | Judson | |
| 5,577,905 A | 11/1996 | Momber et al. | |
| 5,579,648 A | 12/1996 | Hanson et al. | |
| 5,581,229 A | 12/1996 | Hunt | |
| 5,586,445 A | 12/1996 | Bessler | |
| 5,586,446 A | 12/1996 | Torimitsu | |
| 5,590,830 A | 1/1997 | Kettler et al. | |
| 5,592,058 A | 1/1997 | Archer et al. | |
| 5,592,824 A | 1/1997 | Sogabe et al. | |
| 5,596,507 A | 1/1997 | Jones et al. | |
| 5,600,960 A | 2/1997 | Schwedler et al. | |
| 5,602,749 A | 2/1997 | Vosburgh | |
| 5,602,757 A | 2/1997 | Haseley et al. | |
| 5,602,761 A | 2/1997 | Spoerre et al. | |
| 5,610,339 A | 3/1997 | Haseley et al. | |
| 5,611,674 A | 3/1997 | Bass et al. | |
| 5,613,841 A | 3/1997 | Bass et al. | |
| 5,615,071 A | 3/1997 | Higashikata et al. | |
| 5,616,829 A | 4/1997 | Balaschak et al. | |
| 5,623,834 A | 4/1997 | Bahel et al. | |
| 5,628,201 A | 5/1997 | Bahel et al. | |
| 5,630,325 A | 5/1997 | Bahel et al. | |
| 5,635,896 A | 6/1997 | Tinsley et al. | |
| 5,641,270 A | 6/1997 | Sgourakes et al. | |
| 5,643,482 A | 7/1997 | Sandelman et al. | |
| 5,650,936 A | 7/1997 | Loucks et al. | |
| 5,655,379 A | 8/1997 | Jaster et al. | |
| 5,655,380 A | 8/1997 | Calton | |
| 5,656,767 A | 8/1997 | Garvey, III et al. | |
| 5,682,949 A | 11/1997 | Ratcliffe et al. | |
| 5,684,463 A | 11/1997 | Diercks et al. | |
| 5,689,963 A | 11/1997 | Bahel et al. | |
| 5,691,692 A | 11/1997 | Herbstritt | |
| 5,694,010 A | 12/1997 | Oomura et al. | |
| 5,696,501 A | 12/1997 | Ouellette et al. | |
| 5,699,670 A | 12/1997 | Jurewicz et al. | |
| 5,706,007 A | 1/1998 | Fragnito et al. | |
| 5,707,210 A | 1/1998 | Ramsey et al. | |
| 5,711,785 A | 1/1998 | Maxwell | |
| 5,713,724 A | 2/1998 | Centers et al. | |
| 5,714,931 A | 2/1998 | Petite et al. | |
| 5,715,704 A | 2/1998 | Cholkeri et al. | |
| 5,718,822 A | 2/1998 | Richter | |
| 5,724,571 A | 3/1998 | Woods | |
| 5,729,474 A | 3/1998 | Hildebrand et al. | |
| 5,737,931 A | 4/1998 | Ueno et al. | |
| 5,741,120 A | 4/1998 | Bass et al. | |
| 5,743,109 A | 4/1998 | Schulak | |
| 5,745,114 A | 4/1998 | King et al. | |
| 5,749,238 A | 5/1998 | Schmidt | |
| 5,751,916 A | 5/1998 | Kon et al. | |
| 5,752,385 A | 5/1998 | Nelson | |
| 5,754,450 A | 5/1998 | Solomon et al. | |
| 5,754,732 A | 5/1998 | Vlahu | |
| 5,757,664 A | 5/1998 | Rogers et al. | |
| 5,757,892 A | 5/1998 | Blanchard et al. | |
| 5,761,083 A | 6/1998 | Brown, Jr. et al. | |
| 5,764,509 A | 6/1998 | Gross et al. | |
| 5,772,214 A | 6/1998 | Stark | |
| 5,772,403 A | 6/1998 | Allison et al. | |
| 5,784,232 A | 7/1998 | Farr | |
| 5,790,898 A | 8/1998 | Kishima et al. | |
| 5,795,381 A | 8/1998 | Holder | |
| 5,798,941 A | 8/1998 | McLeister | |
| 5,802,860 A | 9/1998 | Barrows | |
| 5,805,856 A | 9/1998 | Hanson | |

(56) References Cited

U.S. PATENT DOCUMENTS

| | | | |
|---|---|---|---|
| 5,807,336 | A | 9/1998 | Russo et al. |
| 5,808,441 | A | 9/1998 | Nehring |
| 5,810,908 | A | 9/1998 | Gray et al. |
| 5,812,061 | A | 9/1998 | Simons |
| 5,825,597 | A | 10/1998 | Young |
| 5,827,963 | A | 10/1998 | Selegatto et al. |
| 5,839,094 | A | 11/1998 | French |
| 5,839,291 | A | 11/1998 | Chang et al. |
| 5,841,654 | A | 11/1998 | Verissimo et al. |
| 5,857,348 | A | 1/1999 | Conry |
| 5,860,286 | A | 1/1999 | Tulpule |
| 5,861,807 | A | 1/1999 | Leyden et al. |
| 5,867,998 | A | 2/1999 | Guertin |
| 5,869,960 | A | 2/1999 | Brand |
| 5,873,257 | A | 2/1999 | Peterson |
| 5,875,430 | A | 2/1999 | Koether |
| 5,875,638 | A | 3/1999 | Tinsler |
| 5,884,494 | A | 3/1999 | Okoren et al. |
| 5,887,786 | A | 3/1999 | Sandelman |
| 5,900,801 | A | 5/1999 | Heagle et al. |
| 5,904,049 | A | 5/1999 | Jaster et al. |
| 5,918,200 | A | 6/1999 | Tsutsui et al. |
| 5,924,295 | A | 7/1999 | Park |
| 5,924,486 | A | 7/1999 | Ehlers et al. |
| 5,926,103 | A | 7/1999 | Petite |
| 5,926,531 | A | 7/1999 | Petite |
| 5,930,773 | A | 7/1999 | Crooks et al. |
| 5,934,087 | A | 8/1999 | Watanabe et al. |
| 5,939,974 | A | 8/1999 | Heagle et al. |
| 5,946,922 | A | 9/1999 | Viard et al. |
| 5,947,693 | A | 9/1999 | Yang |
| 5,947,701 | A | 9/1999 | Hugenroth |
| 5,949,677 | A | 9/1999 | Ho |
| 5,950,443 | A | 9/1999 | Meyer et al. |
| 5,953,490 | A | 9/1999 | Wiklund et al. |
| 5,956,658 | A | 9/1999 | McMahon |
| 5,971,712 | A | 10/1999 | Kann |
| 5,975,854 | A | 11/1999 | Culp, III et al. |
| 5,984,645 | A | 11/1999 | Cummings |
| 5,986,571 | A | 11/1999 | Flick |
| 5,987,903 | A | 11/1999 | Bathla |
| 5,988,986 | A | 11/1999 | Brinken et al. |
| 5,995,347 | A | 11/1999 | Rudd et al. |
| 5,995,351 | A | 11/1999 | Katsumata et al. |
| 6,006,142 | A | 12/1999 | Seem et al. |
| 6,006,171 | A | 12/1999 | Vines et al. |
| 6,011,368 | A | 1/2000 | Kalpathi et al. |
| 6,013,108 | A | 1/2000 | Karolys et al. |
| 6,017,192 | A | 1/2000 | Clack et al. |
| 6,020,702 | A | 2/2000 | Farr |
| 6,023,420 | A | 2/2000 | McCormick et al. |
| 6,026,651 | A | 2/2000 | Sandelman |
| 6,028,522 | A | 2/2000 | Petite |
| 6,035,653 | A | 3/2000 | Itoh et al. |
| 6,035,661 | A | 3/2000 | Sunaga et al. |
| 6,038,871 | A | 3/2000 | Gutierrez et al. |
| 6,041,605 | A | 3/2000 | Heinrichs |
| 6,041,609 | A | 3/2000 | Hornsleth et al. |
| 6,041,856 | A | 3/2000 | Thrasher et al. |
| 6,042,344 | A | 3/2000 | Lifson |
| 6,044,062 | A | 3/2000 | Brownrigg et al. |
| 6,047,557 | A | 4/2000 | Pham et al. |
| 6,050,098 | A | 4/2000 | Meyer et al. |
| 6,050,780 | A | 4/2000 | Hasegawa et al. |
| 6,052,731 | A | 4/2000 | Holdsworth et al. |
| 6,057,771 | A | 5/2000 | Lakra |
| 6,065,946 | A | 5/2000 | Lathrop |
| 6,068,447 | A | 5/2000 | Foege |
| 6,070,110 | A | 5/2000 | Shah et al. |
| 6,075,530 | A | 6/2000 | Lucas et al. |
| 6,077,051 | A | 6/2000 | Centers et al. |
| 6,081,750 | A | 6/2000 | Hoffberg et al. |
| 6,082,495 | A | 7/2000 | Steinbarger et al. |
| 6,082,971 | A | 7/2000 | Gunn et al. |
| 6,085,530 | A | 7/2000 | Barito |
| 6,088,659 | A | 7/2000 | Kelley et al. |
| 6,088,688 | A | 7/2000 | Crooks et al. |
| 6,092,370 | A | 7/2000 | Tremoulet, Jr. et al. |
| 6,092,378 | A | 7/2000 | Das et al. |
| 6,092,992 | A | 7/2000 | Imblum et al. |
| 6,095,674 | A | 8/2000 | Verissimo et al. |
| 6,098,893 | A | 8/2000 | Berglund et al. |
| 6,102,665 | A | 8/2000 | Centers et al. |
| 6,110,260 | A | 8/2000 | Kubokawa |
| 6,119,949 | A | 9/2000 | Lindstrom |
| 6,122,603 | A | 9/2000 | Budike, Jr. |
| 6,125,642 | A | 10/2000 | Seener et al. |
| 6,128,583 | A | 10/2000 | Dowling |
| 6,128,953 | A | 10/2000 | Mizukoshi |
| 6,129,527 | A | 10/2000 | Donahoe et al. |
| 6,138,461 | A | 10/2000 | Park et al. |
| 6,142,741 | A | 11/2000 | Nishihata et al. |
| 6,144,888 | A | 11/2000 | Lucas et al. |
| 6,145,328 | A | 11/2000 | Choi |
| 6,147,601 | A | 11/2000 | Sandelman et al. |
| 6,152,375 | A | 11/2000 | Robison |
| 6,152,376 | A | 11/2000 | Sandelman et al. |
| 6,153,942 | A | 11/2000 | Roseman et al. |
| 6,153,993 | A | 11/2000 | Oomura et al. |
| 6,154,488 | A | 11/2000 | Hunt |
| 6,157,310 | A | 12/2000 | Milne et al. |
| 6,158,230 | A | 12/2000 | Katsuki |
| 6,160,477 | A | 12/2000 | Sandelman et al. |
| 6,169,979 | B1 | 1/2001 | Johnson |
| 6,172,476 | B1 | 1/2001 | Tolbert, Jr. et al. |
| 6,174,136 | B1 | 1/2001 | Kilayko et al. |
| 6,176,686 | B1 | 1/2001 | Wallis et al. |
| 6,177,884 | B1 | 1/2001 | Hunt et al. |
| 6,178,362 | B1 | 1/2001 | Woolard et al. |
| 6,179,214 | B1 | 1/2001 | Key et al. |
| 6,181,033 | B1 | 1/2001 | Wright |
| 6,190,442 | B1 | 2/2001 | Redner |
| 6,191,545 | B1 | 2/2001 | Kawabata et al. |
| 6,192,282 | B1 | 2/2001 | Smith et al. |
| 6,199,018 | B1 | 3/2001 | Quist et al. |
| 6,211,782 | B1 | 4/2001 | Sandelman et al. |
| 6,213,731 | B1 | 4/2001 | Doepker et al. |
| 6,215,405 | B1 | 4/2001 | Handley et al. |
| 6,216,956 | B1 | 4/2001 | Ehlers et al. |
| 6,218,953 | B1 | 4/2001 | Petite |
| 6,223,543 | B1 | 5/2001 | Sandelman |
| 6,223,544 | B1 | 5/2001 | Seem |
| 6,228,155 | B1 | 5/2001 | Tai |
| 6,230,501 | B1 | 5/2001 | Bailey, Sr. et al. |
| 6,233,327 | B1 | 5/2001 | Petite |
| 6,234,019 | B1 | 5/2001 | Caldeira |
| 6,240,733 | B1 | 6/2001 | Brandon et al. |
| 6,240,736 | B1 | 6/2001 | Fujita et al. |
| 6,244,061 | B1 | 6/2001 | Takagi et al. |
| 6,249,516 | B1 | 6/2001 | Brownrigg et al. |
| 6,260,004 | B1 | 7/2001 | Hays et al. |
| 6,266,968 | B1 | 7/2001 | Redlich |
| 6,268,664 | B1 | 7/2001 | Rolls et al. |
| 6,272,868 | B1 | 8/2001 | Grabon et al. |
| 6,276,901 | B1 | 8/2001 | Farr et al. |
| 6,279,332 | B1 | 8/2001 | Yeo et al. |
| 6,290,043 | B1 | 9/2001 | Ginder et al. |
| 6,293,114 | B1 | 9/2001 | Kamemoto |
| 6,293,767 | B1 | 9/2001 | Bass |
| 6,302,654 | B1 | 10/2001 | Millet et al. |
| 6,304,934 | B1 | 10/2001 | Pimenta et al. |
| 6,324,854 | B1 | 12/2001 | Jayanth |
| 6,327,541 | B1 | 12/2001 | Pitchford et al. |
| 6,332,327 | B1 | 12/2001 | Street et al. |
| 6,334,093 | B1 | 12/2001 | More |
| 6,349,883 | B1 | 2/2002 | Simmons et al. |
| 6,359,410 | B1 | 3/2002 | Randolph |
| 6,360,551 | B1 | 3/2002 | Renders |
| 6,366,889 | B1 | 4/2002 | Zaloom |
| 6,375,439 | B1 | 4/2002 | Missio |
| 6,378,315 | B1 | 4/2002 | Gelber et al. |
| 6,381,971 | B2 | 5/2002 | Honda |
| 6,385,510 | B1 | 5/2002 | Hoog et al. |
| 6,389,823 | B1 | 5/2002 | Loprete et al. |

(56) References Cited

U.S. PATENT DOCUMENTS

| | | |
|---|---|---|
| 6,390,779 B1 | 5/2002 | Cunkelman |
| 6,391,102 B1 | 5/2002 | Bodden et al. |
| 6,393,848 B2 | 5/2002 | Roh et al. |
| 6,397,606 B1 | 6/2002 | Roh et al. |
| 6,397,612 B1 | 6/2002 | Kernkamp et al. |
| 6,406,265 B1 | 6/2002 | Hahn et al. |
| 6,406,266 B1 | 6/2002 | Hugenroth et al. |
| 6,408,228 B1 | 6/2002 | Seem et al. |
| 6,408,258 B1 | 6/2002 | Richer |
| 6,412,293 B1 | 7/2002 | Pham et al. |
| 6,414,594 B1 | 7/2002 | Guerlain |
| 6,430,268 B1 | 8/2002 | Petite |
| 6,433,791 B2 | 8/2002 | Selli et al. |
| 6,437,691 B1 | 8/2002 | Sandelman et al. |
| 6,437,692 B1 | 8/2002 | Petite et al. |
| 6,438,981 B1 | 8/2002 | Whiteside |
| 6,442,953 B1 | 9/2002 | Trigiani et al. |
| 6,449,972 B2 | 9/2002 | Pham et al. |
| 6,450,771 B1 | 9/2002 | Centers et al. |
| 6,451,210 B1 | 9/2002 | Sivavec et al. |
| 6,453,687 B2 | 9/2002 | Sharood et al. |
| 6,454,177 B1 | 9/2002 | Sasao et al. |
| 6,454,538 B1 | 9/2002 | Witham et al. |
| 6,456,928 B1 | 9/2002 | Johnson |
| 6,457,319 B1 | 10/2002 | Ota et al. |
| 6,457,948 B1 | 10/2002 | Pham |
| 6,460,731 B2 | 10/2002 | Estelle et al. |
| 6,462,654 B1 | 10/2002 | Sandelman et al. |
| 6,463,747 B1 | 10/2002 | Temple |
| 6,466,971 B1 | 10/2002 | Humpleman et al. |
| 6,467,280 B2 | 10/2002 | Pham et al. |
| 6,471,486 B1 | 10/2002 | Centers et al. |
| 6,474,084 B2 | 11/2002 | Gauthier et al. |
| 6,484,520 B2 | 11/2002 | Kawaguchi et al. |
| 6,487,457 B1 | 11/2002 | Hull et al. |
| 6,490,506 B1 | 12/2002 | March |
| 6,492,923 B1 | 12/2002 | Inoue et al. |
| 6,497,554 B2 | 12/2002 | Yang et al. |
| 6,501,240 B2 | 12/2002 | Ueda et al. |
| 6,501,629 B1 | 12/2002 | Marriott |
| 6,502,409 B1 | 1/2003 | Gatling et al. |
| 6,505,087 B1 | 1/2003 | Lucas et al. |
| 6,505,475 B1 | 1/2003 | Zugibe et al. |
| 6,510,350 B1 | 1/2003 | Steen, III et al. |
| 6,522,974 B2 | 2/2003 | Sitton |
| 6,523,130 B1 | 2/2003 | Hickman et al. |
| 6,526,766 B1 | 3/2003 | Hiraoka et al. |
| 6,529,590 B1 | 3/2003 | Centers |
| 6,529,839 B1 | 3/2003 | Uggerud et al. |
| 6,533,552 B2 | 3/2003 | Centers et al. |
| 6,535,123 B2 | 3/2003 | Sandelman et al. |
| 6,535,859 B1 | 3/2003 | Yablonowski et al. |
| 6,537,034 B2 | 3/2003 | Park et al. |
| 6,542,062 B1 | 4/2003 | Herrick |
| 6,549,135 B2 | 4/2003 | Singh et al. |
| 6,551,069 B2 | 4/2003 | Narney, II et al. |
| 6,553,774 B1 | 4/2003 | Ishio et al. |
| 6,558,126 B1 | 5/2003 | Hahn et al. |
| 6,560,976 B2 | 5/2003 | Jayanth |
| 6,571,280 B1 | 5/2003 | Hubacher |
| 6,571,566 B1 | 6/2003 | Temple et al. |
| 6,571,586 B1 | 6/2003 | Ritson et al. |
| 6,574,561 B2 | 6/2003 | Alexander et al. |
| 6,577,959 B1 | 6/2003 | Chajec et al. |
| 6,577,962 B1 | 6/2003 | Afshari |
| 6,578,373 B1 | 6/2003 | Barbier |
| 6,583,720 B1 | 6/2003 | Quigley |
| 6,589,029 B1 | 7/2003 | Heller |
| 6,591,620 B2 | 7/2003 | Kikuchi et al. |
| 6,595,475 B2 | 7/2003 | Svabek et al. |
| 6,595,757 B2 | 7/2003 | Shen |
| 6,598,056 B1 | 7/2003 | Hull et al. |
| 6,601,397 B2 | 8/2003 | Pham et al. |
| 6,604,093 B1 | 8/2003 | Etzion et al. |
| 6,609,070 B1 | 8/2003 | Lueck |
| 6,609,078 B2 | 8/2003 | Starling et al. |
| 6,615,594 B2 | 9/2003 | Jayanth et al. |
| 6,616,415 B1 | 9/2003 | Renken et al. |
| 6,618,578 B1 | 9/2003 | Petite |
| 6,618,709 B1 | 9/2003 | Sneeringer |
| 6,621,443 B1 | 9/2003 | Selli et al. |
| 6,622,925 B2 | 9/2003 | Carner et al. |
| 6,622,926 B1 | 9/2003 | Sartain et al. |
| 6,628,764 B1 | 9/2003 | Petite |
| 6,629,420 B2 | 10/2003 | Renders |
| 6,631,298 B1 | 10/2003 | Pagnano et al. |
| 6,636,893 B1 | 10/2003 | Fong |
| 6,643,567 B2 | 11/2003 | Kolk et al. |
| 6,644,848 B1 | 11/2003 | Clayton et al. |
| 6,647,735 B2 | 11/2003 | Street et al. |
| 6,658,373 B2 | 12/2003 | Rossi et al. |
| 6,662,584 B1 | 12/2003 | Whiteside |
| 6,662,653 B1 | 12/2003 | Scaliante et al. |
| 6,671,586 B2 | 12/2003 | Davis et al. |
| 6,672,846 B2 | 1/2004 | Rajendran et al. |
| 6,675,591 B2 | 1/2004 | Singh et al. |
| 6,679,072 B2 | 1/2004 | Pham et al. |
| 6,684,349 B2 | 1/2004 | Gullo et al. |
| 6,685,438 B2 | 2/2004 | Yoo et al. |
| 6,698,218 B2 | 3/2004 | Goth et al. |
| 6,701,725 B2 | 3/2004 | Rossi et al. |
| 6,708,083 B2 | 3/2004 | Orthlieb et al. |
| 6,708,508 B2 | 3/2004 | Demuth et al. |
| 6,709,244 B2 | 3/2004 | Pham |
| 6,711,470 B1 | 3/2004 | Hartenstein et al. |
| 6,711,911 B1 | 3/2004 | Grabon et al. |
| 6,717,513 B1 | 4/2004 | Sandelman et al. |
| 6,721,770 B1 | 4/2004 | Morton et al. |
| 6,725,182 B2 | 4/2004 | Pagnano et al. |
| 6,732,538 B2 | 5/2004 | Trigiani et al. |
| 6,745,107 B1 | 6/2004 | Miller |
| 6,747,557 B1 | 6/2004 | Petite et al. |
| 6,758,050 B2 | 7/2004 | Jayanth et al. |
| 6,758,051 B2 | 7/2004 | Jayanth et al. |
| 6,760,207 B2 | 7/2004 | Wyatt et al. |
| 6,772,096 B2 | 8/2004 | Murakami et al. |
| 6,772,598 B1 | 8/2004 | Rinehart |
| 6,775,995 B1 | 8/2004 | Bahel et al. |
| 6,784,807 B2 | 8/2004 | Petite et al. |
| 6,785,592 B1 | 8/2004 | Smith et al. |
| 6,786,473 B1 | 9/2004 | Alles |
| 6,799,951 B2 | 10/2004 | Lifson et al. |
| 6,804,993 B2 | 10/2004 | Selli |
| 6,811,380 B2 | 11/2004 | Kim |
| 6,816,811 B2 | 11/2004 | Seem |
| 6,823,680 B2 | 11/2004 | Jayanth |
| 6,829,542 B1 | 12/2004 | Reynolds et al. |
| 6,832,120 B1 | 12/2004 | Frank et al. |
| 6,832,898 B2 | 12/2004 | Yoshida et al. |
| 6,836,737 B2 | 12/2004 | Petite et al. |
| 6,837,922 B2 | 1/2005 | Gorin |
| 6,839,790 B2 | 1/2005 | Barros De Almeida et al. |
| 6,854,345 B2 | 2/2005 | Alves et al. |
| 6,862,498 B2 | 3/2005 | Davis et al. |
| 6,868,678 B2 | 3/2005 | Mei et al. |
| 6,868,686 B2 | 3/2005 | Ueda et al. |
| 6,869,272 B2 | 3/2005 | Odachi et al. |
| 6,870,486 B2 | 3/2005 | Souza et al. |
| 6,885,949 B2 | 4/2005 | Selli |
| 6,889,173 B2 | 5/2005 | Singh |
| 6,891,838 B1 | 5/2005 | Petite et al. |
| 6,892,546 B2 | 5/2005 | Singh et al. |
| 6,897,772 B1 | 5/2005 | Scheffler et al. |
| 6,900,738 B2 | 5/2005 | Crichlow |
| 6,901,066 B1 | 5/2005 | Helgeson |
| 6,904,385 B1 | 6/2005 | Budike, Jr. |
| 6,914,533 B2 | 7/2005 | Petite |
| 6,914,893 B2 | 7/2005 | Petite |
| 6,922,155 B1 | 7/2005 | Evans et al. |
| 6,931,445 B2 | 8/2005 | Davis |
| 6,934,862 B2 | 8/2005 | Sharood et al. |
| 6,952,658 B2 | 10/2005 | Greulich et al. |
| 6,956,344 B2 | 10/2005 | Robertson et al. |
| 6,964,558 B2 | 11/2005 | Hahn et al. |

(56) References Cited

U.S. PATENT DOCUMENTS

| | | |
|---|---|---|
| 6,966,759 B2 | 11/2005 | Hahn et al. |
| 6,968,295 B1 | 11/2005 | Carr |
| 6,973,410 B2 | 12/2005 | Seigel |
| 6,973,793 B2 | 12/2005 | Douglas et al. |
| 6,973,794 B2 | 12/2005 | Street et al. |
| 6,976,366 B2 | 12/2005 | Starling et al. |
| 6,978,225 B2 | 12/2005 | Retlich et al. |
| 6,981,384 B2 | 1/2006 | Dobmeier et al. |
| 6,983,321 B2 | 1/2006 | Trinon et al. |
| 6,983,889 B2 | 1/2006 | Alles |
| 6,986,469 B2 | 1/2006 | Gauthier et al. |
| 6,987,450 B2 | 1/2006 | Marino et al. |
| 6,990,821 B2 | 1/2006 | Singh et al. |
| 6,992,452 B1 | 1/2006 | Sachs et al. |
| 6,996,441 B1 | 2/2006 | Tobias |
| 6,997,390 B2 | 2/2006 | Alles |
| 6,998,963 B2 | 2/2006 | Flen et al. |
| 6,999,996 B2 | 2/2006 | Sunderland |
| 7,000,422 B2 | 2/2006 | Street et al. |
| 7,003,378 B2 | 2/2006 | Poth |
| 7,009,510 B1 | 3/2006 | Douglass et al. |
| 7,010,925 B2 | 3/2006 | Sienel et al. |
| 7,019,667 B2 | 3/2006 | Petite et al. |
| 7,024,665 B2 | 4/2006 | Ferraz et al. |
| 7,024,870 B2 | 4/2006 | Singh et al. |
| 7,030,752 B2 | 4/2006 | Tyroler |
| 7,031,880 B1 | 4/2006 | Seem et al. |
| 7,035,693 B2 | 4/2006 | Cassiolato et al. |
| 7,039,532 B2 | 5/2006 | Hunter |
| 7,042,180 B2 | 5/2006 | Terry et al. |
| 7,042,350 B2 | 5/2006 | Patrick et al. |
| 7,043,339 B2 | 5/2006 | Maeda et al. |
| 7,043,459 B2 | 5/2006 | Peevey |
| 7,047,753 B2 | 5/2006 | Street et al. |
| 7,053,766 B2 | 5/2006 | Fisler et al. |
| 7,053,767 B2 | 5/2006 | Petite et al. |
| 7,054,271 B2 | 5/2006 | Brownrigg et al. |
| 7,062,580 B2 | 6/2006 | Donaires |
| 7,062,830 B2 | 6/2006 | Alles |
| 7,063,537 B2 | 6/2006 | Selli et al. |
| 7,072,797 B2 | 7/2006 | Gorinevsky |
| 7,075,327 B2 | 7/2006 | Dimino et al. |
| 7,079,810 B2 | 7/2006 | Petite et al. |
| 7,079,967 B2 | 7/2006 | Rossi et al. |
| 7,082,380 B2 | 7/2006 | Wiebe et al. |
| 7,089,125 B2 | 8/2006 | Sonderegger |
| 7,091,847 B2 | 8/2006 | Capowski et al. |
| 7,092,767 B2 | 8/2006 | Pagnano et al. |
| 7,092,794 B1 | 8/2006 | Hill et al. |
| 7,096,153 B2 | 8/2006 | Guralnik et al. |
| 7,102,490 B2 | 9/2006 | Flen et al. |
| 7,103,511 B2 | 9/2006 | Petite |
| 7,110,843 B2 | 9/2006 | Pagnano et al. |
| 7,110,898 B2 | 9/2006 | Montijo et al. |
| 7,113,376 B2 | 9/2006 | Nomura et al. |
| 7,114,343 B2 | 10/2006 | Kates |
| 7,123,020 B2 | 10/2006 | Hill et al. |
| 7,123,458 B2 | 10/2006 | Mohr et al. |
| 7,124,728 B2 | 10/2006 | Carey et al. |
| 7,126,465 B2 | 10/2006 | Faltesek |
| 7,130,170 B2 | 10/2006 | Wakefield et al. |
| 7,130,832 B2 | 10/2006 | Bannai et al. |
| 7,134,295 B2 | 11/2006 | Maekawa |
| 7,137,550 B1 | 11/2006 | Petite |
| 7,142,125 B2 | 11/2006 | Larson et al. |
| 7,145,438 B2 | 12/2006 | Flen et al. |
| 7,145,462 B2 | 12/2006 | Dewing et al. |
| 7,159,408 B2 | 1/2007 | Sadegh et al. |
| 7,162,884 B2 | 1/2007 | Alles |
| 7,163,158 B2 | 1/2007 | Rossi et al. |
| 7,171,372 B2 | 1/2007 | Daniel et al. |
| 7,174,728 B2 | 2/2007 | Jayanth |
| 7,180,412 B2 | 2/2007 | Bonicatto et al. |
| 7,184,861 B2 | 2/2007 | Petite |
| 7,188,482 B2 | 3/2007 | Sadegh et al. |
| 7,188,779 B2 | 3/2007 | Alles |
| 7,201,006 B2 | 4/2007 | Kates |
| 7,207,496 B2 | 4/2007 | Alles |
| 7,209,840 B2 | 4/2007 | Petite et al. |
| 7,212,887 B2 | 5/2007 | Shah et al. |
| 7,222,493 B2 | 5/2007 | Jayanth et al. |
| 7,224,740 B2 | 5/2007 | Hunt |
| 7,225,193 B2 | 5/2007 | Mets et al. |
| 7,227,450 B2 | 6/2007 | Garvy et al. |
| 7,228,691 B2 | 6/2007 | Street et al. |
| 7,230,528 B2 | 6/2007 | Kates |
| 7,234,313 B2 | 6/2007 | Bell et al. |
| 7,236,765 B2 | 6/2007 | Bonicatto et al. |
| 7,244,294 B2 | 7/2007 | Kates |
| 7,246,014 B2 | 7/2007 | Forth et al. |
| 7,255,285 B2 | 8/2007 | Troost et al. |
| 7,257,501 B2 | 8/2007 | Zhan et al. |
| 7,260,505 B2 | 8/2007 | Felke et al. |
| 7,261,762 B2 | 8/2007 | Kang et al. |
| 7,263,073 B2 | 8/2007 | Petite et al. |
| 7,263,446 B2 | 8/2007 | Morin et al. |
| 7,266,812 B2 | 9/2007 | Pagnano |
| 7,270,278 B2 | 9/2007 | Street et al. |
| 7,274,995 B2 | 9/2007 | Zhan et al. |
| 7,275,377 B2 | 10/2007 | Kates |
| 7,286,945 B2 | 10/2007 | Zhan et al. |
| 7,290,398 B2 | 11/2007 | Wallace et al. |
| 7,290,989 B2 | 11/2007 | Jayanth |
| 7,295,128 B2 | 11/2007 | Petite |
| 7,295,896 B2 | 11/2007 | Norbeck |
| 7,317,952 B2 | 1/2008 | Bhandiwad et al. |
| 7,328,192 B1 | 2/2008 | Stengard et al. |
| 7,330,886 B2 | 2/2008 | Childers et al. |
| 7,331,187 B2 | 2/2008 | Kates |
| 7,336,168 B2 | 2/2008 | Kates |
| 7,337,191 B2 | 2/2008 | Haeberle et al. |
| 7,343,750 B2 | 3/2008 | Lifson et al. |
| 7,343,751 B2 | 3/2008 | Kates |
| 7,346,463 B2 | 3/2008 | Petite et al. |
| 7,346,472 B1 | 3/2008 | Moskowitz et al. |
| 7,349,824 B2 | 3/2008 | Seigel |
| 7,350,112 B2 | 3/2008 | Fox et al. |
| 7,351,274 B2 | 4/2008 | Helt et al. |
| 7,352,545 B2 | 4/2008 | Wyatt et al. |
| 7,363,200 B2 | 4/2008 | Lu |
| 7,376,712 B1 | 5/2008 | Granatelli et al. |
| 7,377,118 B2 | 5/2008 | Esslinger |
| 7,383,030 B2 | 6/2008 | Brown et al. |
| 7,383,158 B2 | 6/2008 | Krocker et al. |
| 7,392,661 B2 | 7/2008 | Alles |
| 7,397,907 B2 | 7/2008 | Petite |
| 7,400,240 B2 | 7/2008 | Shrode et al. |
| 7,412,842 B2 | 8/2008 | Pham |
| 7,414,525 B2 | 8/2008 | Costea et al. |
| 7,421,351 B2 | 9/2008 | Navratil |
| 7,421,374 B2 | 9/2008 | Zhan et al. |
| 7,421,850 B2 | 9/2008 | Street et al. |
| 7,424,343 B2 | 9/2008 | Kates |
| 7,424,345 B2 | 9/2008 | Norbeck |
| 7,424,527 B2 | 9/2008 | Petite |
| 7,432,824 B2 | 10/2008 | Flen et al. |
| 7,433,854 B2 | 10/2008 | Joseph et al. |
| 7,434,742 B2 | 10/2008 | Mueller et al. |
| 7,437,150 B1 | 10/2008 | Morelli et al. |
| 7,440,560 B1 | 10/2008 | Barry |
| 7,440,767 B2 | 10/2008 | Ballay et al. |
| 7,443,313 B2 | 10/2008 | Davis et al. |
| 7,445,665 B2 | 11/2008 | Hsieh et al. |
| 7,447,603 B2 | 11/2008 | Bruno |
| 7,447,609 B2 | 11/2008 | Guralnik et al. |
| 7,451,606 B2 | 11/2008 | Harrod |
| 7,454,439 B1 | 11/2008 | Gansner et al. |
| 7,458,223 B2 | 12/2008 | Pham |
| 7,468,661 B2 | 12/2008 | Petite et al. |
| 7,469,546 B2 | 12/2008 | Kates |
| 7,474,992 B2 | 1/2009 | Ariyur |
| 7,480,501 B2 | 1/2009 | Petite |
| 7,483,810 B2 | 1/2009 | Jackson et al. |
| 7,484,376 B2 | 2/2009 | Pham |

(56) References Cited

U.S. PATENT DOCUMENTS

| | | |
|---|---|---|
| 7,490,477 B2 | 2/2009 | Singh et al. |
| 7,491,034 B2 | 2/2009 | Jayanth |
| 7,503,182 B2 | 3/2009 | Bahel et al. |
| 7,510,126 B2 | 3/2009 | Rossi et al. |
| 7,523,619 B2 | 4/2009 | Kojima et al. |
| 7,528,711 B2 | 5/2009 | Kates |
| 7,533,070 B2 | 5/2009 | Guralnik et al. |
| 7,537,172 B2 | 5/2009 | Rossi et al. |
| 7,552,030 B2 | 6/2009 | Guralnik et al. |
| 7,555,364 B2 | 6/2009 | Poth et al. |
| 7,574,333 B2 | 8/2009 | Lu |
| 7,580,812 B2 | 8/2009 | Ariyur et al. |
| 7,594,407 B2 | 9/2009 | Singh et al. |
| 7,596,959 B2 | 10/2009 | Singh et al. |
| 7,606,683 B2 | 10/2009 | Bahel et al. |
| 7,631,508 B2 | 12/2009 | Braun et al. |
| 7,636,901 B2 | 12/2009 | Munson et al. |
| 7,644,591 B2 | 1/2010 | Singh et al. |
| 7,648,077 B2 | 1/2010 | Rossi et al. |
| 7,648,342 B2 | 1/2010 | Jayanth |
| 7,650,425 B2 | 1/2010 | Davis et al. |
| 7,660,700 B2 | 2/2010 | Moskowitz et al. |
| 7,660,774 B2 | 2/2010 | Mukherjee et al. |
| 7,664,613 B2 | 2/2010 | Hansen |
| 7,665,315 B2 | 2/2010 | Singh et al. |
| 7,686,872 B2 | 3/2010 | Kang |
| 7,693,809 B2 | 4/2010 | Gray |
| 7,697,492 B2 | 4/2010 | Petite |
| 7,703,694 B2 | 4/2010 | Mueller et al. |
| 7,704,052 B2 | 4/2010 | Iimura et al. |
| 7,706,320 B2 | 4/2010 | Davis et al. |
| 7,724,131 B2 | 5/2010 | Chen |
| 7,726,583 B2 | 6/2010 | Maekawa |
| 7,734,451 B2 | 6/2010 | MacArthur et al. |
| 7,738,999 B2 | 6/2010 | Petite |
| 7,739,378 B2 | 6/2010 | Petite |
| 7,742,393 B2 | 6/2010 | Bonicatto et al. |
| 7,752,853 B2 | 7/2010 | Singh et al. |
| 7,752,854 B2 | 7/2010 | Singh et al. |
| 7,756,086 B2 | 7/2010 | Petite et al. |
| 7,791,468 B2 | 9/2010 | Bonicatto et al. |
| 7,844,366 B2 | 11/2010 | Singh |
| 7,845,179 B2 | 12/2010 | Singh et al. |
| 7,848,827 B2 | 12/2010 | Chen |
| 7,848,900 B2 | 12/2010 | Steinberg et al. |
| 7,877,218 B2 | 1/2011 | Bonicatto et al. |
| 7,885,959 B2 | 2/2011 | Horowitz et al. |
| 7,885,961 B2 | 2/2011 | Horowitz et al. |
| 7,905,098 B2 | 3/2011 | Pham |
| 7,908,116 B2 | 3/2011 | Steinberg et al. |
| 7,908,117 B2 | 3/2011 | Steinberg et al. |
| 7,922,914 B1 | 4/2011 | Verdegan et al. |
| 7,937,623 B2 | 5/2011 | Ramacher et al. |
| 7,941,294 B2 | 5/2011 | Shahi et al. |
| 7,949,494 B2 | 5/2011 | Moskowitz et al. |
| 7,949,615 B2 | 5/2011 | Ehlers et al. |
| 7,963,454 B2 | 6/2011 | Sullivan et al. |
| 7,966,152 B2 | 6/2011 | Stluka et al. |
| 7,967,218 B2 | 6/2011 | Alles |
| 7,978,059 B2 | 7/2011 | Petite et al. |
| 7,987,679 B2 | 8/2011 | Tanaka et al. |
| 7,996,045 B1 | 8/2011 | Bauer et al. |
| 7,999,668 B2 | 8/2011 | Cawthorne et al. |
| 8,000,314 B2 | 8/2011 | Brownrigg et al. |
| 8,002,199 B2 | 8/2011 | Habegger |
| 8,005,640 B2 | 8/2011 | Chiefetz et al. |
| 8,010,237 B2 | 8/2011 | Cheung et al. |
| 8,013,732 B2 | 9/2011 | Petite et al. |
| 8,019,567 B2 | 9/2011 | Steinberg et al. |
| 8,029,608 B1 | 10/2011 | Breslin |
| 8,031,650 B2 | 10/2011 | Petite et al. |
| 8,034,170 B2 | 10/2011 | Kates |
| 8,036,844 B2 | 10/2011 | Ling et al. |
| 8,040,231 B2 | 10/2011 | Kuruvila et al. |
| 8,041,539 B2 | 10/2011 | Guralnik et al. |
| 8,046,107 B2 | 10/2011 | Zugibe et al. |
| 8,061,417 B2 | 11/2011 | Gray |
| 8,064,412 B2 | 11/2011 | Petite |
| 8,065,886 B2 | 11/2011 | Singh et al. |
| 8,068,997 B2 | 11/2011 | Ling et al. |
| 8,090,477 B1 | 1/2012 | Steinberg |
| 8,090,559 B2 | 1/2012 | Parthasarathy et al. |
| 8,090,824 B2 | 1/2012 | Tran et al. |
| 8,095,337 B2 | 1/2012 | Kolbet et al. |
| 8,108,200 B2 | 1/2012 | Anne et al. |
| 8,125,230 B2 | 2/2012 | Bharadwaj et al. |
| 8,131,497 B2 | 3/2012 | Steinberg et al. |
| 8,131,506 B2 | 3/2012 | Steinberg et al. |
| 8,134,330 B2 | 3/2012 | Alles |
| 8,150,720 B2 | 4/2012 | Singh et al. |
| 8,156,208 B2 | 4/2012 | Bornhoevd et al. |
| 8,170,968 B2 | 5/2012 | Colclough et al. |
| 8,171,136 B2 | 5/2012 | Petite |
| 8,175,846 B2 | 5/2012 | Khalak et al. |
| 8,180,492 B2 | 5/2012 | Steinberg |
| 8,182,579 B2 | 5/2012 | Woo et al. |
| 8,214,175 B2 | 7/2012 | Moskowitz et al. |
| 8,228,648 B2 | 7/2012 | Jayanth et al. |
| 8,239,922 B2 | 8/2012 | Sullivan et al. |
| 8,258,763 B2 | 9/2012 | Nakamura et al. |
| 8,279,565 B2 | 10/2012 | Hall et al. |
| 8,280,536 B1 | 10/2012 | Fadell et al. |
| 8,328,524 B2 | 12/2012 | Iimura et al. |
| 8,380,556 B2 | 2/2013 | Singh et al. |
| 8,393,169 B2 | 3/2013 | Pham |
| 9,168,315 B1 | 10/2015 | Scaringe et al. |
| 2001/0005320 A1 | 6/2001 | Ueda et al. |
| 2001/0025349 A1 | 9/2001 | Sharood et al. |
| 2001/0054291 A1 | 12/2001 | Roh et al. |
| 2001/0054293 A1 | 12/2001 | Gustafson et al. |
| 2001/0054294 A1 | 12/2001 | Tsuboi |
| 2002/0000092 A1 | 1/2002 | Sharood et al. |
| 2002/0013679 A1 | 1/2002 | Petite |
| 2002/0016639 A1 | 2/2002 | Smith et al. |
| 2002/0017057 A1 | 2/2002 | Weder |
| 2002/0018724 A1 | 2/2002 | Millet et al. |
| 2002/0020175 A1 | 2/2002 | Street et al. |
| 2002/0029575 A1 | 3/2002 | Okamoto |
| 2002/0031101 A1 | 3/2002 | Petite et al. |
| 2002/0035495 A1 | 3/2002 | Spira et al. |
| 2002/0040280 A1 | 4/2002 | Morgan |
| 2002/0064463 A1 | 5/2002 | Park et al. |
| 2002/0067999 A1 | 6/2002 | Suitou et al. |
| 2002/0082747 A1 | 6/2002 | Kramer |
| 2002/0082924 A1 | 6/2002 | Koether |
| 2002/0093259 A1 | 7/2002 | Sunaga et al. |
| 2002/0095269 A1 | 7/2002 | Natalini et al. |
| 2002/0103655 A1 | 8/2002 | Boies et al. |
| 2002/0113877 A1 | 8/2002 | Welch |
| 2002/0117992 A1 | 8/2002 | Hirono et al. |
| 2002/0118106 A1 | 8/2002 | Brenn |
| 2002/0127120 A1 | 9/2002 | Hahn et al. |
| 2002/0139128 A1 | 10/2002 | Suzuki et al. |
| 2002/0143482 A1 | 10/2002 | Karanam et al. |
| 2002/0152298 A1 | 10/2002 | Kikta et al. |
| 2002/0157408 A1 | 10/2002 | Egawa et al. |
| 2002/0157409 A1 | 10/2002 | Pham et al. |
| 2002/0159890 A1 | 10/2002 | Kajiwara et al. |
| 2002/0161545 A1 | 10/2002 | Starling et al. |
| 2002/0163436 A1 | 11/2002 | Singh et al. |
| 2002/0170299 A1 | 11/2002 | Jayanth et al. |
| 2002/0173929 A1 | 11/2002 | Seigel |
| 2002/0187057 A1 | 12/2002 | Loprete et al. |
| 2002/0189267 A1 | 12/2002 | Singh et al. |
| 2002/0193890 A1 | 12/2002 | Pouchak |
| 2002/0198629 A1 | 12/2002 | Ellis |
| 2003/0004660 A1 | 1/2003 | Hunter |
| 2003/0004765 A1 | 1/2003 | Wiegand |
| 2003/0005710 A1 | 1/2003 | Singh et al. |
| 2003/0006884 A1 | 1/2003 | Hunt |
| 2003/0014218 A1 | 1/2003 | Trigiani et al. |
| 2003/0019221 A1 | 1/2003 | Rossi et al. |
| 2003/0036810 A1 | 2/2003 | Petite |
| 2003/0037555 A1 | 2/2003 | Street et al. |

(56) References Cited

U.S. PATENT DOCUMENTS

| | | |
|---|---|---|
| 2003/0050737 A1 | 3/2003 | Osann |
| 2003/0050824 A1 | 3/2003 | Suermondt et al. |
| 2003/0051490 A1 | 3/2003 | Jayanth |
| 2003/0055603 A1 | 3/2003 | Rossi et al. |
| 2003/0063983 A1 | 4/2003 | Ancel et al. |
| 2003/0070438 A1 | 4/2003 | Kikuchi et al. |
| 2003/0070544 A1 | 4/2003 | Mulvaney et al. |
| 2003/0074285 A1 | 4/2003 | Hoffman et al. |
| 2003/0077179 A1 | 4/2003 | Collins et al. |
| 2003/0078677 A1 | 4/2003 | Hull et al. |
| 2003/0078742 A1 | 4/2003 | VanderZee et al. |
| 2003/0089493 A1 | 5/2003 | Takano et al. |
| 2003/0094004 A1 | 5/2003 | Pham et al. |
| 2003/0108430 A1 | 6/2003 | Yoshida et al. |
| 2003/0115890 A1 | 6/2003 | Jayanth et al. |
| 2003/0135786 A1 | 7/2003 | Vollmar et al. |
| 2003/0137396 A1 | 7/2003 | Durej et al. |
| 2003/0150924 A1 | 8/2003 | Peter |
| 2003/0150926 A1 | 8/2003 | Rosen |
| 2003/0150927 A1 | 8/2003 | Rosen |
| 2003/0171851 A1 | 9/2003 | Brickfield et al. |
| 2003/0183085 A1 | 10/2003 | Alexander |
| 2003/0191606 A1 | 10/2003 | Fujiyama et al. |
| 2003/0199247 A1 | 10/2003 | Striemer |
| 2003/0205143 A1 | 11/2003 | Cheng |
| 2003/0213851 A1 | 11/2003 | Burd et al. |
| 2003/0216837 A1 | 11/2003 | Reich et al. |
| 2003/0216888 A1 | 11/2003 | Ridolfo |
| 2003/0233172 A1 | 12/2003 | Granqvist et al. |
| 2004/0016241 A1 | 1/2004 | Street et al. |
| 2004/0016244 A1 | 1/2004 | Street et al. |
| 2004/0016251 A1 | 1/2004 | Street et al. |
| 2004/0016253 A1 | 1/2004 | Street et al. |
| 2004/0019584 A1 | 1/2004 | Greening et al. |
| 2004/0024495 A1 | 2/2004 | Sunderland |
| 2004/0026522 A1 | 2/2004 | Keen et al. |
| 2004/0037706 A1 | 2/2004 | Hahn et al. |
| 2004/0042904 A1 | 3/2004 | Kim |
| 2004/0047406 A1 | 3/2004 | Hunt |
| 2004/0049715 A1 | 3/2004 | Jaw |
| 2004/0059691 A1 | 3/2004 | Higgins |
| 2004/0068390 A1 | 4/2004 | Saunders |
| 2004/0078695 A1 | 4/2004 | Bowers et al. |
| 2004/0079093 A1 | 4/2004 | Gauthier et al. |
| 2004/0093879 A1 | 5/2004 | Street et al. |
| 2004/0095237 A1 | 5/2004 | Chen et al. |
| 2004/0111186 A1 | 6/2004 | Rossi et al. |
| 2004/0117166 A1 | 6/2004 | Cassiolato |
| 2004/0133314 A1 | 7/2004 | Ehlers et al. |
| 2004/0133367 A1 | 7/2004 | Hart |
| 2004/0140772 A1 | 7/2004 | Gullo et al. |
| 2004/0140812 A1 | 7/2004 | Scallante et al. |
| 2004/0144106 A1 | 7/2004 | Douglas et al. |
| 2004/0153437 A1 | 8/2004 | Buchan |
| 2004/0159113 A1 | 8/2004 | Singh et al. |
| 2004/0159114 A1 | 8/2004 | Demuth et al. |
| 2004/0183687 A1 | 9/2004 | Petite et al. |
| 2004/0184627 A1 | 9/2004 | Kost et al. |
| 2004/0184928 A1 | 9/2004 | Millet et al. |
| 2004/0184929 A1 | 9/2004 | Millet et al. |
| 2004/0184930 A1 | 9/2004 | Millet et al. |
| 2004/0184931 A1 | 9/2004 | Millet et al. |
| 2004/0187502 A1 | 9/2004 | Jayanth et al. |
| 2004/0191073 A1 | 9/2004 | Iimura et al. |
| 2004/0210419 A1 | 10/2004 | Wiebe et al. |
| 2004/0213384 A1 | 10/2004 | Alles et al. |
| 2004/0230582 A1 | 11/2004 | Pagnano et al. |
| 2004/0230899 A1 | 11/2004 | Pagnano et al. |
| 2004/0239266 A1 | 12/2004 | Lee et al. |
| 2004/0258542 A1 | 12/2004 | Wiertz et al. |
| 2004/0261431 A1 | 12/2004 | Singh et al. |
| 2005/0040249 A1 | 2/2005 | Wacker et al. |
| 2005/0043923 A1 | 2/2005 | Forster et al. |
| 2005/0053471 A1 | 3/2005 | Hong et al. |
| 2005/0056031 A1 | 3/2005 | Jeong |
| 2005/0073532 A1 | 4/2005 | Scott et al. |
| 2005/0086341 A1 | 4/2005 | Enga et al. |
| 2005/0100449 A1 | 5/2005 | Hahn et al. |
| 2005/0103036 A1 | 5/2005 | Maekawa |
| 2005/0125439 A1 | 6/2005 | Nourbakhsh et al. |
| 2005/0126190 A1 | 6/2005 | Lifson et al. |
| 2005/0131624 A1 | 6/2005 | Gaessler et al. |
| 2005/0149570 A1 | 7/2005 | Sasaki et al. |
| 2005/0154495 A1 | 7/2005 | Shah |
| 2005/0159924 A1 | 7/2005 | Shah et al. |
| 2005/0166610 A1 | 8/2005 | Jayanth |
| 2005/0169636 A1 | 8/2005 | Aronson et al. |
| 2005/0172647 A1 | 8/2005 | Thybo et al. |
| 2005/0195775 A1 | 9/2005 | Petite et al. |
| 2005/0198063 A1 | 9/2005 | Thomas et al. |
| 2005/0201397 A1 | 9/2005 | Petite |
| 2005/0204756 A1 | 9/2005 | Dobmeier et al. |
| 2005/0207741 A1 | 9/2005 | Shah et al. |
| 2005/0214148 A1 | 9/2005 | Ogawa et al. |
| 2005/0222715 A1 | 10/2005 | Ruhnke et al. |
| 2005/0228607 A1 | 10/2005 | Simons |
| 2005/0229612 A1 | 10/2005 | Hrejsa et al. |
| 2005/0229777 A1 | 10/2005 | Brown et al. |
| 2005/0232781 A1 | 10/2005 | Herbert et al. |
| 2005/0235660 A1 | 10/2005 | Pham |
| 2005/0235661 A1 | 10/2005 | Pham |
| 2005/0235662 A1 | 10/2005 | Pham |
| 2005/0235663 A1 | 10/2005 | Pham |
| 2005/0235664 A1 | 10/2005 | Pham |
| 2005/0247194 A1 | 11/2005 | Kang et al. |
| 2005/0251293 A1 | 11/2005 | Seigel |
| 2005/0252220 A1 | 11/2005 | Street et al. |
| 2005/0262856 A1 | 12/2005 | Street et al. |
| 2005/0262923 A1 | 12/2005 | Kates |
| 2006/0010898 A1 | 1/2006 | Suharno et al. |
| 2006/0015777 A1 | 1/2006 | Loda |
| 2006/0020426 A1 | 1/2006 | Singh |
| 2006/0021362 A1 | 2/2006 | Sadegh et al. |
| 2006/0032245 A1 | 2/2006 | Kates |
| 2006/0032246 A1 | 2/2006 | Kates |
| 2006/0032247 A1 | 2/2006 | Kates |
| 2006/0032248 A1 | 2/2006 | Kates |
| 2006/0032379 A1 | 2/2006 | Kates |
| 2006/0036349 A1 | 2/2006 | Kates |
| 2006/0041335 A9 | 2/2006 | Rossi et al. |
| 2006/0042276 A1 | 3/2006 | Doll et al. |
| 2006/0071089 A1 | 4/2006 | Kates |
| 2006/0074917 A1 | 4/2006 | Chand et al. |
| 2006/0097063 A1 | 5/2006 | Zeevi |
| 2006/0098576 A1 | 5/2006 | Brownrigg et al. |
| 2006/0117773 A1 | 6/2006 | Street et al. |
| 2006/0123807 A1 | 6/2006 | Sullivan et al. |
| 2006/0129339 A1 | 6/2006 | Bruno |
| 2006/0130500 A1 | 6/2006 | Gauthier et al. |
| 2006/0137368 A1 | 6/2006 | Kang et al. |
| 2006/0138866 A1 | 6/2006 | Bergmann et al. |
| 2006/0140209 A1 | 6/2006 | Cassiolato et al. |
| 2006/0151037 A1 | 7/2006 | Lepola et al. |
| 2006/0179854 A1 | 8/2006 | Esslinger |
| 2006/0185373 A1 | 8/2006 | Butler et al. |
| 2006/0196196 A1 | 9/2006 | Kates |
| 2006/0196197 A1 | 9/2006 | Kates |
| 2006/0201168 A1 | 9/2006 | Kates |
| 2006/0222507 A1 | 10/2006 | Jayanth |
| 2006/0235650 A1 | 10/2006 | Vinberg et al. |
| 2006/0238388 A1 | 10/2006 | Jayanth |
| 2006/0242200 A1 | 10/2006 | Horowitz et al. |
| 2006/0244641 A1 | 11/2006 | Jayanth et al. |
| 2006/0256488 A1 | 11/2006 | Benzing et al. |
| 2006/0259276 A1 | 11/2006 | Rossi et al. |
| 2006/0271589 A1 | 11/2006 | Horowitz et al. |
| 2006/0271623 A1 | 11/2006 | Horowitz et al. |
| 2006/0280627 A1 | 12/2006 | Jayanth |
| 2007/0002505 A1 | 1/2007 | Watanabe et al. |
| 2007/0006124 A1 | 1/2007 | Ahmed et al. |
| 2007/0027735 A1 | 2/2007 | Rokos |
| 2007/0067512 A1 | 3/2007 | Donaires et al. |
| 2007/0089434 A1 | 4/2007 | Singh et al. |
| 2007/0089435 A1 | 4/2007 | Singh et al. |

(56) References Cited

U.S. PATENT DOCUMENTS

| | | |
|---|---|---|
| 2007/0089438 A1 | 4/2007 | Singh et al. |
| 2007/0089439 A1 | 4/2007 | Singh et al. |
| 2007/0089440 A1 | 4/2007 | Singh et al. |
| 2007/0101750 A1 | 5/2007 | Pham et al. |
| 2007/0159978 A1 | 7/2007 | Anglin et al. |
| 2007/0186569 A1 | 8/2007 | Street et al. |
| 2007/0204635 A1 | 9/2007 | Tanaka et al. |
| 2007/0204921 A1 | 9/2007 | Alles |
| 2007/0205296 A1 | 9/2007 | Bell et al. |
| 2007/0229305 A1 | 10/2007 | Bonicatto et al. |
| 2007/0239894 A1 | 10/2007 | Thind et al. |
| 2008/0015797 A1 | 1/2008 | Kates |
| 2008/0016888 A1 | 1/2008 | Kates |
| 2008/0051945 A1 | 2/2008 | Kates |
| 2008/0058970 A1 | 3/2008 | Perumalsamy et al. |
| 2008/0078289 A1 | 4/2008 | Sergi et al. |
| 2008/0109185 A1 | 5/2008 | Cheung et al. |
| 2008/0114569 A1 | 5/2008 | Seigel |
| 2008/0121729 A1 | 5/2008 | Gray |
| 2008/0186898 A1 | 8/2008 | Petite |
| 2008/0209925 A1 | 9/2008 | Pham |
| 2008/0216494 A1 | 9/2008 | Pham et al. |
| 2008/0216495 A1 | 9/2008 | Kates |
| 2008/0223051 A1 | 9/2008 | Kates |
| 2008/0234869 A1 | 9/2008 | Yonezawa et al. |
| 2008/0315000 A1 | 12/2008 | Gorthala et al. |
| 2008/0319688 A1 | 12/2008 | Kim |
| 2009/0007777 A1 | 1/2009 | Cohen et al. |
| 2009/0030555 A1 | 1/2009 | Gray |
| 2009/0037142 A1 | 2/2009 | Kates |
| 2009/0038010 A1 | 2/2009 | Ma et al. |
| 2009/0055465 A1 | 2/2009 | DePue et al. |
| 2009/0057424 A1 | 3/2009 | Sullivan et al. |
| 2009/0057428 A1 | 3/2009 | Geadelmann et al. |
| 2009/0068947 A1 | 3/2009 | Petite |
| 2009/0071175 A1 | 3/2009 | Pham |
| 2009/0072985 A1* | 3/2009 | Patel et al. ............... 340/657 |
| 2009/0093916 A1 | 4/2009 | Parsonnet et al. |
| 2009/0096605 A1 | 4/2009 | Petite et al. |
| 2009/0099699 A1 | 4/2009 | Steinberg et al. |
| 2009/0106601 A1 | 4/2009 | Ngai et al. |
| 2009/0112672 A1 | 4/2009 | Flamig et al. |
| 2009/0119036 A1 | 5/2009 | Jayanth et al. |
| 2009/0125151 A1 | 5/2009 | Steinberg et al. |
| 2009/0140880 A1 | 6/2009 | Flen et al. |
| 2009/0151374 A1 | 6/2009 | Kasahara |
| 2009/0187281 A1 | 7/2009 | Kates |
| 2009/0215424 A1 | 8/2009 | Petite |
| 2009/0229469 A1 | 9/2009 | Campbell et al. |
| 2009/0241570 A1 | 10/2009 | Kuribayashi et al. |
| 2009/0296832 A1 | 12/2009 | Hunt |
| 2009/0324428 A1 | 12/2009 | Tolbert, Jr. et al. |
| 2010/0006042 A1 | 1/2010 | Pitonyak et al. |
| 2010/0011962 A1 | 1/2010 | Totsugi |
| 2010/0017465 A1 | 1/2010 | Brownrigg et al. |
| 2010/0039984 A1 | 2/2010 | Brownrigg |
| 2010/0044449 A1 | 2/2010 | Tessier |
| 2010/0070084 A1 | 3/2010 | Steinberg et al. |
| 2010/0070234 A1 | 3/2010 | Steinberg et al. |
| 2010/0070666 A1 | 3/2010 | Brindle |
| 2010/0078493 A1 | 4/2010 | Alles |
| 2010/0081357 A1 | 4/2010 | Alles |
| 2010/0081372 A1 | 4/2010 | Alles |
| 2010/0089076 A1 | 4/2010 | Schuster et al. |
| 2010/0102136 A1 | 4/2010 | Hadzidedic et al. |
| 2010/0168924 A1 | 7/2010 | Tessier et al. |
| 2010/0169030 A1 | 7/2010 | Parlos |
| 2010/0179703 A1 | 7/2010 | Singh et al. |
| 2010/0191487 A1 | 7/2010 | Rada et al. |
| 2010/0194582 A1 | 8/2010 | Petite |
| 2010/0214709 A1 | 8/2010 | Hall et al. |
| 2010/0217550 A1* | 8/2010 | Crabtree et al. ............... 702/62 |
| 2010/0250054 A1 | 9/2010 | Petite |
| 2010/0257410 A1 | 10/2010 | Cottrell et al. |
| 2010/0262299 A1 | 10/2010 | Cheung et al. |
| 2010/0265909 A1 | 10/2010 | Petite et al. |
| 2010/0280667 A1 | 11/2010 | Steinberg |
| 2010/0282857 A1 | 11/2010 | Steinberg |
| 2010/0287489 A1 | 11/2010 | Alles |
| 2010/0305718 A1 | 12/2010 | Clark et al. |
| 2010/0308119 A1 | 12/2010 | Steinberg et al. |
| 2010/0312881 A1 | 12/2010 | Davis et al. |
| 2010/0318227 A1 | 12/2010 | Steinberg et al. |
| 2010/0330985 A1 | 12/2010 | Addy |
| 2011/0004350 A1 | 1/2011 | Cheifetz et al. |
| 2011/0022429 A1 | 1/2011 | Yates et al. |
| 2011/0023045 A1 | 1/2011 | Yates et al. |
| 2011/0023945 A1 | 2/2011 | Hayashi et al. |
| 2011/0040785 A1 | 2/2011 | Steenberg et al. |
| 2011/0042541 A1 | 2/2011 | Spencer et al. |
| 2011/0045454 A1 | 2/2011 | McManus et al. |
| 2011/0054842 A1 | 3/2011 | Kates |
| 2011/0071960 A1 | 3/2011 | Singh |
| 2011/0077896 A1 | 3/2011 | Steinberg et al. |
| 2011/0083450 A1 | 4/2011 | Turner et al. |
| 2011/0102159 A1 | 5/2011 | Olson et al. |
| 2011/0103460 A1 | 5/2011 | Bonicatto |
| 2011/0106471 A1 | 5/2011 | Curtis et al. |
| 2011/0118905 A1 | 5/2011 | Mylaraswamy et al. |
| 2011/0121952 A1 | 5/2011 | Bonicatto et al. |
| 2011/0144932 A1 | 6/2011 | Alles |
| 2011/0166828 A1 | 7/2011 | Steinberg et al. |
| 2011/0181438 A1 | 7/2011 | Millstein et al. |
| 2011/0184563 A1 | 7/2011 | Foslien et al. |
| 2011/0185895 A1 | 8/2011 | Freen |
| 2011/0190910 A1 | 8/2011 | Lombard et al. |
| 2011/0212700 A1 | 9/2011 | Petite |
| 2011/0218957 A1 | 9/2011 | Coon et al. |
| 2011/0264324 A1 | 10/2011 | Petite et al. |
| 2011/0264409 A1 | 10/2011 | Jayanth et al. |
| 2011/0290893 A1 | 12/2011 | Steinberg |
| 2011/0307103 A1 | 12/2011 | Cheung et al. |
| 2011/0309953 A1 | 12/2011 | Petite et al. |
| 2011/0310929 A1 | 12/2011 | Petite et al. |
| 2011/0320050 A1 | 12/2011 | Petite et al. |
| 2012/0005590 A1 | 1/2012 | Lombard et al. |
| 2012/0054242 A1 | 3/2012 | Ferrara et al. |
| 2012/0065783 A1 | 3/2012 | Fadell et al. |
| 2012/0065935 A1 | 3/2012 | Steinberg et al. |
| 2012/0066168 A1 | 3/2012 | Fadell et al. |
| 2012/0075092 A1 | 3/2012 | Petite et al. |
| 2012/0092154 A1 | 4/2012 | Petite |
| 2012/0125559 A1 | 5/2012 | Fadell et al. |
| 2012/0125592 A1 | 5/2012 | Fadell et al. |
| 2012/0126019 A1 | 5/2012 | Warren et al. |
| 2012/0126020 A1 | 5/2012 | Filson et al. |
| 2012/0126021 A1 | 5/2012 | Warren et al. |
| 2012/0128025 A1 | 5/2012 | Huppi et al. |
| 2012/0130546 A1 | 5/2012 | Matas et al. |
| 2012/0130547 A1 | 5/2012 | Fadell et al. |
| 2012/0130548 A1 | 5/2012 | Fadell et al. |
| 2012/0130679 A1 | 5/2012 | Fadell et al. |
| 2012/0131504 A1 | 5/2012 | Fadell et al. |
| 2012/0143528 A1 | 6/2012 | Kates |
| 2012/0179300 A1 | 7/2012 | Warren et al. |
| 2012/0186774 A1 | 7/2012 | Matsuoka et al. |
| 2012/0191257 A1 | 7/2012 | Corcoran et al. |
| 2012/0199660 A1 | 8/2012 | Warren et al. |
| 2012/0203379 A1 | 8/2012 | Sloo et al. |
| 2012/0221150 A1 | 8/2012 | Arensmeier |
| 2012/0229521 A1 | 9/2012 | Hales, IV et al. |
| 2012/0232969 A1 | 9/2012 | Fadell et al. |
| 2012/0233478 A1 | 9/2012 | Mucignat et al. |
| 2012/0239207 A1 | 9/2012 | Fadell et al. |
| 2012/0239221 A1 | 9/2012 | Mighdoll et al. |
| 2012/0248210 A1 | 10/2012 | Warren et al. |
| 2012/0248211 A1 | 10/2012 | Warren et al. |
| 2012/0260804 A1 | 10/2012 | Kates |
| 2012/0265586 A1 | 10/2012 | Mammone |
| 2012/0271673 A1 | 10/2012 | Riley |
| 2013/0066479 A1 | 3/2013 | Shetty et al. |
| 2013/0287063 A1 | 10/2013 | Kates |
| 2014/0000290 A1 | 1/2014 | Kates |
| 2014/0000291 A1 | 1/2014 | Kates |

(56) References Cited

U.S. PATENT DOCUMENTS

| | | |
|---|---|---|
| 2014/0000292 A1 | 1/2014 | Kates |
| 2014/0000293 A1 | 1/2014 | Kates |
| 2014/0000294 A1 | 1/2014 | Kates |
| 2014/0012422 A1 | 1/2014 | Kates |
| 2014/0074730 A1 | 3/2014 | Arensmeier et al. |
| 2014/0266755 A1 | 9/2014 | Arensmeier et al. |

FOREIGN PATENT DOCUMENTS

| | | |
|---|---|---|
| CA | 2567264 A1 | 7/2007 |
| CH | 173493 A | 11/1934 |
| CN | 1133425 A | 10/1996 |
| CN | 1169619 A | 1/1998 |
| CN | 1297522 A | 5/2001 |
| CN | 1356472 A | 7/2002 |
| CN | 1742427 A | 3/2006 |
| CN | 1922445 A | 2/2007 |
| CN | 101270908 A | 9/2008 |
| CN | 101361244 A | 2/2009 |
| CN | 101821693 A | 9/2010 |
| DE | 842351 C | 6/1952 |
| DE | 764179 C | 4/1953 |
| DE | 1144461 B | 2/1963 |
| DE | 1403516 A1 | 10/1968 |
| DE | 1403467 A1 | 10/1969 |
| DE | 3118638 A1 | 5/1982 |
| DE | 3133502 A1 | 6/1982 |
| DE | 3422398 A1 | 12/1985 |
| DE | 29723145 U1 | 4/1998 |
| EP | 0060172 A1 | 9/1982 |
| EP | 0085246 A1 | 8/1983 |
| EP | 0124603 A1 | 11/1984 |
| EP | 0254253 A2 | 1/1988 |
| EP | 0346152 A2 | 12/1989 |
| EP | 0351272 A1 | 1/1990 |
| EP | 0351833 A2 | 1/1990 |
| EP | 0355255 A2 | 2/1990 |
| EP | 0361394 A2 | 4/1990 |
| EP | 0398436 A1 | 11/1990 |
| EP | 0410330 A2 | 1/1991 |
| EP | 0419857 A2 | 4/1991 |
| EP | 0432085 A2 | 6/1991 |
| EP | 0453302 A1 | 10/1991 |
| EP | 0479421 A1 | 4/1992 |
| EP | 0557023 A1 | 8/1993 |
| EP | 0579374 A1 | 1/1994 |
| EP | 0660213 A2 | 6/1995 |
| EP | 0747598 A2 | 12/1996 |
| EP | 0877462 A2 | 11/1998 |
| EP | 0982497 A1 | 3/2000 |
| EP | 1008816 A2 | 6/2000 |
| EP | 1087142 A2 | 3/2001 |
| EP | 1087184 A2 | 3/2001 |
| EP | 1138949 A2 | 10/2001 |
| EP | 1139037 A1 | 10/2001 |
| EP | 1187021 A2 | 3/2002 |
| EP | 1209427 A1 | 5/2002 |
| EP | 1241417 A1 | 9/2002 |
| EP | 1245912 A2 | 10/2002 |
| EP | 1245913 A1 | 10/2002 |
| EP | 1393034 A1 | 3/2004 |
| EP | 1435002 A1 | 7/2004 |
| EP | 1487077 A2 | 12/2004 |
| EP | 2180270 A1 | 4/2010 |
| FR | 2472862 A1 | 7/1981 |
| FR | 2582430 A1 | 11/1986 |
| FR | 2589561 A1 | 5/1987 |
| FR | 2628558 A1 | 9/1989 |
| FR | 2660739 A1 | 10/1991 |
| GB | 2062919 A | 5/1981 |
| GB | 2064818 A | 6/1981 |
| GB | 2075774 A | 11/1981 |
| GB | 2116635 A | 9/1983 |
| GB | 2229295 A | 9/1990 |
| JP | 56010639 A | 2/1981 |
| JP | 59145392 A | 8/1984 |
| JP | 61046485 A | 3/1986 |
| JP | 62116844 A | 5/1987 |
| JP | 63061783 A | 3/1988 |
| JP | 63302238 A | 12/1988 |
| JP | 01014554 A | 1/1989 |
| JP | 02110242 A | 4/1990 |
| JP | 02294580 A | 12/1990 |
| JP | 04080578 A | 3/1992 |
| JP | 06058273 A | 3/1994 |
| JP | 08021675 A | 1/1996 |
| JP | 08087229 A | 4/1996 |
| JP | 08284842 A | 10/1996 |
| JP | H08261541 A | 10/1996 |
| JP | 2000350490 A | 12/2000 |
| JP | 2002155868 A | 5/2002 |
| JP | 2003018883 A | 1/2003 |
| JP | 2003176788 A | 6/2003 |
| JP | 2004316504 A | 11/2004 |
| JP | 2005188790 A | 7/2005 |
| JP | 2005241089 A | 9/2005 |
| JP | 2005345096 A | 12/2005 |
| JP | 2006046219 A | 2/2006 |
| JP | 2006046519 A | 2/2006 |
| JP | 2006274807 A | 10/2006 |
| JP | 2009002651 A | 1/2009 |
| JP | 2010048433 A | 3/2010 |
| KR | 10-1998-0036844 A | 8/1998 |
| KR | 1020000000261 | 1/2000 |
| KR | 1020000025265 | 5/2000 |
| KR | 1020020041977 | 6/2002 |
| KR | 20040021281 A | 3/2004 |
| KR | 1020040021281 | 3/2004 |
| KR | 1020060020353 | 3/2006 |
| WO | 8601262 A1 | 2/1986 |
| WO | 8703988 A1 | 7/1987 |
| WO | 8705097 A1 | 8/1987 |
| WO | 8802527 A1 | 4/1988 |
| WO | 8806703 A1 | 9/1988 |
| WO | 9718636 A2 | 5/1997 |
| WO | 9748161 A1 | 12/1997 |
| WO | 9917066 A1 | 4/1999 |
| WO | 9961847 A1 | 12/1999 |
| WO | 9965681 A1 | 12/1999 |
| WO | 0021047 A1 | 4/2000 |
| WO | 0051223 A1 | 8/2000 |
| WO | 0169147 A1 | 9/2001 |
| WO | 0214968 A1 | 2/2002 |
| WO | 0249178 A2 | 6/2002 |
| WO | 02075227 A1 | 9/2002 |
| WO | 02/090840 A2 | 11/2002 |
| WO | 02/090913 A1 | 11/2002 |
| WO | 02090914 A1 | 11/2002 |
| WO | 03031996 A1 | 4/2003 |
| WO | 03090000 A1 | 10/2003 |
| WO | 2004049088 A1 | 6/2004 |
| WO | 2005022049 A2 | 3/2005 |
| WO | 2005065355 A2 | 7/2005 |
| WO | 2005073686 A1 | 8/2005 |
| WO | 2005108882 A2 | 11/2005 |
| WO | 2006023075 A2 | 3/2006 |
| WO | 2006025880 A1 | 3/2006 |
| WO | 2006091521 A2 | 8/2006 |
| WO | 2008010988 A1 | 1/2008 |
| WO | 2008144864 A1 | 12/2008 |
| WO | 2009058356 A1 | 5/2009 |
| WO | 2009061370 A1 | 5/2009 |
| WO | 2010138831 A2 | 12/2010 |
| WO | 2011069170 A1 | 6/2011 |
| WO | 2012092625 A2 | 7/2012 |
| WO | 2012118550 A1 | 9/2012 |

OTHER PUBLICATIONS

Tamarkin, Tom D., "Automatic Meter Reading," Public Power magazine, vol. 50, No. 5, Sep.-Oct. 1992, http://www.energycite.com/news/amr.html, 6 pages.

(56) References Cited

OTHER PUBLICATIONS

Palani, M. et al, Monitoring the Performance of a Residential Central Air Conditioner under Degraded Conditions on a Test Bench, ESL-TR-92/05-05, May 1992.
European Search Report for EP 82306809.3; Apr. 28, 1983; 1 Page.
European Search Report for EP 91 30 3518; Jul. 22, 1991; 1 Page.
European Search Report for EP 93 30 4470; Oct. 26, 1993; 1 Page.
European Search Report for EP 96 30 4219; Dec. 1, 1998; 2 Pages.
International Search Report; International Application No. PCT/US98/18710; Jan. 26, 1999; 1 Page.
European Search Report for EP 94 30 3484; Apr. 3, 1997; 1 Page.
European Search Report for EP 98 30 3525; May 28, 1999; 2 Pages.
European Search Report for EP 99 30 6052; Dec. 28, 1999; 3 Pages.
European Search Report for EP 01 30 7547; Feb. 20, 2002; 1 Page.
European Search Report for Application No. EP 01 30 1752, dated Mar. 26, 2002.
International Search Report, International Application No. PCT/US02/13456, dated Aug. 22, 2002, 2 Pages.
International Search Report for PCT/US02/13459; ISA/US; date mailed Sep. 19, 2002.
European Search Report for Application No. EP 02 25 1531, dated Sep. 30, 2002.
Office Action regarding U.S. Appl. No. 09/977,552, dated Jan. 14, 2003.
Written Opinion regarding PCT/US02/13459, dated Apr. 23, 2003.
Final Office Action regarding U.S. Appl. No. 09/977,552, dated Jun. 18, 2003.
International Preliminary Examination Report regarding PCT/US02/13456, dated Sep. 15, 2003.
Office Action regarding U.S. Appl. No. 10/061,964, dated Oct. 3, 2003.
Response to Rule 312 Communication regarding U.S. Appl. No. 09/977,552, dated Oct. 31, 2003.
Office Action regarding U.S. Appl. No. 09/977,552, dated Dec. 3, 2003.
Final Office Action regarding U.S. Appl. No. 09/977,552, dated Apr. 26, 2004.
Office Action regarding U.S. Appl. No. 10/286,419, dated Jun. 10, 2004.
European Search Report for EP 02 72 9050, Jun. 17, 2004, 2 pages.
Supplementary European Search Report for EP 02 73 1544, Jun. 18, 2004, 2 Pages.
Notice of Allowance regarding U.S. Appl. No. 10/061,964, dated Jul. 19, 2004.
International Search Report, International Application No. PCT/US04/13384; Dated Aug. 1, 2004; 1 Page.
International Search Report, International Application No. PCT/US2004/027654, dated Aug. 25, 2004, 4 Pages.
Office Action regarding U.S. Appl. No. 10/675,137, dated Sep. 7, 2004.
Office Action regarding U.S. Appl. No. 09/977,552, dated Oct. 18, 2004.
Notice of Allowance and Notice of Allowability regarding U.S. Appl. No. 10/286,419, dated Dec. 2, 2004.
Office Action regarding U.S. Appl. No. 10/675,137, dated Feb. 4, 2005.
European Search Report regarding Application No. EP02729051, dated Feb. 17, 2005.
Office Action regarding U.S. Appl. No. 10/675,137, dated Jun. 29, 2005.
Restriction Requirement regarding U.S. Appl. No. 10/940,877, dated Jul. 25, 2005.
International Search Report for International Application No. PCT/US2005/11154, dated Oct. 19, 2005.
Office Action dated Oct. 27, 2005 from Related U.S. Appl. No. 10/916,223.
Office Action dated Nov. 9, 2005 from Related U.S. Appl. No. 11/130,562.
Office Action dated Nov. 9, 2005 from Related U.S. Appl. No. 11/130,601.
Advisory Action Before the Filing of an Appeal Brief regarding U.S. Appl. No. 09/977,552, dated Nov. 10, 2005.
Office Action regarding U.S. Appl. No. 10/940,877, dated Nov. 14, 2005.
Notice of Allowance and Notice of Allowability regarding U.S. Appl. No. 10/675,137, dated Dec. 16, 2005.
First Examination Communication regarding European Application No. EP02729051.9, dated Dec. 23, 2005.
Office Action dated Jan. 6, 2006 from Related U.S. Appl. No. 11/130,562.
Office Action dated Jan. 6, 2006 from Related U.S. Appl. No. 10/916,222.
Office Action dated Jan. 18, 2006 from Related U.S. Appl. No. 11/130,601.
Examiner's First Report on Australian Patent Application No. 2002259066, dated Mar. 1, 2006.
International Search Report for International Application No. PCT/US04/43859, dated Mar. 2, 2006.
Office Action dated Feb. 15, 2008 from Related U.S. Appl. No. 11/417,557.
Examiner Interview Summary regarding U.S. Appl. No. 10/940,877, dated Mar. 25, 2008.
Office Action regarding U.S. Appl. No. 11/337,918, dated Mar. 25, 2008.
Office Action regarding U.S. Appl. No. 11/098,575, dated Mar. 26, 2008.
First Office Action issued by the Chinese Patent Office on May 30, 2008 regarding Application No. 200580013451.8.
Office Action regarding U.S. Appl. No. 11/120,166, dated Jun. 5, 2008.
Office Action regarding U.S. Appl. No. 10/940,877, dated Jun. 5, 2008.
Office Action dated Jul. 1, 2008 from Related U.S. Appl. No. 11/927,425.
Office Action regarding U.S. Appl. No. 11/098,582, dated Jul. 7, 2008.
Office Action dated Jul. 24, 2008 from Related U.S. Appl. No. 11/417,557.
International Search Report from PCT /US2008/060900, Aug. 4, 2008, 6 pages.
First Office Action issued by the Chinese Patent Office for Application No. 200480015875.3, dated Sep. 5, 2008.
Office Action regarding U.S. Appl. No. 11/098,575, dated Sep. 9, 2008.
Examiner Interview regarding U.S. Appl. No. 11/256,641, dated Sep. 16, 2008.
Final Office Action regarding U.S. Appl. No. 09/977,552, dated Oct. 22, 2008.
Office Action regarding U.S. Appl. No. 11/337,918, dated Oct. 28, 2008.
Notice of Allowance dated Nov. 3, 2008 from Related U.S. Appl. No. 11/417,701.
Non-Final Office Action regarding U.S. Appl. No. 11/214,179, dated Nov. 5, 2008.
Examiner Interview Summary regarding U.S. Appl. No. 10/940,877, dated Dec. 8, 2008.
International Search Report for International Application No. PCT/US2008/009618, dated Dec. 8, 2008.
Office Action regarding U.S. Appl. No. 10/940,877, dated Dec. 8, 2008.
First Official Report regarding Australian Patent Application No. 2007214381, dated Dec. 12, 2008.
Office Action regarding U.S. Appl. No. 11/120,166, dated Dec. 15, 2008.
Office Action for U.S. Appl. No. 11/497,644, dated Dec. 19, 2008.
Office Action dated Jan. 18, 2006 from Related U.S. Appl. No. 11/130,871.
Office Action regarding U.S. Appl. No. 11/098,575, dated Jan. 29, 2009.
Final Office Action regarding U.S. Appl. No. 11/256,641, dated Feb. 2, 2009.
Office Action dated Feb. 3, 2009 from Related U.S. Appl. No. 11/866,295.

(56) References Cited

OTHER PUBLICATIONS

International Search Report for International Application No. PCT/US2008/012362, dated Feb. 12, 2009.
Office Action dated Feb. 13, 2009 from Related U.S. Appl. No. 12/033,765.
Office Action dated Feb. 13, 2009 from Related U.S. Appl. No. 12/050,821.
Notice of Allowance and Fees Due and Notice of Allowability regarding U.S. Appl. No. 11/098,582, dated Feb. 24, 2009.
Second Office Action issued by the Chinese Patent Office for Application No. 200480015875.3, dated Feb. 27, 2009.
Second Office Action issued by the Chinese Patent Office on Mar. 6, 2009 regarding Application No. 200580013451.8.
International Preliminary Report on Patentability regarding International Application No. PCT/US2007/019563 dated Mar. 10, 2009.
Written Opinion of the International Searching Authority for International Application No. PCT/US2008/012364 dated Mar. 12, 2009.
International Search Report for International Application No. PCT/US2008/012364 dated Mar. 13, 2009.
Office Action dated May 6, 2009 from Related U.S. Appl. No. 11/830,729.
Notice of Allowance and Fees Due and Notice of Allowability regarding U.S. Appl. No. 11/256,641, dated May 19, 2009.
Final Office Action regarding U.S. Appl. No. 11/214,179, dated May 29, 2009.
Office Action dated Jun. 17, 2009 from Related U.S. Appl. No. 12/033,765.
Office Action dated Jun. 19, 2009 from Related U.S. Appl. No. 11/866,295.
Second Office action issued by the Chinese Patent Office dated Jun. 19, 2009 regarding Application No. 200510005907.8, translation provided by CCPIT Patent and Trademark Law Office.
Office Action for U.S. Appl. No. 11/497,644, dated Jul. 10, 2009.
Office Action regarding U.S. Appl. No. 11/098,575, dated Jul. 13, 2009.
Office Action regarding U.S. Appl. No. 11/120,166, dated Jul. 20, 2009.
Notice of Panel Decision from Pre-Appeal Brief Review regarding U.S. Appl. No. 09/977,552, dated Aug. 4, 2009.
Office Action regarding U.S. Appl. No. 11/337,918, dated Aug. 17, 2009.
Advisory Action regarding U.S. Appl. No. 11/214,179, dated Aug. 28, 2009.
Notice of Allowance regarding U.S. Appl. No. 10/940,877, dated Sep. 4, 2009.
Non-Final Office Action for U.S. Appl. No. 12/054,011, dated Oct. 20, 2011.
Office Action regarding U.S. Appl. No. 12/261,643, dated Nov. 2, 2011.
Notice of Allowance and Fees Due, Interview Summary and Notice of Allowability regarding U.S. Appl. No. 11/214,179, dated Nov. 23, 2011.
Fourth Office Action from the State Intellectual Property Office of People's Republic of China regarding Chinese Patent Application No. 200510005907.8, dated Dec. 8, 2011. Translation provided by Unitalen Attorneys at Law.
Notice of Allowance regarding U.S. Appl. No. 12/261,677, dated Dec. 15, 2011.
Examiner's First Report on Australian Patent Application No. 2007292917 dated Jan. 10, 2012.
Non-Final Office Action in U.S. Appl. No. 12/685,375, mailed Jan. 19, 2012.
Office Action regarding U.S. Appl. No. 12/261,643, dated Feb. 15, 2012.
Examiner's Report No. 2 regarding Australian Patent Application No. 2008325240, dated Mar. 5, 2012.
Issue Notification regarding U.S. Appl. No. 11/214,179, dated Mar. 14, 2012.
Non-Final Office Action for U.S. Appl. No. 11/776,879, dated Mar. 16, 2012.
Office Action regarding U.S. Appl. No. 13/303,286, dated Mar. 26, 2012.
Non-Final Office Action for U.S. Appl. No. 12/054,011, dated Apr. 10, 2012.
Non-Final office Action regarding U.S. Appl. No. 11/850,846, dated Apr. 24, 2012.
First Office Action regarding Chinese Patent Application No. 200910211779.0, dated May 3, 2012. English translation provided by Unitalen Attorneys at Law.
International Preliminary Report on Patentability regarding Application No. PCT/US2010/056315, mailed May 24, 2012.
Non-Final Office Action regarding U.S. Appl. No. 13/176,021, dated May 8, 2012.
Non-Final Office Action regarding U.S. Appl. No. 13/435,543, dated Jun. 21, 2012.
Final Office Action regarding U.S. Appl. No. 12/261,643, dated Jun. 27, 2012.
Notice of Allowance regarding U.S. Appl. No. 11/776,879, dated Jul. 9, 2012.
Notice of Allowance regarding U.S. Appl. No. 13/303,286, dated Jul. 19, 2012.
Patent Examination Report No. 3 regarding Australian Patent Application No. 2008325240, dated Jul. 19, 2012.
Non-Final Office Action for U.S. Appl. No. 12/685,375, mailed Aug. 6, 2012.
Final Office Action for U.S. Appl. No. 11/850,846, mailed Aug. 13, 2012.
European Search Report regarding Application No. 04022784.5-2315 / 1500821, dated Aug. 14, 2012.
Non-Final Office Action regarding U.S. Appl. No. 12/955,355, dated Sep. 11, 2012.
Notice of Allowance and Fee(s) Due regarding U.S. Appl. No. 12/789,562, dated Oct. 26, 2012.
European Search Report for Application No. EP 12 182 243.1, dated Oct. 29, 2012.
Extended European Search Report regarding Application No. 12182243.1-2311, dated Oct. 29, 2012.
Non-Final Office Action for U.S. Appl. No. 13/030,549, dated Nov. 5, 2012.
Notification of First Office Action from the State Intellectual Property Office of People's Republic of China regarding Chinese Patent Application No. 200880122964.6, dated Nov. 5, 2012. Translation provided by Unitalen Attorneys at Law.
Record of Oral Hearing regarding U.S. Appl. No. 09/977,552, dated Nov. 29, 2012.
Non-Final Office Action regarding U.S. Appl. No. 12/943,626, dated Dec. 20, 2012.
First Examination Report regarding Australian Patent Application No. 2010319488, dated Jan. 10, 2013.
Second Office Action regarding Chinese Patent Application No. 200910211779.0, dated Feb. 4, 2013. English translation provided by Unitalen Attorneys at Law.
Non-Final Office Action regarding U.S. Appl. No. 12/261,643, dated Mar. 12, 2013.
International Search Report regarding Application No. PCT/US2013/021161, mailed May 8, 2013.
Written Opinion of the International Searching Authority regarding Application No. PCT/US2013/021161, mailed May 8, 2013.
Non-Final Office Action in U.S. Appl. No. 11/850,846, mailed May 24, 2013.
Non-Final Office Action in U.S. Appl. No. 13/784,890, mailed Jun. 11, 2013.
Non-Final Office Action regarding U.S. Appl. No. 13/770,123, dated Jul. 3, 2013.
First Office Action regarding Canadian Patent Application No. 2,777,349, dated Jul. 19, 2013.
Third Office Action regarding Chinese Patent Application No. 200910211779.0, dated Sep. 4, 2013. English translation provided by Unitalen Attorneys at Law.
Final Office Action regarding U.S. Appl. No. 12/261,643, dated Sep. 16, 2013.
First Examination Report regarding Australian Patent Application No. 2012241185, dated Sep. 27, 2013.

(56) References Cited

OTHER PUBLICATIONS

Notice of Grounds for Refusal regarding Korean Patent Application No. 10-2009-7000850, mailed Oct. 4, 2013. English translation provided by Y.S. Chang & Associates.
Final Office Action regarding U.S. Appl. No. 13/770,123, dated Nov. 15, 2013.
First Office Action regarding Chinese Patent Application No. 201110349785.X, dated Nov. 21, 2013, and Search Report. English translation provided by Unitalen Attorneys at Law.
Advisory Action regarding U.S. Appl. No. 12/261,643, dated Nov. 22, 2013.
Non-Final Office Action regarding U.S. Appl. No. 13/932,611, mailed Nov. 25, 2013.
Office Action regarding U.S. Appl. No. 13/737,566, dated Dec. 20, 2013.
Final Office Action regarding U.S. Appl. No. 13/784,890, mailed Dec. 30, 2013.
Fourth Office Action regarding Chinese Patent Application No. 200910211779.0, dated Jan. 6, 2014. English translation provided by Unitalen Attorneys at Law.
European Search Report regarding Application No. 07811712.4-1608 / 2069638 PCT/US2007019563, dated Jan. 7, 2014.
Non-Final Office Action regarding U.S. Appl. No. 13/770,479, dated Jan. 16, 2014.
Final Office Action regarding U.S. Appl. No. 11/850,846, mailed Jan. 17, 2014.
International Search Report for PCT/US2012/026973, Sep. 3, 2012, 5 pages.
International Search Report for PCT/US2013/061389, Jan. 22, 2014, 7 pages.
Non Final Office Action from related U.S. Appl. No. 13/269,188 dated Oct. 4, 2013; 11 pages.
Restriction from related U.S. Appl. No. 13/269,188 dated Apr. 9, 2013; 5 pages.
Non Final Office Action from related U.S. Appl. No. 13/269,188 dated Aug. 14, 2012; 9 pages.
Non Final Office Action from related U.S. Appl. No. 13/269,188 dated Jul. 17, 2014; 10 pages.
Non Final Office Action from related U.S. Appl. No. 13/269,188 dated Feb. 20, 2014; 9 pages.
Final Office Action from related U.S. Appl. No. 13/269,188 dated May 23, 2013; 11 pages.
Non Final Office Action from related U.S. Appl. No. 13/767,479 dated Oct. 24, 2013; 8 pages.
Final Office Action from related U.S. Appl. No. 13/767,479 dated Mar. 14, 2014; 6 pages.
Non Final Office Action from related U.S. Appl. No. 13/835,742 dated Oct. 7, 2013; 9 pages.
Notice of Allowance from related U.S. Appl. No. 13/835,742 dated Jan. 31, 2014; 7 pages.
Notice of Allowance from related U.S. Appl. No. 13/835,742 dated Jun. 2, 2014; 8 pages.
Non Final Office Action from related U.S. Appl. No. 13/835,810 dated Nov. 15, 2013; 9 pages.
Notice of Allowance from related U.S. Appl. No. 13/835,810 dated Mar. 20, 2014; 9 pages.
Non Final Office Action from related U.S. Appl. No. 13/835,621 dated Oct. 30, 2013; 8 pages.
Non Final Office Action from related U.S. Appl. No. 13/835,621 dated Apr. 2, 2014; 11 pages.
Non Final Office Action from related U.S. Appl. No. 13/836,043 dated Oct. 23, 2013; 8 pages.
Final Office Action from related U.S. Appl. No. 13/836,043 dated Mar. 12, 2014; 5 pages.
Non Final Office Action from related U.S. Appl. No. 13/836,043 dated Jul. 11, 2014; 5 pages.
Non Final Office Action from related U.S. Appl. No. 13/836,244 dated Oct. 15, 2013; 11 pages.
Non Final Office Action from related U.S. Appl. No. 13/836,244 dated Feb. 20, 2014; 10 pages.
Notice of Allowance from related U.S. Appl. No. 13/836,244 dated Jul. 2, 2014; 8 pages.
Non Final Office Action from related U.S. Appl. No. 13/836,453 dated Aug. 20, 2013; 8 pages.
Notice of Allowance from related U.S. Appl. No. 13/836,453 dated Jan. 14, 2014; 8 pages.
Notice of Allowance from related U.S. Appl. No. 13/836,453 dated Apr. 21, 2014; 8 pages.
Non Final Office Action from related U.S. Appl. No. 13/369,067 dated Jan. 16, 2014; 16 pages.
Final Office Action from related U.S. Appl. No. 13/369,067 dated May 1, 2014; 19 pages.
Non Final Office Action from related U.S. Appl. No. 13/767,479 dated Jul. 23, 2014; 9 pages.
Final Office Action regarding U.S. Appl. No. 13/932,611, mailed May 28, 2014.
Supplementary European Search Report regarding Application No. EP 07 81 1712, dated Jan. 7, 2014.
Notice of Allowance and Fees Due regarding U.S. Appl. No. 13/737,566, dated Jun. 18, 2014.
Notice of Allowance and Fees Due regarding U.S. Appl. No. 12/943,626, dated Jun. 19, 2014.
Notice of Allowance and Fees Due regarding U.S. Appl. No. 12/261,643, dated Jun. 23, 2014.
Extended European Search Report regarding Application No. 07796879.0-1602 / 2041501 PCT/US2007016135, dated Jul. 14, 2014.
Interview Summary from related U.S. Appl. No. 12/054,011 dated Jan. 30, 2012.
Written Opinion from related PCT Application No. PCT/US2014/028074 mailed Jun. 19, 2014.
Advisory Action from related U.S. Appl. No. 13/784,890 dated Mar. 14, 2014.
International Search Report from related PCT Application No. PCT/US2014/028074 mailed Jun. 19, 2014.
Examiner's Answer from related U.S. Appl. No. 13/784,890 dated Jul. 3, 2014.
Notice of Allowance from related U.S. Appl. No. 13/836,453 dated Aug. 4, 2014.
Non Final Office Action for related U.S. Appl. No. 13/835,621 dated Aug. 8, 2014.
Jeffus, Larry, "Refrigeration and Air Conditioning: An Introduction to HVAC/R," Section II, Chapter 6, p. 322, Copyright 2004.
Reh, F. John, "Cost Benefit Analysis", http://management.about.com/cs/money/a/CostBenefit.htm, Dec. 8, 2003.
"Air Conditioning Equipment and Diagnostic Primer," Field Diagnostic Services, Inc., Sep. 9, 2002.
Udelhoven, Darrell, "Optimizing Air Conditioning Efficiency TuneUp Optimizing the Condenser Output, Seer, Air, HVAC Industry," http://www.udarrell.com/air-conditioning-efficiency.html, Jul. 19, 2002, 13 pages.
Flow & Level Measurement: Mass Flowmeters, http://www.omega.com/literature/transactions/volume4/T9904-10-MASS.html, 2001, 19 pages.
Palani, M. et al, The Effect of Reduced Evaporator Air Flow on the Performance of a Residential Central Air Conditioner, ESL-HH-92-05-04, Energy Systems Laboratory, Mechanical Engineering Department, Texas A&M University, Eighth Symposium on Improving Building System in Hot and Humid Climates, May 13-14, 1992.
International Search Report; International Application No. PCT/IB96/01435; May 23, 1997; 1 Page.
European Search Report for EP 02 25 0266; May 17, 2002; 3 Pages.
Final Office Action regarding U.S. Appl. No. 10/061,964, dated Mar. 8, 2004.
Office Action regarding U.S. Appl. No. 10/698,048, dated Mar. 21, 2005.
Office Action dated May 4, 2005 from Related U.S. Appl. No. 10/916,223.
Final Office Action regarding U.S. Appl. No. 09/977,552, dated May 13, 2005.
Notice of Allowance for U.S. Appl. No. 10/698,048, dated Sep. 1, 2005.

(56) References Cited

OTHER PUBLICATIONS

Office Action dated Nov. 8, 2005 from Related U.S. Appl. No. 10/916,222.
Office Action dated Nov. 9, 2005 from Related U.S. Appl. No. 11/130,871.
Notice of Allowance dated May 29, 2007 from Related U.S. Appl. No. 11/130,569.
Office Action dated Aug. 21, 2007 from Related U.S. Appl. No. 11/417,557.
Office Action regarding U.S. Appl. No. 11/256,641, dated Apr. 29, 2008.
Office Action dated Jul. 16, 2008 from Related U.S. Appl. No. 11/417,701.
Written Opinion of International Searching Authority for International Application No. PCT/US2008/009618, dated Dec. 8, 2008.
Office Action for U.S. Appl. No. 11/394,380, dated Jan. 6, 2009.
Interview Summary regarding U.S. Appl. No. 11/214,179, dated Jan. 30, 2009.
Final Office Action regarding U.S. Appl. No. 10/940,877, dated Apr. 27, 2009.
Third Office Action issued by the Chinese Patent Office on Jun. 19, 2009 regarding Application No. 200580013451.8, translated by CCPIT Patent and Trademark Law Office.
Office Action regarding U.S. Appl. No. 11/098,582, dated Aug. 4, 2009.
Advisory Action Before the Filing of An Appeal Brief regarding U.S. Appl. No. 11/098,575, dated Nov. 16, 2009.
International Preliminary Report on Patentability for International Application No. PCT/US2008/009618, dated Mar. 24, 2010.
Examiner Interview Summary regarding U.S. Appl. No. 11/394,380, dated Jul. 29, 2010.
Final Office Action regarding U.S. Appl. No. 11/497,644, dated Dec. 22, 2010.
International Search Report regarding Application No. PCT/US2010/036601, mailed Dec. 29, 2010.
Non-Final Office Action regarding U.S. Appl. No. 13/770,123, dated Jun. 11, 2014.
Notice of Allowance for related U.S. Appl. No. 13/835,810 dated Aug. 5, 2014.
Non Final Office Action for related U.S. Appl. No. 13/369,067 dated Aug. 12, 2014.
International Search Report regarding Application No. PCT/US2012/026973, dated Sep. 3, 2012.
Written Opinion of the International Searching Authority regarding Application No. PCT/US2012/026973, dated Sep. 3, 2012.
Office Action dated Mar. 30, 2006 from Related U.S. Appl. No. 11/130,569.
Office Action dated Apr. 19, 2006 from Related U.S. Appl. No. 10/916,223.
Final Office Action regarding U.S. Appl. No. 10/940,877, dated May 2, 2006.
Office Action dated Jun. 22, 2009 from Related U.S. Appl. No. 12/050,821.
Second Examination Communication regarding European Application No. EP02729051.9, dated Jul. 3, 2006.
Office Action dated Jul. 11, 2006 from Related U.S. Appl. No. 11/130,562.
Office Action dated Jul. 11, 2006 from Related U.S. Appl. No. 10/916,222.
Office Action regarding U.S. Appl. No. 09/977,552, dated Jul. 12, 2006.
Notice of Allowance dated Jul. 13, 2006 from Related U.S. Appl. No. 11/130,601.
Office Action dated Jul. 27, 2006 from Related U.S. Appl. No. 11/130,871.
Office Action regarding U.S. Appl. No. 11/120,166, dated Oct. 2, 2006.
Office Action regarding U.S. Appl. No. 10/940,877, dated Oct. 27, 2006.
Office Action dated Nov. 14, 2006 from Related U.S. Appl. No. 11/130,569.
Office Action dated Nov. 16, 2006 from Related U.S. Appl. No. 10/916,223.
Office Action dated Jan. 23, 2007 from Related U.S. Appl. No. 10/916,222.
Election/Restriction Requirement regarding U.S. Appl. No. 09/977,552, dated Jan. 25, 2007.
Office Action dated Feb. 1, 2007 from Related U.S. Appl. No. 11/130,562.
First Office Action received from the Chinese Patent Office dated Feb. 2, 2007 regarding Application No. 200480011463.2, translated by CCPIT Patent and Trademark Law Office.
Notice of Allowance dated Feb. 12, 2007 from Related U.S. Appl. No. 11/130,871.
International Search Report, International Application No. PCT/US2006/040964, dated Feb. 15, 2007, 2 Pages.
Examiner Interview Summary regarding U.S. Appl. No. 10/940,877, dated Mar. 2, 2007.
Office Action regarding U.S. Appl. No. 11/120,166, dated Apr. 12, 2007.
Office Action Communication regarding U.S. Appl. No. 09/977,552, dated Apr. 18, 2007.
Notice of Allowance dated May 2, 2007 from Related U.S. Appl. No. 11/130,569.
Office Action regarding U.S. Appl. No. 10/940,877, dated May 21, 2007.
First Office Action from the Patent Office of the People's Republic of China dated Jun. 8, 2007, Application No. 200480027753.6 and Translation provided by CCPIT.
Notice of Allowance dated Jun. 11, 2007 from Related U.S. Appl. No. 10/916,222.
Office Action dated Jun. 27, 2007 from Related U.S. Appl. No. 11/417,557.
First Office Action from the Patent Office of the People's Republic of China regarding Application No. 200510005907.8, dated Jun. 29, 2007.
Office Action dated Jul. 11, 2007 from Related U.S. Appl. No. 11/417,609.
Office Action dated Jul. 11, 2007 from Related U.S. Appl. No. 11/417,701.
European Search Report for Application No. EP 04 81 5853, dated Jul. 17, 2007.
European Search Report for Application No. EP 06 02 6263, dated Jul. 17, 2007.
Final Office Action regarding U.S. Appl. No. 09/977,552, dated Jul. 23, 2007.
Notice of Allowance dated Jul. 25, 2007 from Related U.S. Appl. No. 10/916,223.
Office Action dated Aug. 17, 2007 from Related U.S. Appl. No. 11/417,609.
Office Action dated Aug. 17, 2007 from Related U.S. Appl. No. 11/417,701.
Office Action dated Sep. 18, 2007 from Related U.S. Appl. No. 11/130,562.
Office Action regarding U.S. Appl. No. 11/098,582, dated Sep. 21, 2007.
International Search Report and Written Opinion of the International Searching Authority regarding International Application No. PCT/US06/33702, dated Sep. 26, 2007.
International Search Report, Int'l. App. No. PCT/US 06/05917, dated Sep. 26, 2007.
Written Opinion of the International Searching Authority, Int'l. App. No. PCT/US 06/05917, dated Sep. 26, 2007.
Office Action regarding U.S. Appl. No. 11/120,166, dated Oct. 2, 2007.
International Search Report for International Application No. PCT/US2007/016135 dated Oct. 22, 2007.
Notice of Allowance dated Oct. 26, 2007 from Related U.S. Appl. No. 10/916,223.
Final Office Action regarding U.S. Appl. No. 10/940,877, dated Nov. 13, 2007.

(56) References Cited

OTHER PUBLICATIONS

Notice of Allowance dated Dec. 3, 2007 from Related U.S. Appl. No. 11/130,562.
Notice of Allowance dated Dec. 21, 2007 from Related U.S. Appl. No. 11/417,609.
International Search Report for International Application No. PCT/US07/019563, dated Jan. 15, 2008, 3 Pages.
Written Opinion of the International Searching Authority regarding International Application No. PCT/US2007/019563, dated Jan. 15, 2008.
International Search Report and Written Opinion of the ISA regarding International Application No. PCT/ US2014/032927, ISA/KR dated Aug. 21, 2014.
Notice of Allowance for related U.S. Appl. No. 13/836,043, dated Oct. 9, 2014.
Notice of Allowance for related U.S. Appl. No. 13/836,244, dated Oct. 30, 2014.
Office Action for related U.S. Appl. No. 13/269,188, dated Oct. 6, 2014.
Office Action for related U.S. Appl. No. 13/767,479, dated Oct. 21, 2014.
International Search Report and Written Opinion for related PCT Application No. PCT/US2014/028859, dated Aug. 22, 2014.
Notice of Allowance and Fees Due regarding U.S. Appl. No. 13/737,566, dated Sep. 24, 2014.
Second Office Action from the State Intellectual Property Office of People's Republic of China regarding Chinese Patent Application No. 201110349785.X, dated Jul. 25, 2014. Translation provided by Unitalen Attorneys at Law.
Examiner's Report No. 1 regarding Australian Patent Application No. 2013202431, dated Nov. 25, 2014.
Patent Examination Report for Austrialian Application No. 2012223466 dated Jan. 6, 2015.
Notice of Allowance for U.S. Appl. No. 13/835,742 dated Dec. 24, 2014.
Notice of Allowance for U.S. Appl. No. 13/835,810 date Jan. 2, 2015.
Notice of Allowance for U.S. Appl. No. 13/836,453 dated Dec. 24, 2014.
Office Action for U.S. Appl. No. 13/835,621 dated Dec. 29, 2014.
Final Office Action for U.S. Appl. No. 13/770,123 dated Dec. 22, 2014.
Notice of Allowance for U.S. Appl. No. 13/836,043 dated Feb. 4, 2015.
Office Action for U.S. Appl. No. 13/767,479 dated Feb. 6, 2015.
Office Action for U.S. Appl. No. 13/269,188 dated Feb. 10, 2015.
Office Action for Canadian Application No. 2,828,740 dated Jan. 12, 2015.
Third Chinese Office Action regarding Application No. 201110349785.X, dated Jan. 30, 2015. Translation provided by Unitalen Attorneys at Law.
Non-Final Office Action regrding U.S. Appl. No. 13/932,611, dated Jan. 30, 2015.
Notice of Allowance regarding U.S. Appl. No. 13/835,621, dated Mar. 10, 2015.
Interview Summary regarding U.S. Appl. No. 13/269,188, mailed Mar. 18, 2015.
Office Action regarding U.S. Appl. No. 13/770,479, mailed Mar. 16, 2015.
Office Action regarding U.S. Appl. No. 13/770,123, mailed Apr. 2, 2015.
Notice of Allowance regarding U.S. Appl. No. 13/767,479, dated Mar. 31, 2015.
Office Action from U.S. Appl. No. 13/369,067 dated Apr. 3, 2015.
Haiad et al., "EER & SEER as Predictors of Seasonal Energy Performance", Oct. 2004, Southern California Edison, http://www.doe2.com/download/DEER/SEER%2BProgThermostats/EER-SEER_CASE_ProjectSummary_Oct2004_V6a.pdf.
Notice of Allowance regarding U.S. Appl. No. 13/835,742, mailed Apr. 17, 2015.
Notice of Allowance regarding U.S. Appl. No. 13/836,453, mailed Apr. 15, 2015.
Advisory Action regarding U.S. Appl. No. 13/269,188, dated Apr. 13, 2015.
U.S. Office Action regarding U.S. Appl. No. 13/269,188, dated May 8, 2015.
U.S. Office Action regarding U.S. Appl. No. 14/212,632, dated May 15, 2015.
First Chinese Office Action regarding Application No. 201380005300.2, dated Apr. 30, 2015. Translation provided by Unitalen Attorneys at Law.
"Manual for Freezing and Air Conditioning Technology," Fan Jili, Liaoning Science and Technology Press, Sep. 1995 (cited in First Office Action issued by the Chinese Patent Office regarding Application No. 200780030810.X dated Dec. 25, 2009).
"Small-type Freezing and Air Conditioning Operation," Chinese State Economy and Trading Committee, China Meteorological Press, Mar. 2003 (cited in First Office Action issued by the Chinese Patent Office regarding Application No. 200780030810.X dated Dec. 25, 2009).
Home Comfort Zones, Save Energy with MyTemp™ Zone Control, Dec. 2009.
Home Comfort Zones, MyTemp Room-by-Room Zone Control, Nov. 2009.
Li et al., "Development, Evaluation, and Demonstration of a Virtual Refrigerant Charge Sensor," Jan. 2009, HVAC&R Research, Oct. 27, 2008, 21 pages.
Home Comfort Zones, MyTemp User Manual v4.3, May 2008.
Home Comfort Zones, Smart Controller™ MyTemp™ Room by Room Temperature Control and Energy Management, User Manual, Aug. 2007.
"A Practical Example of a Building's Automatic Control," cited in First Office Action from the Patent Office of the People's Republic of China dated Jun. 29, 2007, regarding Application No. 200510005907.8, including translation by CCPIT Patent and Trademark Law Office.
"Product Performance Introduction of York Company," cited in First Office Action from the Patent Office of the People's Republic of China dated Jun. 29, 2007 regarding Application No. 200510005907.8, including translation by CCPIT Patent and Trademark Law Office.
Torcellini, P., et al., "Evaluation of the Energy Performance and Design Process of the Thermal Test Facility at the National Renewable Energy Laboratory", dated Feb. 2005.
Cost Cutting Techniques Used by the Unscrupulous, http://www.kellyshvac.com/howto.html, Oct. 7, 2004, 3 pages.
The LS2000 Energy Management System, User Guide, http://www.surfnetworks.com/htmlmanuals/IonWorksEnergyManagement-LS2000-Load-Shed -System-by-Surf-Networks,Inc.html, Sep. 2004, 20 pages.
Case Studies: Automated Meter Reading and Load Shed System, http://groupalpha.corn/CaseStudies2.html, Aug. 23, 2004, 1 page.
Nickles, Donald, "Broadband Communications Over Power Transmission Lines," A Guest Lecture From the Dr. Shreekanth Mandaynam Engineering Frontiers Lecture Series, May 5, 2004, 21 pages.
Jeffus, Larry, "Refrigeration and Air Conditioning: An Introduction to HVAC/R," Appendix C, pp. 1060-1063, Copyright 2004.
Jeffus, Larry, "Refrigeration and Air Conditioning: An Introduction to HVAC/R," Section II, Chapter 4, pp. 176-201, Copyright 2004.
Jeffus, Larry, "Refrigeration and Air Conditioning: An Introduction to HVAC/R," Section II, Chapter 5, pp. 239-245, Copyright 2004.
Jeffus, Larry, "Refrigeration and Air Conditioning: An Introduction to HVAC/R," Section IV, Chapter 9, pp. 494-504, Copyright 2004.
HVAC Service Assistant, ACRx Efficiency and Capacity Estimating Technology, Field Diagnostics, 2004.
Udelhoven, Darrell, "Air Conditioning System Sizing for Optimal Efficiency," http://www.udarrell.com/ airconditioning-sizing.html, Oct. 6, 2003, 7 pages.
Texas Instruments, Inc., Product catalog for "TRF690 1 Single-Chip RF Transceiver," Copyright 2001-2003, Revised Oct. 2003, 27 pages.
Advanced Utility Metering: Period of Performance, Subcontractor Report, National Renewable Energy Laboratory, Sep. 2003, 59 pages.

(56) References Cited

OTHER PUBLICATIONS

Honeywell, Advanced Portable A/C Diagnostics, The HVAC Service Assistant, 2003.
Vandenbrink et al.,"Design of a Refrigeration Cycle Evaporator Unit," Apr. 18, 2003.
Udelhoven, Darrell, "Air Conditioner EER, SEER Ratings, BTUH Capacity Ratings, & Evaporator Heat Load," http://www.udarrell.com/air-conditioner-capacity-seer.html, Apr. 3, 2003, 15 pages.
The Honeywell HVAC Service Assistant, A Tool for Reducing Electrical Power Demand and Energy Consumption, Field Diagnostics, 2003.
Trane EarthWise™ CenTra Vac™ Water-Cooled Liquid Chillers 165-3950 Tons 50 and 60 Hz; CTV PRC007-EN; Oct. 2002; 56 pages.
Honeywell, HVAC Service Assistant, TRGpro PalmTM OS Interface and HVAC Service Assistant A7075A1000, 2002.
Honeywell, A7075A1000 HVAC Service Assistant, 2001.
LIPA Launches Free, First-in-Nation Internet-Based Air Conditioner Control Program to Help LIPA and Its Customers Conserve Electricity & Save Money, Apr. 19, 2001, http://www.lipower.org/newscmter/pr/2001/aprill9_01.html, 3 pages.
K. A. Manske et al.; Evaporative Condenser Control in Industrial Refrigeration Systems; University of Wisconsin-Madison, Mechanical Engineering Department; International Journal of Refrigeration, vol. 24, No. 7; pp. 676-691; 2001, 21 pages.
Frequently Asked Questions, http://www.lipaedge.com/faq.asp, Copyright © 2001, 5 pages.
BChydro, "Power Factor" Guides to Energy Management: The GEM Series, Oct. 1999.
Ultrasite 32 User's Guide, Computer Process Controls, Sep. 28, 1999.
Refrigeration Monitor and Case Control Installation and Operation Manual, Computer Process Controls, Aug. 12, 1999.
Liao et al., A Correlation of Optimal Heat Rejection Pressures in Transcritical Carbon Dioxide Cycles, Applied Thermal Engineering 20 (2000), Jul. 25, 1999, 831-841.
Einstein RX-300 Refrigeration Controller Installation and Operation Manual, Computer Process Controls, Apr. 1, 1998, 329 pages.
Building Control Unit (BCU) Installation and Operation Manual, Computer Process Controls, Jan. 28, 1998, 141 pages.
Building Environmental Control (BEC) Installation and Operation Manual, Computer Process Controls, Jan. 5, 1998, 153 pages.
Low-Cost Multi-Service Home Gateway Creates New Business Opportunities, Coactive Networks, Copyright 1998-1999, 7 pages.
Pin, C. et al., "Predictive Models as Means to Quantify the Interactions of Spoilage Organisms," International Journal of Food Microbiology, vol. 41, No. 1, 1998, pp. 59-72, XP-002285119.
Watt, James; Development of Empirical Temperature and Humidity-Based Degraded-Condition Indicators for Low-Tonnage Air Conditioners; ESL-TH-97/12-03; Dec. 1997.
Ultrasite User's Guide BEC Supplement, Computer Process Controls, Oct. 6, 1997.
Ultrasite User's Guide BCU Supplement, Computer Process Controls, Sep. 4, 1997.
Ultrasite User's Guide RMCC Supplement, Computer Process Controls, Jun. 9, 1997.
Texas Instruments, Inc. Mechanical Data for "PT (S-PQFP-G48) Plastic Quad Flatpack," Revised Dec. 1996, 2 pages.
Honeywell, Excel 5000® System, Excel Building Supervisor, 74-2033-1, Copyright © 1996, Rev. 6-96, 12 pages.
UltraSite User's Guide, Computer Process Controls, Apr. 1, 1996.
Office Action regarding U.S. Appl. No. 11/394,380, dated Sep. 25, 2009.
Advisory Action Before the Filing of An Appeal Brief regarding U.S. Appl. No. 11/098,575, dated Sep. 28, 2009.
Office Action for U.S. Appl. No. 11/497,579, dated Oct. 27, 2009.
Examination Report received from Australian Government IP Australia dated Oct. 29, 2009 regarding patent application No. 2008202088.
Second Official Report regarding Australian Patent Application No. 2007214381, dated Oct. 30, 2009.
Supplementary European Search Report regarding Application No. PCT/US2006/005917, dated Nov. 23, 2009.
Examiner-Initiated Interview Summary regarding U.S. Appl. No. 11/214,179, dated Dec. 11, 2009.
Examiner's Answer regarding U.S. Appl. No. 09/977,552, dated Dec. 17, 2009.
First Office Action issued by the Chinese Patent Office regarding Application No. 200780030810.X dated Dec. 25, 2009.
Non-Final Office Action for U.S. Appl. No. 11/098,575 dated Jan. 27, 2010.
Office Action regarding U.S. Appl. No. 11/497,644, dated Jan. 29, 2010.
Restriction Requirement regarding U.S. Appl. No. 11/214,179, dated Feb. 2, 2010.
Final Office action regarding U.S. Appl. No. 11/337,918, dated Feb. 4, 2010.
Office Action regarding U.S. Appl. No. 11/120,166, dated Feb. 17, 2010.
Interview Summary regarding U.S. Appl. No. 11/098,582, dated Apr. 27, 2010.
International Preliminary Report on Patentability for International Application No. PCT/US2008/012362, dated May 4, 2010.
International Preliminary Report on Patentability for International Application No. PCT/US2008/012364, dated May 4, 2010.
Interview Summary regarding U.S. Appl. No. 11/497,644, dated May 4, 2010.
Final Office Action regarding U.S. Appl. No. 11/497,579, dated May 14, 2010.
Non-Final Office Action regarding U.S. Appl. No. 11/214,179, dated Jun. 8, 2010.
Office Action regarding U.S. Appl. No. 11/497,644, dated Jun. 14, 2010.
Supplementary European Search Report regarding European Application No. EP06790063, dated Jun. 15, 2010.
Final Office Action regarding U.S. Appl. No. 11/098,575, dated Jun. 17, 2010.
First Office Action from The State Intellectual Property Office of the People's Republic of China regarding Chinese Patent Application No. 200890100287.3, issued Oct. 25, 2010. Translation provided by Unitalen Attorneys at Law.
Interview Summary regarding U.S. Appl. No. 11/497,579, dated Jul. 15, 2010.
Second Office Action regarding Chinese Patent Application No. 200780030810X, dated Aug. 4, 2010. English translation provided by Unitalen Attorneys at Law.
Non-Final Office Action mailed Aug. 13, 2010 for U.S. Appl. No. 12/054,011.
Office Action regarding U.S. Appl. No. 11/850,846, dated Aug. 13, 2010.
Office Action regarding U.S. Appl. No. 11/776,879, dated Sep. 17, 2010.
Notice of Allowance and Fees Due and Notice of Allowability regarding U.S. Appl. No. 11/098,582, dated Sep. 24, 2010.
First Office Action regarding Chinese Patent Application No. 200780032977.X, dated Sep. 27, 2010. English translation provided by Unitalen Attorneys at Law.
Final Office Action mailed Dec. 7, 2010 for U.S. Appl. No. 12/054,011.
First Office Action regarding Chinese Patent Application No. 201010117657.8, dated Dec. 29, 2010. English translation provided by Unitalen Attorneys at Law.
Written Opinion of the International Searching Authority regarding Application No. PCT/US2010/036601, mailed Dec. 29, 2010.
Official Action regarding Australian Patent Application No. 2008325240, dated Jan. 19, 2011.
Non-Final Office Action regarding U.S. Appl. No. 11/214,179, dated Jan. 24, 2011.
Non-Final Office Action regarding U.S. Appl. No. 12/261,643, dated Jan. 27, 2011.

(56) References Cited

OTHER PUBLICATIONS

Second Office Action regarding Chinese Patent Application No. 200890100287.3, dated Jan. 27, 2011. English translation provided by Unitalen Attorneys at Law.
Examiner's First Report on Australian Patent Application No. 2008319275, dated Jan. 31, 2011.
Final Office Action regarding U.S. Appl. No. 11/337,918, dated Feb. 17, 2011.
Non-Final Office Action mailed Mar. 3, 2011 for U.S. Appl. No. 12/054,011.
Notice of Allowance regarding U.S. Appl. No. 12/685,424, dated Apr. 25, 2011.
First Office Action regarding Chinese Application No. 200880106319.5, dated May 25, 2011. English translation provided by Unitalen Attorneys at Law.
Communication from European Patent Office concerning Substantive Examination regarding European Patent Application No. 06790063.9, dated Jun. 6, 2011.
International Search Report regarding Application No. PCT/US2010/056315, mailed Jun. 28, 2011.
Final Office Action for U.S. Appl. No. 12/054,011, dated Jun. 30, 2011.
Final Office Action regarding U.S. Appl. No. 12/261,643, dated Jul. 7, 2011.
Final Office Action regarding U.S. Appl. No. 11/214,179, dated Jul. 21, 2011.
Office Action regarding U.S. Appl. No. 12/261,677, dated Aug. 4, 2011.
Third Office Action regarding Chinese Application No. 2005100059078 from the State Intellectual Property Office of People's Republic of China, dated Aug. 24, 2011. Translation provided by Unitalen Attorneys at Law.
Interview Summary regarding U.S. Appl. No. 13/407,180, dated Jun. 11, 2015.
Interview Summary regarding U.S. Appl. No. 13/770,479, dated Jun. 16, 2015.
Extended European Search Report regarding European Application No. 08845689.2-1608/2207964, dated Jun. 19, 2015.
Extended European Search Report regarding European Application No. 08848538.8-1608/2220372, dated Jun. 19, 2015.
Notice of Allowance regarding U.S. Appl. No. 13/932,611, dated Jul. 6, 2015.
Restriction Requirement regarding U.S. Appl. No. 14/244,967, dated Jul. 14, 2015.
Interview Summary regarding U.S. Appl. No. 13/369,067, dated Jul. 16, 2015.
Applicant-Initiated Interview Summary and Advisory Action regarding U.S. Appl. No. 13/369,067, dated Jul. 23, 2015.
Faramarzi et al., "Performance Evaluation of Rooftop Air Conditioning Units at High Ambient Temperatures," 2004 ACEEE Summer Study on Energy Efficiency in Buildings - http://aceee.orgffiles/proceedings/2004/data/papers/SSO4_Pane13_Paper05.pdf.
Notice of Allowance regarding U.S. Appl. No. 12/261,643, mailed Jul. 29, 2015.
Notice of Allowance regarding U.S. Appl. No. 13/770,123, dated Aug. 13, 2015.
Notice of Allowance and Interview Summary regarding U.S. Appl. No. 13/269,188, dated Aug. 26, 2015.
Office Action regarding Indian Patent Application No. 733/KOLNP/2009, dated Aug. 12, 2015.
Applicant-Initiated Interview Summary regarding U.S. Appl. No. 14/212,632, dated Sep. 2, 2015.
Notice of Allowance regarding U.S. Appl. No. 13/369,067, dated Sep. 2, 2015.
Final Office Action regarding U.S. Appl. No. 13/770,479, dated Sep. 4, 2015.
Office Action regarding U.S. Appl. No. 14/209,415, dated Sep. 10, 2015.
Search Report regarding European Patent Application No. 13736303.2-1806, dated Sep. 17, 2015.
First Office Action regarding Chinese Patent Application No. 201280010796.8, dated Sep. 14, 2015. Translation provided by Unitalen Attorneys at Law.
Notice of Allowance regarding U.S. Appl. No. 13/770,123, dated Oct. 1, 2015.
Office Action regarding Australian Patent Application No. 2013323760, dated Sep. 25, 2015.
Office Action and Interview Summary regarding U.S. Appl. No. 14/244,967, dated Oct. 7, 2015.
Office Action regarding U.S. Appl. No. 14/255,519, dated Nov. 9, 2015.
Office Action regarding U.S. Appl. No. 14/212,632, dated Nov. 19, 2015.
Interview Summary regarding U.S. Appl. No. 13/770,479, dated Nov. 25, 2015.
office Action regarding Chinese Patent Application No. 201380049458A, dated Nov. 13, 2015. Translation provided by Unitalen Attorneys at Law.
Search Report regarding European Patent Application No. 08251185.8-1605/2040016, dated Dec. 4, 2015.

\* cited by examiner

Indoor

| FAULT / feature | Detect | | | | | | | | Predict | | | | | | | |
|---|---|---|---|---|---|---|---|---|---|---|---|---|---|---|---|---|
| | Primary | | | | | | Comp | | Primary | | | | | | Comp | |
| | Timing | Current | Temps | Pressure | Direct | FFT | Temp | Volts | Timing | Current | Temps | Pressure | Direct | FFT | Temp | Volts |
| Charge low | * | * | * | | | | | | * | * | * | | | | | * |
| Charge high | * | * | * | | | | | | * | * | * | | | | | * |
| Expansion device (HP) | * | * | * | * | | | | * | * | * | * | * | | | | * |
| Blocked outdoor coil | * | | * | | | | | | * | | * | | | | | |
| Blocked indoor coil | * | * | * | * | | | | * | * | * | * | * | | | | * |
| Frozen evaporator HP | * | * | * | | | | | * | * | * | * | | | | | * |
| Multifuel aware | | | | | * | | | | | | | | | | | |
| Blocked evaporator | * | * | * | * | | | | * | * | * | * | * | | | | * |
| Frozen evaporator | * | * | * | * | | | | * | * | * | * | * | | | | * |
| Expansion device | * | | * | | | | | | * | * | | * | | | | * |
| Open circulator windings | * | * | | | | | | | | | | | | | | |
| Circulator bearing | | * | | | | * | | * | | * | | | | * | | * |
| Circulator blades - belt | | * | | | | * | | * | | * | | | | * | | * |
| Circulator start cap | * | * | | | | * | | * | * | * | | | | * | | * |
| Wrong circulator speed | | * | | | | | | | | | | | | | | |
| Filter | | * | | | * | * | | * | | * | | | * | | | * |
| Ignitor | * | * | | | | | | * | * | * | | | | * | | * |
| Gas valve | * | * | | | | * | | | | | | | | | | |
| Flame detect | * | * | | | | * | | | * | * | | | | * | | |
| Inducer | * | * | * | | | | | | * | * | * | | | * | | |
| Inducer loose blade | * | * | | | | * | | * | | | | | | | | |
| Combustion air blockage | * | * | | | | | | | * | * | | | | | | * |
| Hi limit | * | * | * | * | | | | * | * | * | * | * | | | | * |
| Roll out switch(es) | | | | | | | | | | | | | | | | |
| Inducer pressure switch | | | | | | | | | | | | | | | | |
| Ignition board fault | | | | | | | | | | | | | | | | |
| Low – High voltage | | | | | * | | | * | | | | | | | | |
| Heating performance | | | | | | | | | | | | | | | | |
| Cooling performance | * | * | * | * | | | | * | | | | | | | | |
| HP performance | * | * | * | * | | | | * | | | | | | | | |
| Energy monitor | | * | | | | | | * | | | | | | | | |
| Outside air temperature | | | | | | | | | | | | | | | | |
| Condensate pump | | | | | * | | | * | | * | | | | * | | |
| Duct leakage | | | | | | | | | | | | | | | | |
| Maintenance Reminders | * | | | | | | | | | | | | | | | |
| Short cycling | * | | | | | | | | | | | | | | | |
| No Power | | | | | * | | | * | | | | | | | | |

FIG. 16A

Outdoor

| FAULT / feature | Detect | | | | | | | Predict | | | | | | |
|---|---|---|---|---|---|---|---|---|---|---|---|---|---|---|
| | Primary | | | | | Comp | | Primary | | | | | Comp | |
| | Timing | Current | Temps | Direct | FFT | OAT | Volts | Timing | Current | Temps | Direct | FFT | OAT | Volts |
| Charge low | * | * | * | | * | * | * | * | * | * | | * | * | * |
| Charge high | * | * | * | | * | * | * | * | * | * | | * | * | * |
| Expansion device (HP) | * | * | * | | | * | * | * | * | * | | | * | * |
| Blocked outdoor coil | * | * | * | | | * | * | * | * | * | | | * | * |
| Blocked indoor coil | * | * | * | | | * | * | * | * | * | | | * | * |
| Frozen evaporator HP | * | * | * | | | * | * | * | * | * | | | * | * |
| Compressor bearings | | | | | | | | | | | | | | |
| Compressor open winding | | | | | | | | | | | | | | |
| Start cap | * | * | | | ** | * | * | * | * | | | ** | * | * |
| Run cap | | * | | | ** | * | * | | * | | | ** | * | * |
| Start relay | * | | | | | * | * | * | | | | | * | * |
| Fan motor bearings | * | * | | | ** | | | * | * | | | ** | | |
| Fan motor open windings | | * | | | | | | | | | | | | |
| Condenser fan cap | | * | | | ** | * | * | | * | | | ** | * | * |
| Condenser fan blade | | | | | | | | | | | | | | |
| Contactor(s) | | * | | | | | | | * | | | | | |
| Reverse valve state | | | * | | | * | | | | * | | | * | |
| Defrost | * | | * | | | * | | * | | * | | | * | |
| Multifuel aware | | | | | | | | | | | | | | |
| Blocked evaporator | * | * | * | | * | | * | * | * | * | | * | | * |
| Frozen evaporator | * | * | * | | * | | * | * | * | * | | * | | * |
| Expansion device | * | * | * | | * | | * | * | * | * | | * | | * |
| Low – High voltage | | | | * | | | * | | | | | | | |
| Heating performance | | | | | | | | | | | | | | |
| Cooling performance | * | * | * | * | | * | * | | | | | | | |
| HP performance | * | * | * | * | | * | * | | | | | | | |
| Energy monitor | | * | | * | | | * | | | | | | | |
| Outside air temperature | | | | * | | * | | | | | | | | |
| Condensate pump | | | | | | | | | | | | | | |
| Duct leakage | | | | | | | | | | | | | | |
| Maintenance Reminders | * | | | * | | | | | | | | | | |
| Short cycling | * | | | | | | | | | | | | | |
| No power | | | | * | | | * | | | | | | | |
| Humidifier Faults | | | | | | | | | | | | | | |

FIG. 16B

RESIDENTIAL SOLUTIONS HVAC MONITORING AND DIAGNOSIS

CROSS-REFERENCE TO RELATED APPLICATIONS

This application claims the benefit of U.S. Provisional Application No. 61/447,681 filed on Feb. 28, 2011 and U.S. Provisional Application No. 61/548,009 filed on Oct. 17, 2011. The disclosures of the above applications are incorporated herein by reference in their entirety.

FIELD

The present disclosure relates to environmental comfort systems and more particularly to remote monitoring and diagnosis of residential environmental comfort systems.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A residential HVAC (heating, ventilation, and air conditioning) system controls environmental parameters, such as temperature and humidity, of a residence. The HVAC system may include, but is not limited to, components that provide heating, cooling, humidification, and dehumidification. The target values for the environmental parameters, such as a temperature set point, may be specified by a homeowner.

Referring now to FIG. 1, a block diagram of an example HVAC system is presented. In this particular example, a forced air system with a gas furnace is shown. Return air is pulled from the residence through a filter 110 by a blower 114. The blower 114, also referred to as a fan, is controlled by a control module 118. The control module 118 receives signals from a thermostat 122. For example only, the thermostat 122 may include one or more temperature set points specified by the homeowner.

The thermostat 122 may direct that the blower 114 be turned on at all times or only when a heat request or cool request is present. The blower 114 may also be turned on at a scheduled time or on demand. In various implementations, the blower 114 can operate at multiple speeds or at any speed within a predetermined range. One or more switching relays (not shown) may be used to control the blower 114 and/or to select a speed of the blower 114.

The thermostat 122 also provides the heat and/or cool requests to the control module 118. When a heat request is made, the control module 118 causes a burner 126 to ignite. Heat from combustion is introduced to the return air provided by the blower 114 in a heat exchanger 130. The heated air is supplied to the residence and is referred to as supply air.

The burner 126 may include a pilot light, which is a small constant flame for igniting the primary flame in the burner 126. Alternatively, an intermittent pilot may be used in which a small flame is first lit prior to igniting the primary flame in the burner 126. A sparker may be used for an intermittent pilot implementation or for direct burner ignition. Another ignition option includes a hot surface igniter, which heats a surface to a high enough temperature that when gas is introduced, the heated surface causes combustion to begin. Fuel for combustion, such as natural gas, may be provided by a gas valve (not shown).

The products of combustion are exhausted outside of the residence, and an inducer blower 134 may be turned on prior to ignition of the burner 126. The inducer blower 134 provides a draft to remove the products of combustion from the burner 126. The inducer blower 134 may remain running while the burner 126 is operating. In addition, the inducer blower 134 may continue running for a set period of time after the burner 126 turns off. In a high efficiency furnace, the products of combustion may not be hot enough to have sufficient buoyancy to exhaust via conduction. Therefore, the inducer blower 134 creates a draft to exhaust the products of combustion.

A single enclosure, which will be referred to as an air handler 208, may include the filter 110, the blower 114, the control module 118, the burner 126, the heat exchanger 130, the inducer blower 134, the expansion valve 188, the evaporator 192, and the condensate pan 196.

In the HVAC system of FIG. 1, a split air conditioning system is also shown. Refrigerant is circulated through a compressor 180, a condenser 184, an expansion valve 188, and an evaporator 192. The evaporator 192 is placed in series with the supply air so that when cooling is desired, the evaporator removes heat from the supply air, thereby cooling the supply air. During cooling, the evaporator 192 is cold, which causes water vapor to condense. This water vapor is collected in a condensate pan 196, which drains or is pumped out.

A compressor control module 200 receives a cool request from the control module 118 and controls the compressor 180 accordingly. The compressor control module 200 also controls a condenser fan 204, which increases heat exchange between the condenser 184 and outside air. In such a split system, the compressor 180, the condenser 184, the compressor control module 200, and the condenser fan 204 are located outside of the residence, often in a single outdoor enclosure 212.

In various implementations, the compressor control module 200 may simply include a run capacitor, a start capacitor, and a contactor or relay. In fact, in certain implementations, the start capacitor may be omitted, such as when a scroll compressor instead of a reciprocating compressor is being used. The compressor 180 may be a variable capacity compressor and may respond to a multiple-level cool request. For example, the cool request may indicate a mid-capacity call for cool or a high capacity call for cool.

The electrical lines provided to the outdoor enclosure 212 may include a 240 volt mains power line and a 24 volt switched control line. The 24 volt control line may correspond to the cool request shown in FIG. 1. The 24 volt control line controls operation of the contactor. When the control line indicates that the compressor should be on, the contactor contacts close, connecting the 240 volt power supply to the compressor. In addition, the contactor may connect the 240 volt power supply to a condenser fan 204. In various implementations, such as when the outdoor enclosure 212 is located in the ground as part of a geothermal system, the condenser fan 204 may be omitted. When the 240 volt mains power supply arrives in two legs, as is common in the U.S., the contactor may have two sets of contacts, and is referred to as a double-pole single-throw switch.

Monitoring of operation of components in the outdoor enclosure 212 and the air handler 208 has traditionally been performed by multiple discrete sensors, measuring current individually to each component. For example, a sensor may sense the current drawn by a motor, another sensor measures resistance or current flow of an igniter, and yet another sensor monitors a state of a gas valve. However, the cost of these sensors and the time required for installation has made monitoring cost prohibitive.

SUMMARY

A monitoring system for a heating, ventilation, and air conditioning (HVAC) system of a residence includes a monitoring device installed at the residence and a server located remotely from the residence. The monitoring device measures an aggregate current supplied to a plurality of components of the HVAC system and transmits current data based on the measured aggregate current. The server receives the transmitted current data and, based on the received current, assesses whether a failure has occurred in a first component of the plurality of components of the HVAC system and assesses whether a failure has occurred in a second component of the plurality of components of the HVAC system.

In other features, the monitoring device samples the aggregate current over a time period, performs a frequency domain analysis on the samples over the time period, and transmits frequency domain data to the server. The server identifies transition points in the current data and analyzes the frequency domain data around the identified transition points. The server determines whether the failure has occurred in the first component by comparing the frequency domain data to baseline data. The server adapts the baseline data based on normal operation of the HVAC system. The monitoring device determines a single current value for the time period and transmits the single current value to the server without transmitting the samples to the server.

In further features, the single current value is one of a root mean squared current, an average current, and a peak current. The monitoring device measures the aggregate current over a series of consecutive time periods and transmits a frame of information to the server for each of the time periods. For a first period of the time periods, the monitoring device transmits a first frame including (i) a single value of the aggregate current during the first period and (ii) a frequency domain representation of the aggregate current during the first period.

In still other features, the first frame does not include individual samples of the aggregate current. The first frame includes a voltage measurement of power arriving at the HVAC system, a temperature measurement, and a representation of status of HVAC control lines during the first period. The monitoring device records control signals from a thermostat and transmits information based on the control signals to the server. The control signals include at least one of call for heat, call for fan, and call for cool.

In other features, the monitoring device is located in close proximity to an air handler unit of the HVAC system. A second monitoring device is located in close proximity to a second enclosure of the HVAC system, wherein the second enclosure includes at least one of a compressor and a heat pump heat exchanger. The second monitoring device (i) measures an aggregate current supplied to a plurality of components of the second enclosure and (ii) transmits current data based on the measured aggregate current to the server. The second monitoring device transmits the current data to the server via the monitoring device.

In further features, the monitoring device includes a switch that selectively interrupts an enabling signal to a compressor of the HVAC system. The monitoring device interrupts the enabling signal in response to at least one of (i) a value from a water sensor, (ii) a locked rotor condition of the compressor, and (iii) a command from the server. The server (i) generates an alert in response to determining presence of a fault of either the first component or the second component and (ii) sends the alert to at least one of a homeowner of the residence and an installation contractor.

In still other features, the server (i) selectively predicts an impending failure of the first component based on the received current data, (ii) selectively predicts an impending failure of the second component based on the received current data, and (iii) generates an alert in response to prediction of impending failure. The plurality of components of the HVAC system includes at least two components selected from: a flame sensor, a solenoid-operated gas valve, a hot surface igniter, a circulator blower motor, an inducer blower motor, a compressor, a pressure switch, a capacitor, an air filter, a condensing coil, an evaporating coil, and a contactor.

A method of monitoring a heating, ventilation, and air conditioning (HVAC) system of a residence includes using a monitoring device installed at the residence, measuring an aggregate current supplied to a plurality of components of the HVAC system, and transmitting current data based on the measured aggregate current to a server located remotely from the residence. The method includes receiving the transmitted current data at the server and based on the received current, assessing whether a failure has occurred in a first component of the plurality of components of the HVAC system. The method further includes, based on the received current, assessing whether a failure has occurred in a second component of the plurality of components of the HVAC system.

In other features, the method includes sampling the aggregate current over a time period, performing a frequency domain analysis on the samples over the time period, and transmitting frequency domain data to the server. The method includes identifying transition points in the current data, and analyzing the frequency domain data around the identified transition points. The method further includes determining whether the failure has occurred in the first component by comparing the frequency domain data to baseline data, and adapting the baseline data based on normal operation of the HVAC system.

In still other features, the method includes determining a single current value for the time period and transmitting the single current value to the server without transmitting the samples to the server. The single current value is one of a root mean squared current, an average current, and a peak current. The method includes measuring the aggregate current over a series of consecutive time periods, and transmitting a frame of information to the server for each of the time periods.

In still further features, the method includes, for a first period of the time periods, transmitting a first frame including (i) a single value of the aggregate current during the first period and (ii) a frequency domain representation of the aggregate current during the first period. The first frame does not include individual samples of the aggregate current. The first frame includes a voltage measurement of power arriving at the HVAC system, a temperature measurement, and a representation of status of HVAC control lines during the first period.

In other features, the method includes recording control signals from a thermostat, and transmitting information based on the control signals to the server. The control signals include at least one of call for heat, call for fan, and call for cool. The monitoring device is located in close proximity to an air handler unit of the HVAC system, and the method further includes measuring an aggregate current supplied to a plurality of components of a second enclosure of the HVAC system. The second enclosure includes at least one of a compressor and a heat pump heat exchanger, and the method includes transmitting current data based on the measured aggregate current to the server.

In still other features, the method includes transmitting the current data from the second monitoring device to the server via the monitoring device, and communicating with the monitoring device using power line communication. The method includes selectively interrupting an enabling signal to a compressor of the HVAC system in response to at least one of (i) a value from a water sensor, (ii) a locked rotor condition of the compressor, and (iii) a command from the server. The method includes sending an alert in response to determining presence of a fault of either the first component or the second component, wherein the alert is sent to at least one of a homeowner of the residence and an installation contractor.

In further features, the method includes selectively predicting an impending failure of the first component based on the received current data, selectively predicting an impending failure of the second component based on the received current data, and generating an alert in response to prediction of impending failure. The plurality of components of the HVAC system includes at least two components selected from: a flame sensor, a solenoid-operated gas valve, a hot surface igniter, a circulator blower motor, an inducer blower motor, a compressor, a pressure switch, a capacitor, an air filter, a condensing coil, an evaporating coil, and a contactor. The method includes transmitting the current data to a gateway wirelessly, wherein the gateway forwards the current data to the server over the Internet.

BRIEF DESCRIPTION OF THE DRAWINGS

The present disclosure will become more fully understood from the detailed description and the accompanying drawings, wherein:

FIGS. 16A and 16B present example failures and features for indoor and outdoor units, respectively, that can be detected and/or predicted in addition to example data used in various implementations to perform the detection and/or prediction.

DETAILED DESCRIPTION

Figure 1:
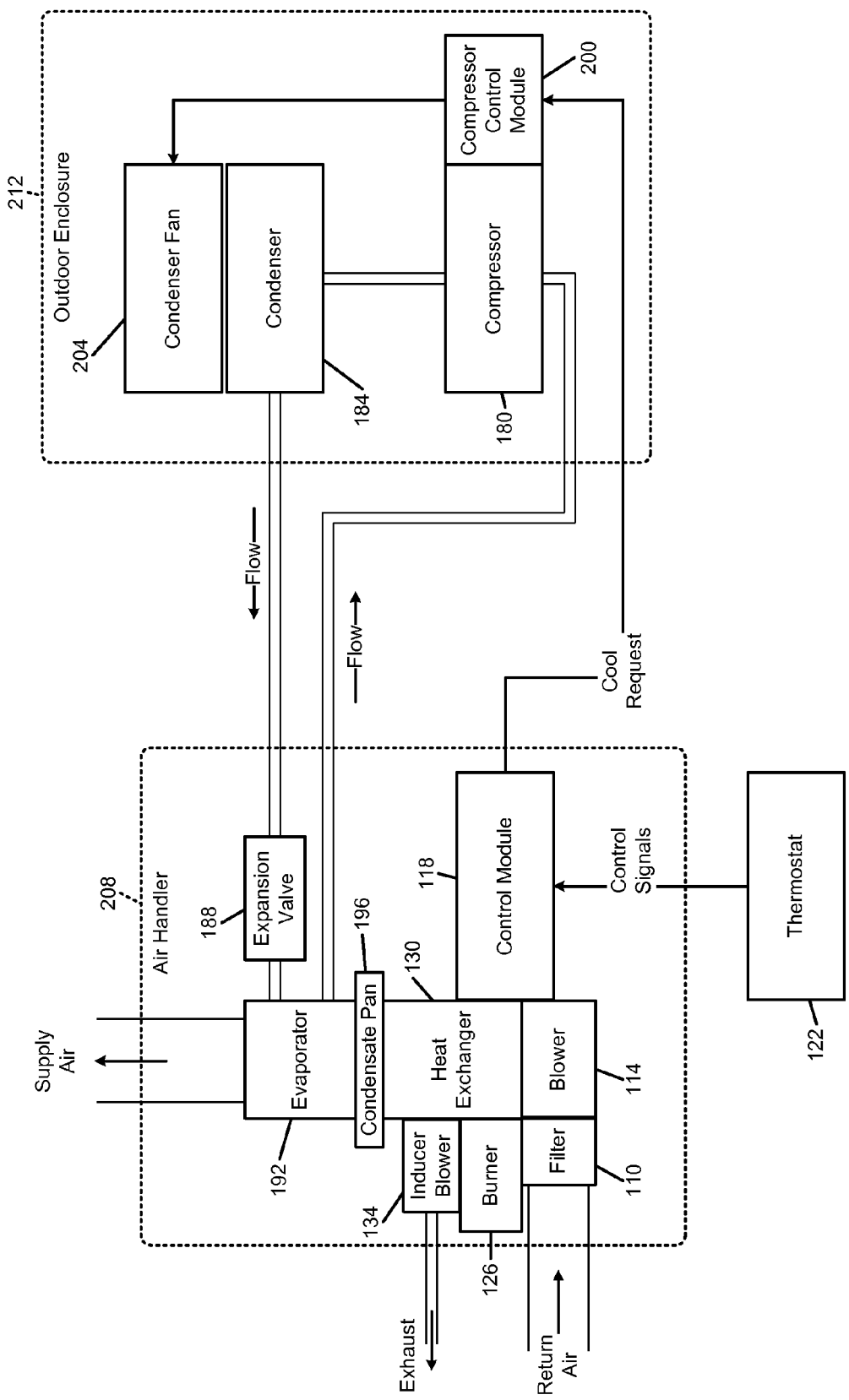
FIG. 1 is a block diagram of an example HVAC system according to the prior art.

According to the present disclosure, sensing/monitoring modules can be integrated with a residential HVAC (heating, ventilation, and air conditioning) system. As used in this application, the term HVAC encompasses all environmental comfort systems in a home or business, including heating, cooling, humidifying, and dehumidifying, and covers devices such as furnaces, heat pumps, humidifiers, dehumidifiers, and air conditioners. The term HVAC is a broad term, in that an HVAC system according to this application does not necessarily include both heating and air conditioning, and may instead have only one or the other.

In split HVAC systems with an air handler unit (often, indoors) and a compressor unit (often, outdoors), an air handler monitor module and a compressor monitor module, respectively, can be used. The air handler monitor module and the compressor monitor module may be integrated by the manufacturer of the HVAC system, may be added at the time of the installation of the HVAC system, and/or may be retrofitted to an existing system.

The air handler monitor and compressor monitor modules monitor operating parameters of associated components of the HVAC system. For example, the operating parameters may include power supply current, power supply voltage, operating and ambient temperatures, fault signals, and control signals. The air handler monitor and compressor monitor modules may communicate data between each other, while one or both of the air handler monitor and compressor monitor modules uploads data to a remote location. The remote location may be accessible via any suitable network, including the Internet.

The remote location includes one or more computers, which will be referred to as servers. The servers execute a monitoring system on behalf of a monitoring company. The monitoring system receives and processes the data from the air handler monitor and compressor monitor modules of homeowners who have such systems installed. The monitoring system can provide performance information, diagnostic alerts, and error messages to a homeowner and/or third parties, such as a designated HVAC contractor.

The air handler monitor and compressor monitor modules may each sense an aggregate current for the respective unit without measuring individual currents of individual components. The aggregate current data may be processed using frequency domain analysis, statistical analysis, and state machine analysis to determine operation of individual components based on the aggregate current data. This processing may happen partially or entirely in a server environment, outside of the homeowner's residence.

Based on measurements from the air handler monitor and compressor monitor modules, the monitoring company can determine whether HVAC components are operating at their peak performance and can advise the homeowner and the contractor when performance is reduced. This performance reduction may be measured for the system as a whole, such as in terms of efficiency, and/or may be monitored for one or more individual components.

In addition, the monitoring system may detect and/or predict failures of one or more components of the system. When a failure is detected, the homeowner can be notified and potential remediation steps can be taken immediately. For example, components of the HVAC system may be shut down to minimize damage or HVAC components and/or prevent water damage. The contractor can also be notified that a service call will be required. Depending on the contractual relationship between the homeowner and the contractor, the contractor may immediately schedule a service call to the residence.

The monitoring system may provide specific information to the contractor, including identifying information of the homeowner's HVAC system, including make and model numbers, as well as indications of the specific part numbers that appear to be failing. Based on this information, the contractor can allocate the correct repair personnel that have experience with the specific HVAC system and/or component. In addition, the service technician is able to bring replacement parts, avoiding return trips after diagnosis.

Depending on the severity of the failure, the homeowner and/or contractor may be advised of relevant factors in determining whether to repair the HVAC system or replace some or all of the components of the HVAC system. For example only, these factors may include relative costs of repair versus replacement, and may include quantitative or qualitative information about advantages of replacement equipment. For example, expected increases in efficiency and/or comfort with new equipment may be provided. Based on historical usage data and/or electricity or other commodity prices, the comparison may also estimate annual savings resulting from the efficiency improvement.

As mentioned above, the monitoring system may also predict impending failures. This allows for preventative maintenance and repair prior to an actual failure. Alerts regarding detected or impending failures reduce the time when the HVAC system is out of operation and allows for more flexible scheduling for both the homeowner and contractor. If the homeowner is out of town, these alerts may prevent damage from occurring when the homeowner is not present to detect the failure of the HVAC system. For example, failure of heat in winter may lead to pipes freezing and bursting.

Alerts regarding potential or impending failures may specify statistical timeframes before the failure is expected. For example only, if a sensor is intermittently providing bad data, the monitoring system may specify an expected amount of time before it is likely that the sensor effectively stops working due to the prevalence of bad data. Further, the monitoring system may explain, in quantitative or qualitative terms, how the current operation and/or the potential failure will affect operation of the HVAC system. This enables the homeowner to prioritize and budget for repairs.

For the monitoring service, the monitoring company may charge a periodic rate, such as a monthly rate. This charge may be billed directly to the homeowner and/or may be billed to the contractor. The contractor may pass along these charges to the homeowner and/or may make other arrangements, such as by requiring an up-front payment upon installation and/or applying surcharges to repairs and service visits.

For the air handler monitor and compressor monitor modules, the monitoring company or contractor may charge the homeowner the equipment cost, including the installation cost, at the time of installation and/or may recoup these costs as part of the monthly fee. Alternatively, rental fees may be charged for the air handler monitor and compressor monitor modules, and once the monitoring service is stopped, the air handler monitor and compressor monitor modules may be returned.

The monitoring service may allow a homeowner and/or contractor to remotely monitor and/or control HVAC components, such as setting temperature, enabling or disabling heating and/or cooling, etc. In addition, the homeowner may be able to track energy usage, cycling times of the HVAC system, and/or historical data. Efficiency and/or operating costs of the homeowner's HVAC system may be compared against HVAC systems of neighbors, whose homes will be subject to the same environmental conditions. This allows for direct comparison of HVAC system and overall home efficiency because environmental variables, such as temperature and wind, are controlled.

The monitoring system can be used by the contractor during and after installation and during and after repair to verify operation of the air handler monitor and compressor monitor modules as well as to verify correct installation of the components of the HVAC system. In addition, the homeowner may review this data in the monitoring system for assurance that the contractor correctly installed and configured the HVAC system. In addition to being uploaded to the cloud, monitored data may be transmitted to a local device in the residence. For example, a smartphone, laptop, or proprietary portable device may receive monitoring information to diagnose problems and receive real-time performance data. Alternatively, data may be uploaded to the cloud and then downloaded onto a local computing device, such as via the Internet from an interactive web site.

The historical data collected by the monitoring system may allow the contractor to properly specify new HVAC components and to better tune configuration, including dampers and set points of the HVAC system. The information collected may be helpful in product development and assessing failure modes. The information may be relevant to warranty concerns, such as determining whether a particular problem is covered by a warranty. Further, the information may help to identify conditions, such as unauthorized system modifications, that could potentially void warranty coverage.

Original equipment manufacturers may subsidize partially or fully the cost of the monitoring system and air handler and compressor monitor modules in return for access to this information. Installation and service contractors may also subsidize some or all of these costs in return for access to this information, and for example, in exchange for being recommended by the monitoring system. Based on historical service data and homeowner feedback, the monitoring system may provide contractor recommendations to homeowners.

Figure 2:
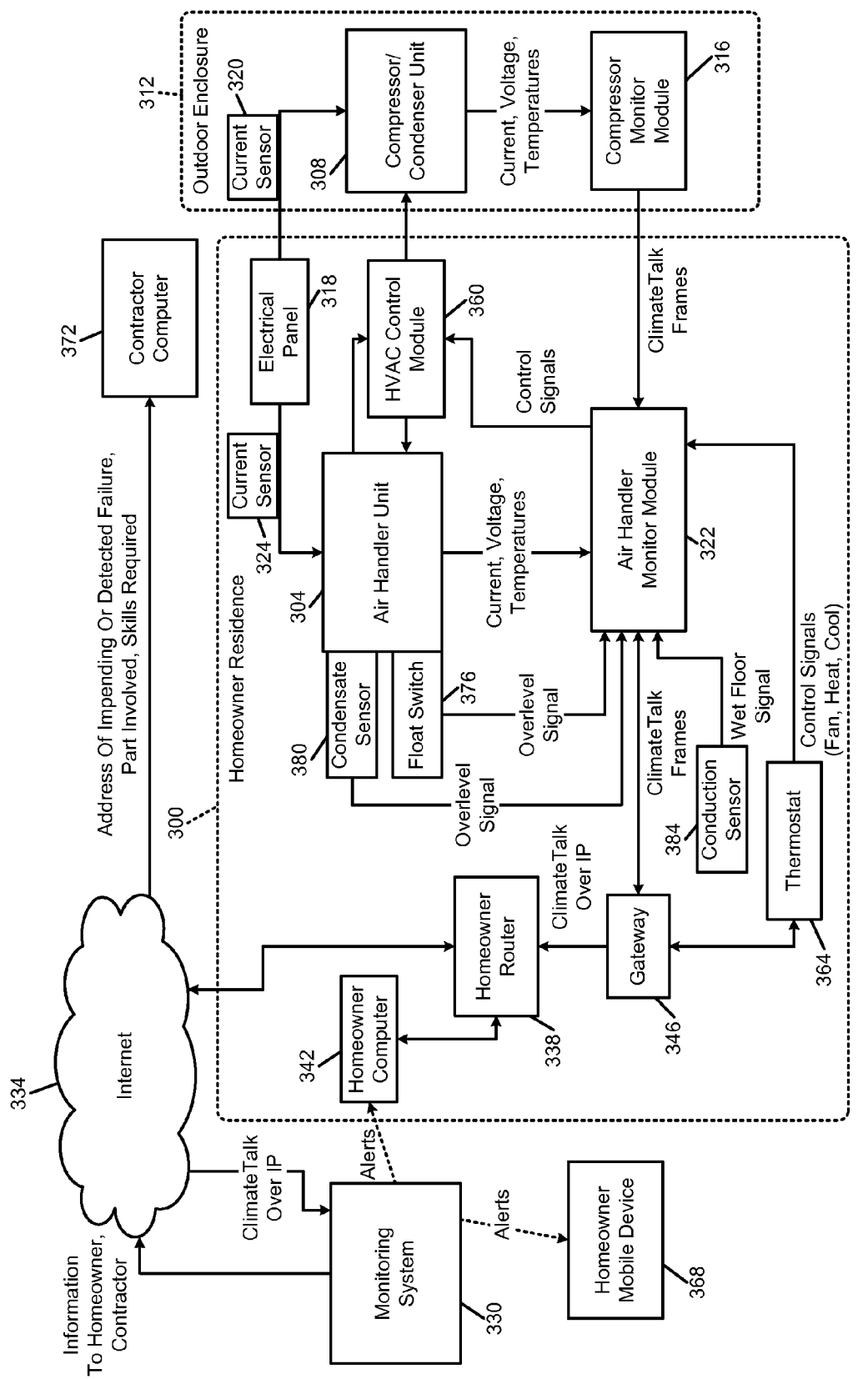
FIG. 2 is a functional block diagram of an example system showing an HVAC system of a single residence.

Referring now to FIG. 2, a functional block diagram of an example system showing a single homeowner residence 300 is presented. The homeowner residence 300 includes, for example only, a split system with an air handler unit 304 and a compressor/condenser unit 308. The compressor/condenser unit 308 includes a compressor, a condenser, a condenser fan, and associated electronics. In many systems, the air handler unit 304 is located inside the homeowner residence 300, while the compressor/condenser unit 308 is located outside the homeowner residence 300, such as in an outdoor enclosure 312.

The present disclosure is not limited, and applies to other systems including, as examples only, systems where the components of the air handler unit 304 and the compressor/condenser unit 308 are located in close proximity to each other or even in a single enclosure. The single enclosure may be located inside or outside of the homeowner residence 300. In various implementations, the air handler unit 304 may be located in a basement, garage, or attic. In ground source systems, where heat is exchanged with the earth, the air handler unit 304 and the compressor/condenser unit 308 may be located near the earth, such as in a basement, crawlspace, garage, or on the first floor, such as when the first floor is separated from the earth by only a concrete slab.

According to the principles of the present disclosure, a compressor monitor module 316 is interconnected with the compressor/condenser unit 308, and may be located within or in close proximity to the outdoor enclosure 312. The compressor monitor module 316 monitors parameters of the compressor/condenser unit 308 including current, voltage, and temperatures.

In one implementation, the current measured is a single power supply current that represents the aggregate current draw of the entire outdoor enclosure 312 from an electrical panel 318. A current sensor 320 measures the current supplied to the compressor/condenser unit 308 and provides measured data to the compressor monitor module 316. For example only, the compressor/condenser unit 308 may receive an AC line voltage of approximately 240 volts. The current sensor 320 may sense current of one of the legs of the 240 volt power supply. A voltage sensor (not shown) may sense the voltage of one or both of the legs of the AC voltage supply. The current sensor 320 may include a current transformer, a current shunt, and/or a hall effect device. In various implementations, a power sensor may be used in addition to or in place of the current sensor 320. Current may be calculated based on the measured power, or profiles of the power itself may be used to evaluate operation of components of the compressor/condenser unit 308.

An air handler monitor module 322 monitors the air handler unit 304. For example, the air handler monitor module 322 may monitor current, voltage, and various temperatures. In one implementation, the air handler monitor module 322 monitors an aggregate current drawn by the entire air handler unit 304, and when the air handler unit 304 provides power to an HVAC control module 360, also the current drawn by the HVAC control module 360. A current sensor 324 measures current delivered to the air handler unit 304 by the electrical panel 318. The current sensor 324 may be similar to the current sensor 320. Voltage sensors (not shown) may be located near the current sensors 324 and 320. The voltage sensors provide voltage data to the air handler unit 304 and the compressor/condenser unit 308.

The air handler unit 304 and the compressor/condenser unit 308 may evaluate the voltage to determine various parameters. For example, frequency, amplitude, RMS voltage and DC offset may be calculated based on the measured voltage. In situations where 3-phase power is used, the order of the phases may be determined. Information about when the voltage crosses zero may be used to synchronize various measurements and to determine frequency based on counting the number of zero crossings within a predetermine time period.

The air handler unit 304 includes a blower, a burner, and an evaporator. In various implementations, the air handler unit 304 includes an electrical heating device instead of or in addition to the burner. The electrical heating device may provide backup or secondary heat. The compressor monitor module 316 and the air handler monitor module 322 share collected data with each other. When the current measured is the aggregate current draw, in either the air handler monitor module 322 or the compressor monitor module 316, contributions to the current profile are made by each component. It may be difficult, therefore, to easily determine in the time domain how the measured current corresponds to individual components. However, when additional processing is available, such as in a monitoring system, which may include server and other computing resources, additional analysis, such as frequency domain analysis, can be performed.

The frequency domain analysis may allow individual contributions of HVAC system components to be determined. Some of the advantages of using an aggregate current measurement may include reducing the number of current sensors that would otherwise be necessary to monitor each of the HVAC system components. This reduces bill of materials costs, as well as installation costs and potential installation problems. Further, providing a single time domain current stream may reduce the amount of bandwidth necessary to upload the current data. Nevertheless, the present disclosure could also be used with additional current sensors.

Further, although not shown in the figures, additional sensors, such as pressure sensors, may be included and connected to the air handler monitor module 322 and/or the compressor monitor module 316. The pressure sensors may be associated with return air pressure or supply air pressure, and/or with pressures at locations within the refrigerant loop. Air flow sensors may measure mass air flow of the supply air and/or the return air. Humidity sensors may measure relative humidity of the supply air and/or the return air, and may also measure ambient humidity inside or outside the homeowner residence 300.

In various implementations, the principles of the present disclosure may be applied to monitoring other systems, such as a hot water heater, a boiler heating system, a refrigerator, a refrigeration case, a pool heater, a pool pump/filter, etc. As an example, the hot water heater may include an igniter, a gas valve (which may be operated by a solenoid), an igniter, an inducer blower, and a pump. Aggregate current readings can be analyzed by the monitoring company to assess operation of the individual components of the hot water heater. Aggregate loads, such as the hot water heater or the air handler unit 304, may be connected to an AC power source via a smart outlet, a smart plug, or a high amp load control switch, each of which may provide an indication when a connected device is activated.

In one implementation, which is shown in FIG. 2, the compressor monitor module 316 provides data to the air handler monitor module 322, and the air handler monitor module 322 provides data from both the air handler monitor module 322 and the compressor monitor module 316 to a remote monitoring system 330. The monitoring system 330 is reachable via a distributed network such as the Internet 334. Alternatively, any other suitable network, such as a wireless mesh network or a proprietary network, may be used.

In various other implementations, the compressor monitor module 316 may transmit data from the air handler monitor module 322 and the compressor monitor module 316 to an external wireless receiver. The external wireless receiver may be a proprietary receiver for a neighborhood in which the homeowner residence 300 is located, or may be an infrastructure receiver, such as a metropolitan area network (such as WiMAX), a WiFi access point, or a mobile phone base station.

In the implementation of FIG. 2, the air handler monitor module 322 relays data between the compressor monitor module 316 and the monitoring system 330. For example, the air handler monitor module 322 may access the Internet 334 using a router 338 of the homeowner. The homeowner router 338 may already be present to provide Internet access to other devices within the homeowner residence 300, such as a homeowner computer 342 and/or various other devices having Internet connectivity, such as a DVR (digital video recorder) or a video gaming system.

The air handler monitor module 322 may communicate with the homeowner router 338 via a gateway 346. The gateway 346 translates information received from the air handler monitor module 322 into TCP/IP (Transmission Control Protocol/Internet Protocol) packets and vice versa. The gateway 346 then forwards those packets to the homeowner router 338. The gateway 346 may connect to the homeowner router 338 using a wired or wireless connection. The air handler monitor module 322 may communicate with the gateway 346 using a wired or wireless connection. For example, the interface between the gateway 346 and the homeowner router 338 may be Ethernet (IEEE 802.3) or WiFi (IEEE 802.11).

The interface between the air handler monitor module 322 and the gateway 346 may include a wireless protocol, such as Bluetooth, ZigBee (IEEE 802.15.4), 900 Megahertz, 2.4 Gigahertz, WiFi (IEEE 802.11), and proprietary protocols. The air handler monitor module 322 may communicate with the compressor monitor module 316 using wired or wireless protocols. For example only, the air handler monitor module 322 and the compressor monitor module 316 may communicate using power line communications, which may be sent over a line voltage (such as 240 volts) or a stepped-down voltage, such as 24 volts, or a dedicated communications line.

The air handler monitor module 322 and the compressor monitor module 316 may transmit data within frames conforming to the ClimateTalk™ standard, which may include the ClimateTalk Alliance HVAC Application Profile v1.1, released Jun. 23, 2011, the ClimateTalk Alliance Generic Application Profile, v1.1, released Jun. 23, 2011, and the ClimateTalk Alliance Application Specification, v1.1, released Jun. 23, 2011, the disclosures of which are hereby incorporated by reference in their entirety. In various implementations, the gateway 346 may encapsulate ClimateTalk™ frames into IP packets, which are transmitted to the monitoring system 330. The monitoring system 330 then extracts the ClimateTalk™ frames and parses the data contained within the ClimateTalk™ frames. The monitoring system 330 may send return information, including monitoring control signals and/or HVAC control signals, using ClimateTalk™.

The HVAC control module 360 controls operation of the air handler unit 304 and the compressor/condenser unit 308. The HVAC control module 360 may operate based on control signals from a thermostat 364. The thermostat 364 may transmit requests for fan, heat, and cool to the HVAC control module 360. One or more of the control signals may be intercepted by the air handler monitor module 322. Various implementations of interaction between the control signals and the air handler monitor module 322 are shown below in FIGS. 3A-3C.

Additional control signals may be present in various HVAC systems. For example only, a heat pump may include additional control signals, such as a control signal for a reversing valve. The thermostat 364 and/or the HVAC control module 360 may include control signals for secondary heating and/or secondary cooling, which may be activated when the primary heating or primary cooling is insufficient. In dual fuel systems, such as systems operating from either electricity or natural gas, control signals related to the selection of the fuel may be monitored. Further, additional status and error signals may be monitored, such as a defrost status signal, which may be asserted when the compressor is shut off and a defrost heater operates to melt frost from an evaporator.

In various implementations, the thermostat 364 may use the gateway 346 to communicate with the Internet 334. In one implementation, the thermostat 364 does not communicate directly with the air handler monitor module 322 or the compressor monitor module 316. Instead, the thermostat 364 communicates with the monitoring system 330, which may then provide information or control signals to the air handler monitor module 322 and/or the compressor monitor module 316 based on information from the thermostat 364. Using the monitoring system 330, the homeowner or contractor may send signals to the thermostat 364 to manually enable heating or cooling (regardless of current temperature settings), or to change set points, such as desired instant temperature and temperature schedules. In addition, information from the thermostat 364, such as current temperature and historical temperature trends, may be viewed.

The monitoring system 330 may provide alerts for situations such as detected or predicted failures to the homeowner computer 342 and/or to any other electronic device of the homeowner. For example, the monitoring system 330 may provide an alert to a mobile device 368 of the homeowner, such as a mobile phone or a tablet. The alerts are shown in FIG. 2 with dashed lines indicating that the alerts may not travel directly to the homeowner computer 342 or the mobile device 368 but may traverse, for example, the Internet 334 and/or a mobile provider network (not shown). The alerts may take any suitable form, including text messages, emails, social networking messages, voicemails, phone calls, etc.

The monitoring system 330 also interacts with a contractor computer 372. The contractor computer 372 may then interface with mobile devices carried by individual contractors. Alternatively, the monitoring system 330 may directly provide alerts to predetermined mobile devices of the contractor. In the event of an impending or detected failure, the monitoring system 330 may provide information regarding identification of the homeowner, identification of the HVAC system, the part or parts related to the failure, and/or the skills required to perform the maintenance.

In various implementations, the monitoring system 330 may transmit a unique identifier of the homeowner or the residence to the contractor computer 372. The contractor computer 372 may include a database indexed by the unique identifier, which stores information about the homeowner including the homeowner's address, contractual information such as service agreements, and detailed information about the installed HVAC equipment.

The air handler monitor module 322 and the compressor monitor module 316 may receive respective sensor signals, such as water sensor signals. For example, the air handler monitor module 322 may receive signals from a float switch 376, a condensate sensor 380, and a conduction sensor 384. The condensate sensor 380 may include a device as described in commonly assigned patent application Ser. No. 13/162, 798, filed Jun. 17, 2011, titled Condensate Liquid Level Sensor and Drain Fitting, the disclosure of which is hereby incorporated by reference in its entirety.

Where the air handler unit 304 is performing air conditioning, condensation occurs and is captured in a condensate pan. The condensate pan drains, often via a hose, into a floor drain or a condensate pump, which pumps the condensate to a suitable drain. The condensate sensor 380 detects whether the drain hose has been plugged, a condition which will eventually cause the condensate pan to overflow, potentially causing damage to the HVAC system and to surrounding portions of the homeowner residence 300.

The air handler unit 304 may be located on a catch pan, especially in situations where the air handler unit 304 is located above living space of the homeowner residence 300. A catch pan may include the float switch 376. When enough liquid accumulates in the catch pan, the float switch 376 provides an over-level signal to the air handler monitor module 322.

The conduction sensor 384 may be located on the floor or other surface where the air handler unit 304 is located. The conduction sensor 384 may sense water leaks that are for one reason or another not detected by the float switch 376 or the condensate sensor 380, including leaks from other systems such as a hot water heater.

Figure 3C:
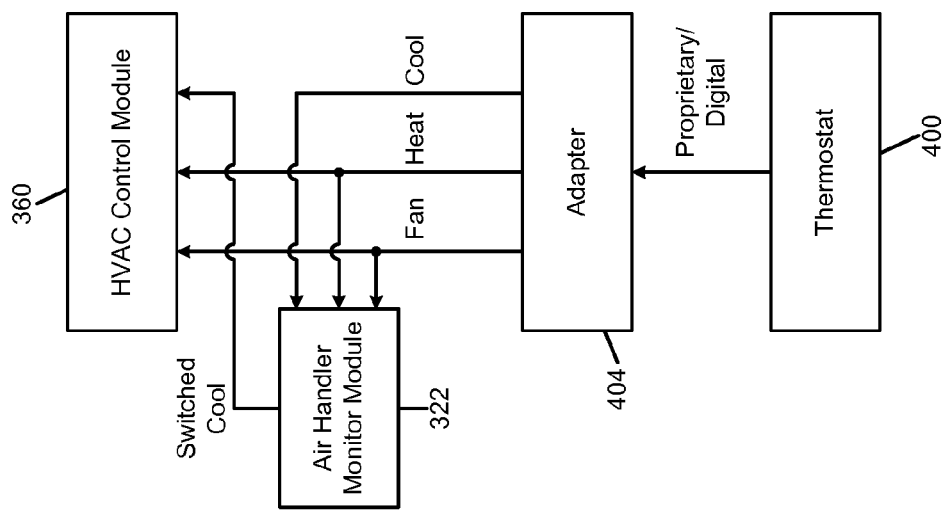
FIGS. 3A-3C are functional block diagrams of control signal interaction with the air handler monitor module.
Figure 3B:
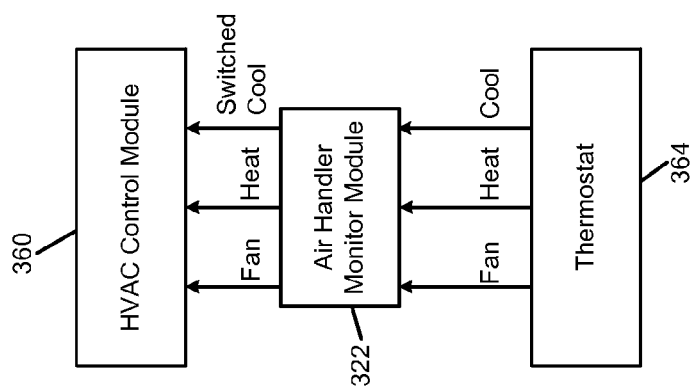
Figure 3A:
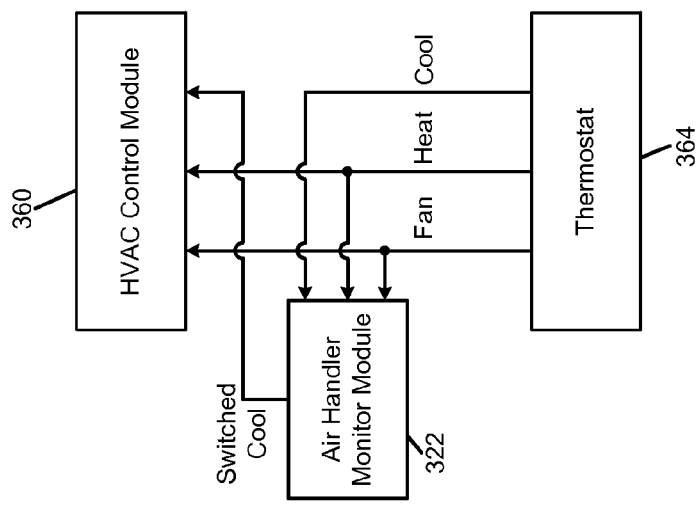

Referring now to FIG. 3A, an example of control signal interaction with the air handler monitor module 322 is presented. In this example, the air handler monitor module 322 taps into the fan and heat request signals. For example only, the HVAC control module 360 may include terminal blocks where the fan and heat signals are received. These terminals blocks may include additional connections where leads can be attached between these additional connections and the air handler monitor module 322.

Alternatively, leads from the air handler monitor module 322 may be attached to the same location as the fan and heat signals, such as by putting multiple spade lugs underneath a signal screw head. The cool signal from the thermostat 364 may be disconnected from the HVAC control module 360 and attached to the air handler monitor module 322. The air handler monitor module 322 then provides a switched cool signal to the HVAC control module 360. This allows the air handler monitor module 322 to interrupt operation of the air conditioning system, such as upon detection of water by one of the water sensors. The air handler monitor module 322 may also interrupt operation of the air conditioning system based on information from the compressor monitor module 316, such as detection of a locked rotor condition in the compressor.

Referring now to FIG. 3B, the fan, heat, and cool signals are connected to the air handler monitor module 322 instead of to the HVAC control module 360. The air handler monitor module 322 then provides fan, heat, and switched cool signals to the HVAC control module 360. In various other implementations, the air handler monitor module 322 may also switch the fan and/or heat signals.

Referring now to FIG. 3C, the thermostat 400 may use a proprietary or digital form of communication instead of discrete request lines such as those used by the thermostat 364. Especially in installations where the thermostat 400 is added after the HVAC control module 360 has been installed, an adapter 404 may translate the proprietary signals into individual fan, heat, and cool request signals. The air handler monitor module 322 can then be connected similarly to FIG. 3A (as shown) or FIG. 3B.

Figure 4A:
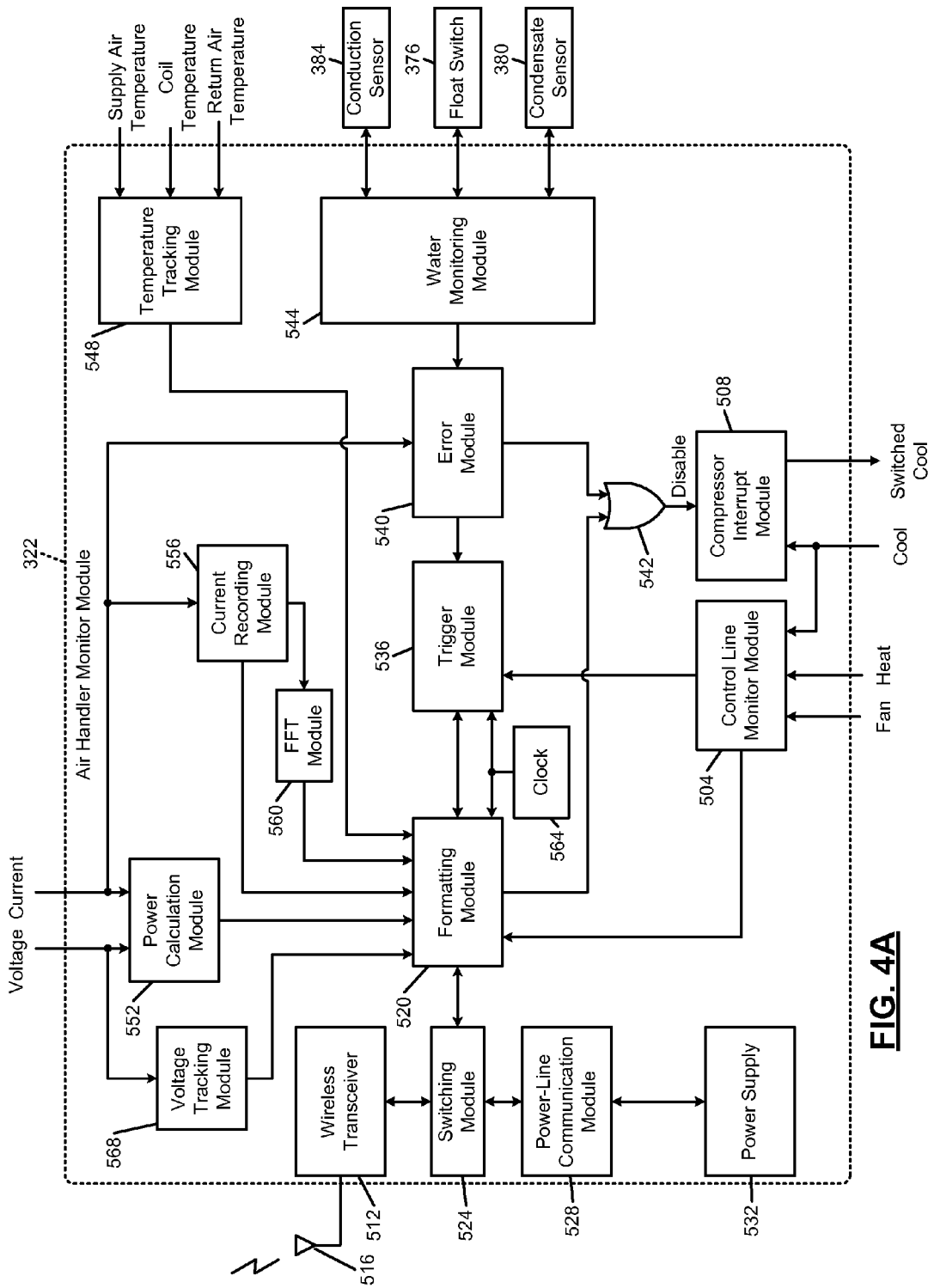
FIG. 4A is a functional block diagram of an example implementation of the air handler monitor module.

Referring now to FIG. 4A, a functional block diagram of an example implementation of the air handler monitor module 322 is presented. A control line monitor module 504 receives the fan, heat, and cool request signals. A compressor interrupt module 508 also receives the cool request signal. Based on a disable signal, the compressor interrupt module 508 deactivates the switched cool signal. Otherwise, the compressor interrupt module 508 may pass the cool signal through as the switched cool signal.

The control line monitor module 504 may also receive additional control signals, depending on application, including second stage heat, second stage cool, reversing valve direction, defrost status signal, and dual fuel selection.

A wireless transceiver 512 communicates using an antenna 516 with a wireless host, such as a gateway 346, a mobile phone base station, or a WiFi (IEEE 802.11) or WiMax (IEEE 802.16) base station. A formatting module 520 forms data frames, such as ClimateTalk™ frames, including data acquired by the air handler monitor module 322. The formatting module 520 provides the data frames to the wireless transceiver 512 via a switching module 524.

The switching module 524 receives data frames from the monitoring system 330 via the wireless transceiver 512. Additionally or alternatively, the data frames may include control signals. The switching module 524 provides the data frames received from the wireless transceiver 512 to the formatting module 520. However, if the data frames are destined for the compressor monitor module 316, the switching module 524 may instead transmit those frames to a power-line communication module 528 for transmission to the compressor monitor module 316.

A power supply 532 provides power to some or all of the components of the air handler monitor module 322. The power supply 532 may be connected to line voltage, which may be single phase 120 volt AC power. Alternatively, the power supply 532 may be connected to a stepped down voltage, such as a 24 volt power supply already present in the HVAC system. When the power received by the power supply 532 is also provided to the compressor monitor module 316, the power-line communication module 528 can communicate with the compressor monitor module 316 via the power supply 532. In other implementations, the power supply 532 may be distinct from the power-line communication module 528. The power-line communication module 528 may instead communicate with the compressor monitor module 316 using another connection, such as the switched cool signal (which may be a switched 24 volt line) provided to the compressor monitor module 316, another control line, a dedicated communications line, etc.

In various implementations, power to some components of the air handler monitor module 322 may be provided by 24 volt power from the thermostat 364. For example only, the cool request from the thermostat 364 may provide power to the compressor interrupt module 508. This may be possible when the compressor interrupt module 508 does not need to operate (and therefore does not need to be powered) unless the cool request is present, thereby powering the compressor interrupt module 508.

Data frames from the compressor monitor module 316 are provided to the switching module 524, which forwards those frames to the wireless transceiver 512 for transmission to the gateway 346. In various implementations, data frames from the compressor monitor module 316 are not processed by the air handler monitor module 322 other than to forward the frames to the gateway 346. In other implementations, the air handler monitor module 322 may combine data gathered by the air handler monitor module 322 with data gathered by the compressor monitor module 316 and transmit combined data frames.

In addition, the air handler monitor module 322 may perform data gathering or remedial operations based on the information from the compressor monitor module 316. For example only, the compressor monitor module 316 may transmit a data frame to the air handler monitor module 322 indicating that the air handler monitor module 322 should monitor various inputs. For example only, the compressor monitor module 316 may signal that the compressor is about to start running or has started running. The air handler monitor module 322 may then monitor related information.

Therefore, the formatting module 520 may provide such a monitoring indication from the compressor monitor module 316 to a trigger module 536. The trigger module 536 determines when to capture data, or if data is being continuously captured, which data to store, process, and/or forward data. The trigger module 536 may also receive a signal from an error module 540. The error module 540 may monitor an incoming current and generate an error signal when the current is at too high of a level for too long of a time.

The compressor monitor module 316 may be configured similarly to the air handler monitor module 322. In the compressor monitor module 316, a corresponding error module may determine that a high current level indicates a locked rotor condition of the compressor. For example only, a baseline run current may be stored, and a current threshold calculated by multiplying the baseline run current by a predetermined factor. The locked rotor condition may then be determined when a measurement of current exceeds the current threshold. This processing may occur locally because a quick response time to a locked rotor is beneficial.

The error module 540 may instruct the trigger module 536 to capture information to help diagnose this error and/or may send a signal to the compressor interrupt module 508 to disable the compressor. The disable signal received by the compressor interrupt module 508 may cause disabling of the compressor interrupt module 508 when either the error module 540 or the formatting module 520 indicates that the interruption is required. This logical operation is illustrated with an OR gate 542.

The formatting module 520 may disable the compressor based on an instruction from the monitoring system 330 and/or the compressor monitor module 316. For example, the monitoring system 330 may instruct the formatting module 520 to disable the compressor based on a request by a utility company. For example, during peak load times, the utility company may request air conditioning to be turned off in return for a discount on electricity prices. This shut off can be implemented via the monitoring system 330.

A water monitoring module 544 may monitor the conduction sensor 384, the float switch 376, and the condensate sensor 380. For example, when a resistivity of the conduction sensor 384 decreases below a certain value, which would happen in the presence of water, the water monitoring module 544 may signal to the error module 540 that water is present.

The water monitoring module 544 may also detect when the float switch 376 detects excessive water, which may be indicated by a closing or an opening of the float switch 376. The water monitoring module 544 may also detect when resistivity of the condensate sensor 380 changes. In various implementations, detection of the condensate sensor 380 may not be armed until a baseline current reading is made, such as at the time when the air handler monitor module 322 is powered on. Once the condensate sensor 380 is armed, a change in current may be interpreted as an indication that a blockage has occurred. Based on any of these water signals, the water monitoring module 544 may signal to the error module 540 that the compressor should be disabled.

A temperature tracking module 548 tracks temperatures of one or more HVAC components. For example, the temperature tracking module 548 may monitor the temperature of supply air and of return air. The temperature tracking module 548 may provide average values of temperature to the formatting module 520. For example only, the averages may be running averages. The filter coefficients of the running averages may be predetermined and may be modified by the monitoring system 330.

The temperature tracking module 548 may monitor one or more temperatures related to the air conditioning system. For example, a liquid line provides refrigerant to an expansion valve of the air handler unit 304 from a condenser of the compressor/condenser unit 308. A temperature may be measured along the refrigerant line before and/or after the expansion valve. The expansion valve may include, for example, a thermostatic expansion valve, a capillary tube, or an automatic expansion valve.

The temperature tracking module 548 may additionally or alternatively monitor one or more temperatures of an evaporator coil of the air handler unit 304. The temperatures may be measured along the refrigerant line at or near the beginning of the evaporator coil, at or near an end of the evaporator coil, or at one or more midpoints. In various implementations, the placement of the temperature sensor may be dictated by physical accessibility of the evaporator coil. The temperature tracking module 548 may be informed of the location of the temperature sensor. Alternatively, data about temperature location may be stored as part of installation data, which may be available to the formatting module 520 and/or to the monitoring system, which can use this information to accurately interpret the received temperature data.

A power calculation module 552 monitors voltage and current. In one implementation, these are the aggregate power supply voltage and the aggregate power supply current, which represents the total current consumed by all of the components of the air handler unit 304. The power calculation module 552 may perform a point-by-point power calculation by multiplying the voltage and current. Point-by-point power values and/or an average value of the point-by-point power is provided to the formatting module 520.

A current recording module 556 records values of the aggregate current over a period of time. The aggregate current may be sensed by a current sensor that is installed within the air handler unit 304 or along the electrical cable providing power to the air handler unit 304 (see current sensor 324 In FIG. 2). For example only, the current sensor may be located at a master switch that selectively supplies the incoming power to the air handler unit 304. Alternatively, the current sensor may be located closer to, or inside of, an electrical distribution panel. The current sensor may be installed in line with one or more of the electrical wires feeding current from the electrical distribution panel to the air handler unit 304.

The aggregate current includes current drawn by all energy consuming components of the air handler unit 304. For example only, the energy consuming components can include a gas valve solenoid, an igniter, a circulator blower motor, an inducer blower motor, a secondary heat source, an expansion valve controller, a furnace control panel, a condensate pump, and a transformer, which may provide power to a thermostat. The energy consuming components may also include the air handler monitor module 322 itself and the compressor monitor module 316.

It may be difficult to isolate the current drawn by any individual energy consuming component. Further, it may be difficult to quantify or remove distortion in the aggregate current, such as may be caused by fluctuations of the voltage level of incoming AC power. As a result, processing is applied to the current, which includes, for example only, filtering, statistical processing, and frequency domain processing.

In the implementation of FIG. 4A, the time domain series of currents from the current recording module 556 is provided to a fast Fourier transform (FFT) module 560, which generates a frequency spectrum from the time domain current values. The length of time and the frequency bins used by the FFT module 560 may be configurable by the monitoring system 330. The FFT module 560 may include, or be implemented by, a digital signal processor (DSP). In various implementations, the FFT module 560 may perform a discrete Fourier transform (DFT). The current recording module 556 may also provide raw current values, an average current value (such as an average of absolute values of the current), or an RMS current value to the formatting module 520.

A clock 564 allows the formatting module 520 to apply a time stamp to each data frame that is generated. In addition, the clock 564 may allow the trigger module 536 to periodically generate a trigger signal. The trigger signal may initiate collection and/or storage and processing of received data. Periodic generation of the trigger signal may allow the monitoring system 330 to receive data from the air handler monitor module 322 frequently enough to recognize that the air handler monitor module 322 is still functioning.

A voltage tracking module 568 measures the AC line voltage, and may provide raw voltage values or an average voltage value (such as an average of absolute values of the voltage) to the formatting module 520. Instead of average values, other statistical parameters may be calculated, such as RMS (root mean squared) or mean squared.

Based on the trigger signal, a series of frames may be generated and sent. For example only, the frames may be generated contiguously for 105 seconds and then intermittently for every 15 seconds until 15 minutes has elapsed. Each frame may include a time stamp, RMS voltage, RMS current, real power, average temperature, conditions of status signals, status of liquid sensors, FFT current data, and a flag indicating the source of the trigger signal. Each of these values may correspond to a predetermined window of time, or, frame length.

The voltage and current signals may be sampled by an analog-to-digital converter at a certain rate, such as 1920 samples per second. The frame length may be measured in terms of samples. When a frame is 256 samples long, at a sample rate of 1920 samples per second, there are 7.5 frames every second (or, 0.1333 seconds per frame). Generation of the trigger signal is described in more detail below in FIG. 7. The sampling rate of 1920 Hz has a Nyquist frequency of 960 Hz and therefore allows an FFT bandwidth of up to approximately 960 Hz. An FFT limited to the time span of a single frame may be calculated by the FFT module 560 for each of the frames.

The formatting module 520 may receive a request for a single frame from the monitoring system 330. The formatting module 520 therefore provides a single frame in response to the request. For example only, the monitoring system 330 may request a frame every 30 seconds or some other periodic interval, and the corresponding data may be provided to a contractor monitoring the HVAC system in real time.

Figure 4B:
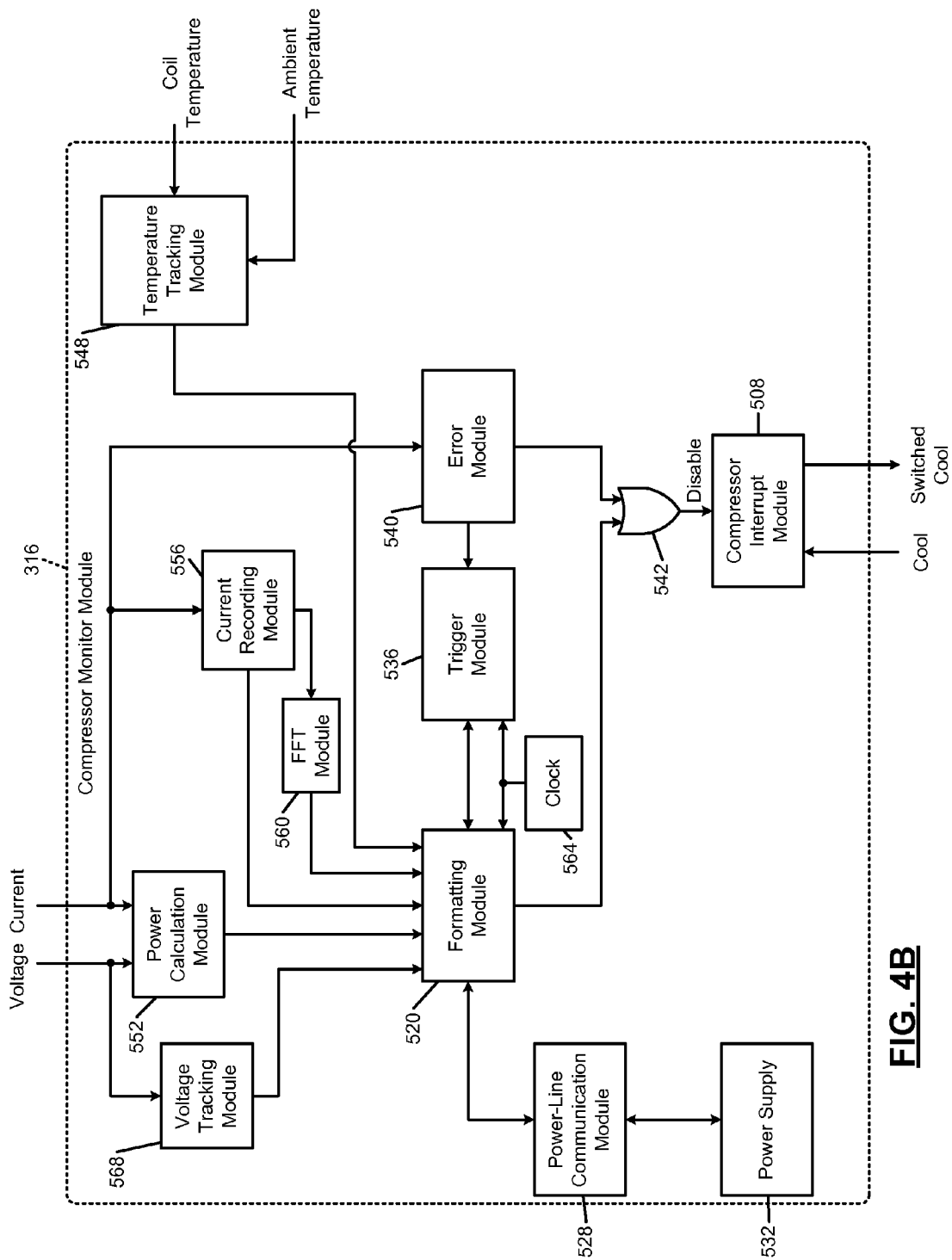
FIG. 4B is a functional block diagram of an example implementation of the compressor monitor module.

Referring now to FIG. 4B, an example implementation of the compressor monitor module 316 is shown. Components of the compressor monitor module 316 may be similar to components of the air handler monitor module 322 of FIG. 4A. For example only, the compressor monitor module 316 may include the same hardware components as the air handler monitor module 322, where unused components, such as the wireless transceiver 512, are simply disabled or deactivated. In various other implementations, a circuit board layout may be shared between the air handler monitor module 322 and the compressor monitor module 316, with various locations on the printed circuit board being depopulated (corresponding to components present in the air handler monitor module 322 but not implemented in the compressor monitor module 316).

The current recording module 556 of FIG. 4B receives an aggregate current value (such as from current sensor 320 of FIG. 2) that represents the current to multiple energy consuming components of the compressor/condenser unit 308. The energy consuming components may include start windings, run windings, capacitors, and contactors/relays for a condenser fan motor and a compressor motor. The energy consuming components may also include a reversing valve solenoid, a control board, and in some implementations the compressor monitor module 316 itself.

In the compressor monitoring module 316, the temperature tracking module 548 may track an ambient temperature. When the compressor monitor module 316 is located outdoors, the ambient temperature represents an outside temperature. As discussed above, the temperature sensor supplying the ambient temperature may be located outside of an enclosure housing a compressor or condenser. Alternatively, the temperature sensor may be located within the enclosure, but exposed to circulating air. In various implementations the temperature sensor may be shielded from direct sunlight and may be exposed to an air cavity that is not directly heated by sunlight.

The temperature tracking module 548 may monitor temperatures of the refrigerant line at various points, such as before the compressor (referred to as a suction line temperature), after the compressor (referred to as a compressor discharge temperature), after the condenser (referred to as a liquid line out temperature), and/or at one or more points along the condenser coil. The location of temperature sensors may be dictated by a physical arrangement of the condenser coils. During installation, the location of the temperature sensors may be recorded.

Additionally or alternatively, a database may be available that specifies where temperature sensors are placed. This database may be referenced by installers and may allow for accurate cloud processing of the temperature data. The database may be used for both air handler sensors and compressor/condenser sensors. The database may be prepopulated by the monitoring company or may be developed by trusted installers, and then shared with other installation contractors. The temperature tracking module 548 and/or a cloud processing function may determine an approach temperature, which is a measurement of how close the condenser has been able to make the liquid line out temperature to the ambient air temperature.

Referring now to FIGS. 5A-5I, block diagrams of example implementations of the air handler monitor module 322 are shown. Although the functions depicted in FIG. 4A may be performed by various circuitry blocks of FIGS. 5A-5I, there may not be a one-to-one correspondence between the functional blocks of FIG. 4A and the circuitry blocks of any of FIGS. 5A-5I.

Figure 5A:
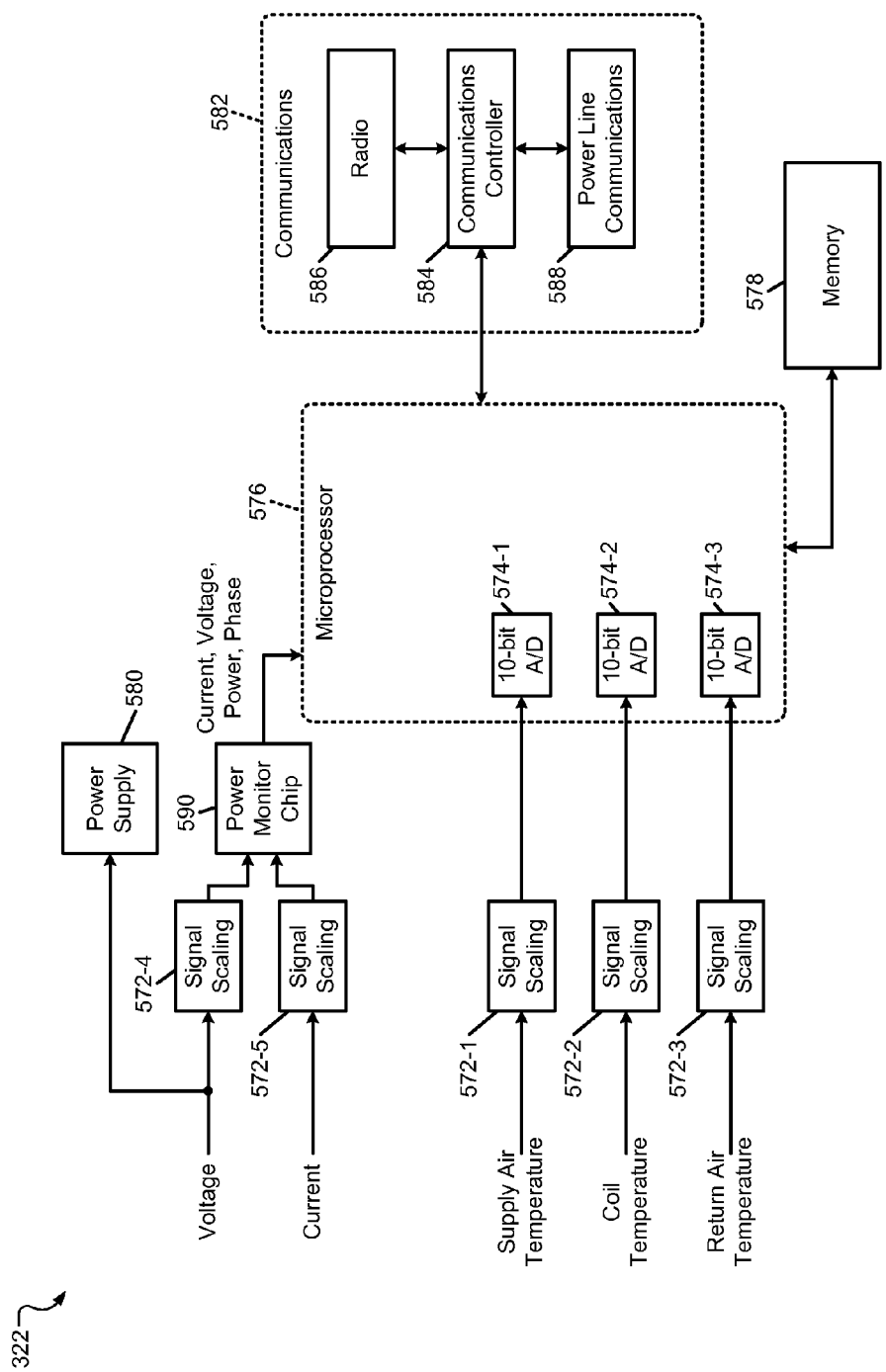
FIGS. 5A-5I are block diagrams of example implementations of the air handler monitor module.

Referring now to FIG. 5A, temperatures are received by signal scaling blocks 572-1, 572-2, and 572-3 (collectively, signal scaling blocks 572). For example only, the signal scaling blocks 572 may include resistive dividers and/or amplifiers to scale the input signals appropriately and provide the scaled signals to analog-to-digital (A/D) converters 574-1, 574-2, and 574-3, respectively (collectively, A/D converters 574). A microprocessor 576 may include the A/D converters 574. The microprocessor executes code from memory 578. Signal scaling blocks 572-4 and 572-5 scale voltage and current, respectively.

A power supply 580 provides power to components of the air handler monitor module 322. A communications module 582 includes a communications controller 584, a radio 586 for wireless communication, and a power line communications module 588 for power line communications. A power monitor chip 590 may monitor the scaled voltage and current and provide current and voltage information, as well as power information and phase information, to the microprocessor 576.

Figure 5B:
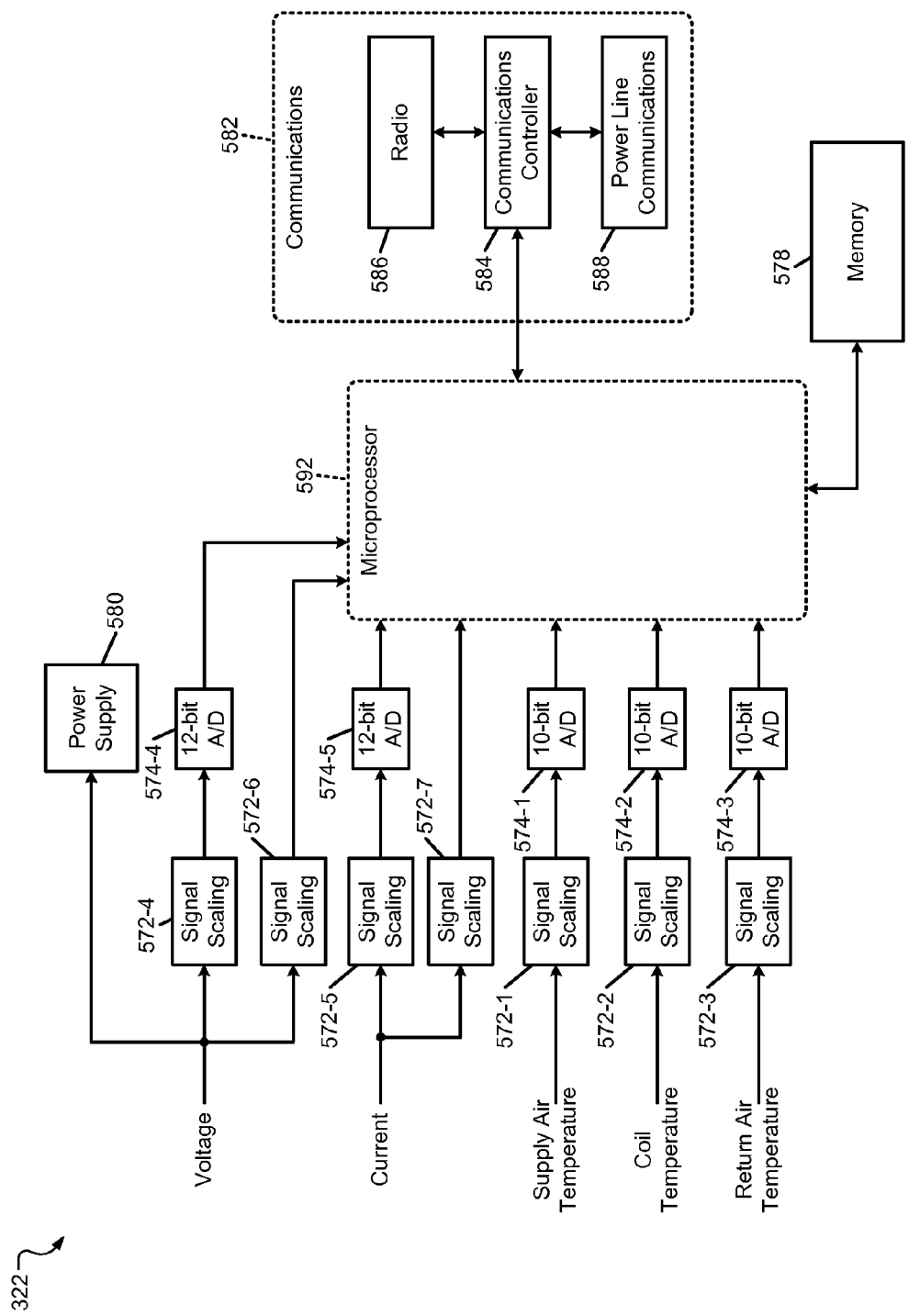

Referring now to FIG. 5B, signal scaling blocks 572-6 and 572-7 receive the voltage and current, respectively, and provide those values to a microprocessor 592. For example only, the microprocessor 592 may include comparators to determine zero-crossing events of the voltage and/or current in response to the analog signals from the signal scaling blocks 572-6 and 572-7. A/D converters 574-4 and 574-5 convert scaled voltage and current signals, respectively, into digital values that are provided to a microprocessor 592. In the implementation shown in FIG. 5B, the A/D converters 574-1, 574-2, and 574-3 are not integrated with microprocessor 592 and are instead stand-alone.

Although 10-bit and 12-bit A/D converters are shown, A/D converters having more or less resolution may be chosen. In various implementations, such as shown in FIG. 5B, higher-resolution A/D converters may be used for values, such as current and voltage, where higher precision is desired and where the source analog signals themselves are of higher precision.

Figure 5C:
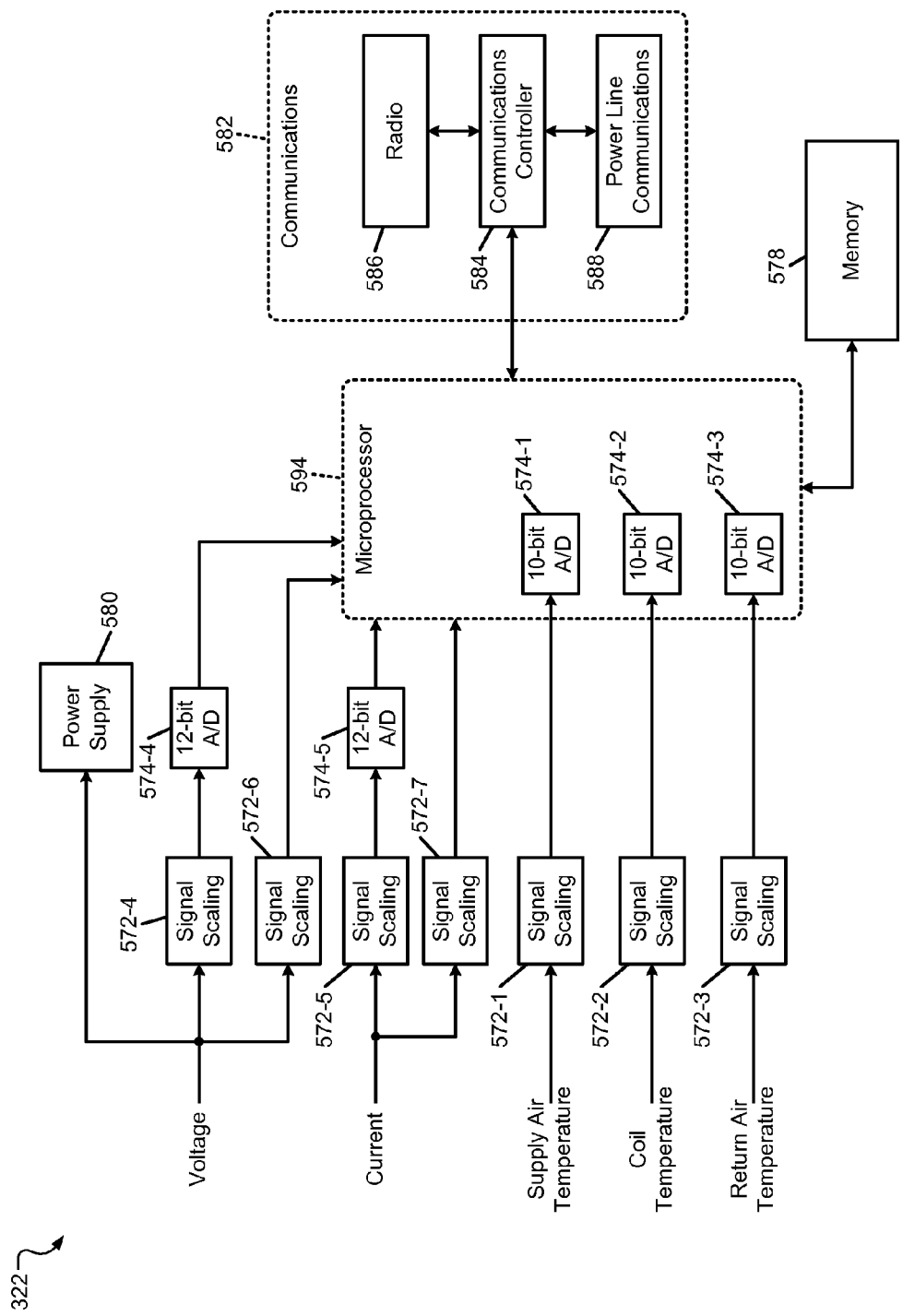

Referring now to FIG. 5C, an implementation similar to that of FIG. 5B is shown. In FIG. 5C, the A/D converters 574-1, 574-2, and 574-3 are integrated in a microprocessor 594.

Figure 5D:
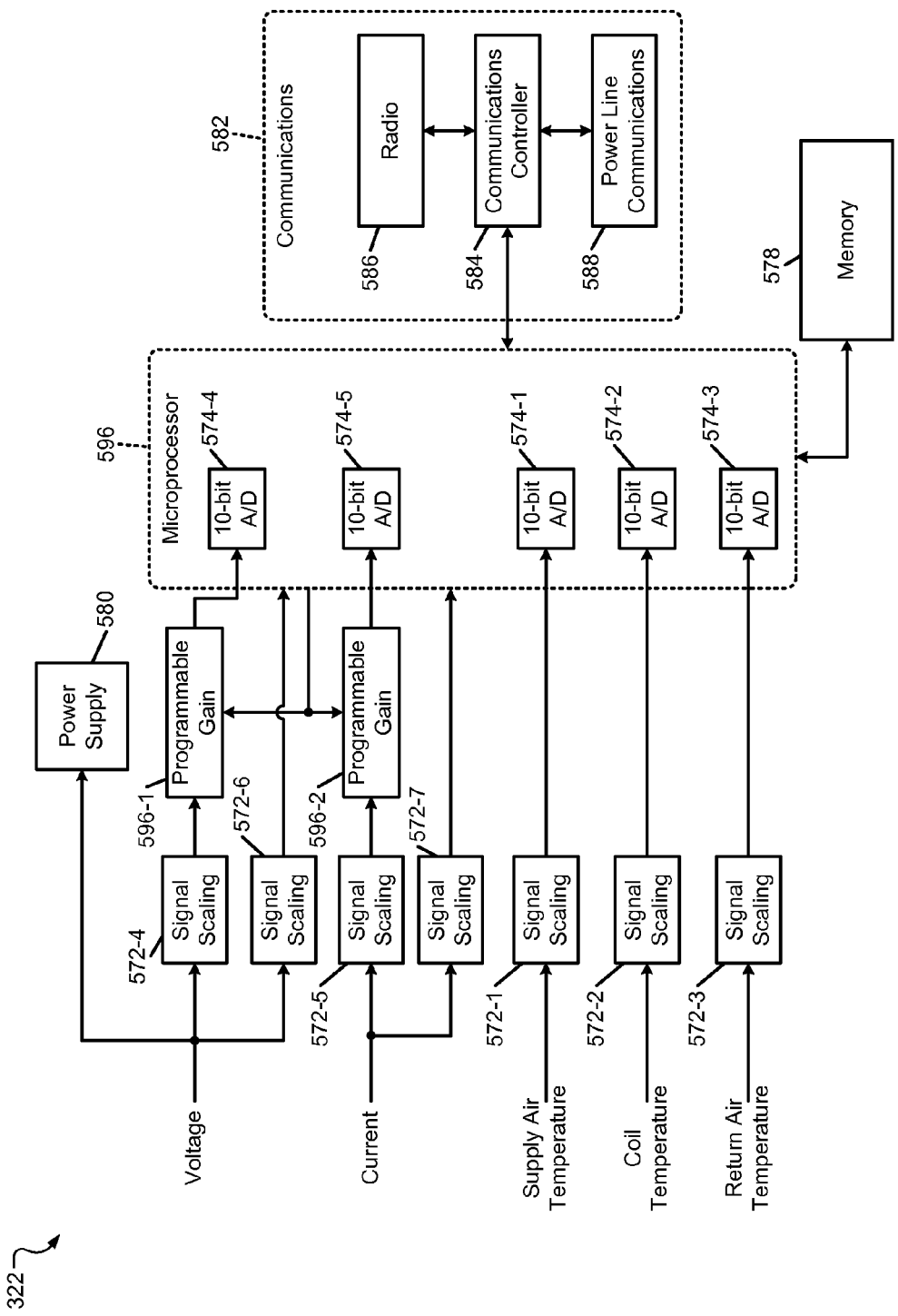

Referring now to FIG. 5D, programmable gain modules 596-1 and 596-2 allow programmable gains to be applied to the voltage and current. This may allow for features such as automatic gain control. A microprocessor 596 controls the programmable gain module 596-1 and 596-2 using a common value or using individual values. In FIG. 5D, the A/D converters 574-4 and 5745 are integrated in a microprocessor 596. In various implementations, the microprocessor 596 may offer only a certain resolution of A/D converters, such as 10-bit, in which case the A/D converters 574-4 and 574-5 may have 10-bit resolution instead of 12-bit resolution.

Figure 5E:
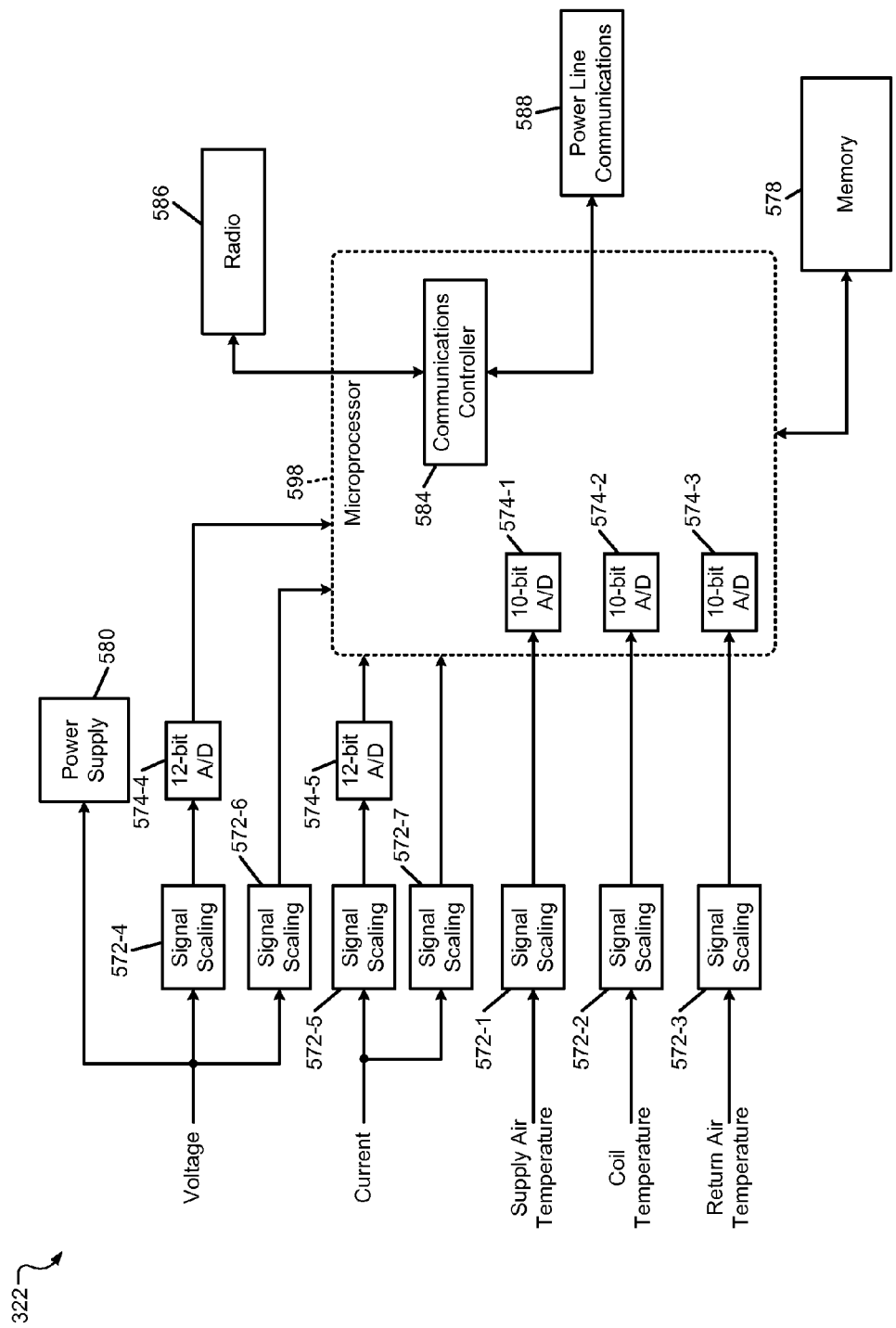

Referring now to FIG. 5E, a microprocessor 598 integrates the communications controller 584.

Figure 5F:
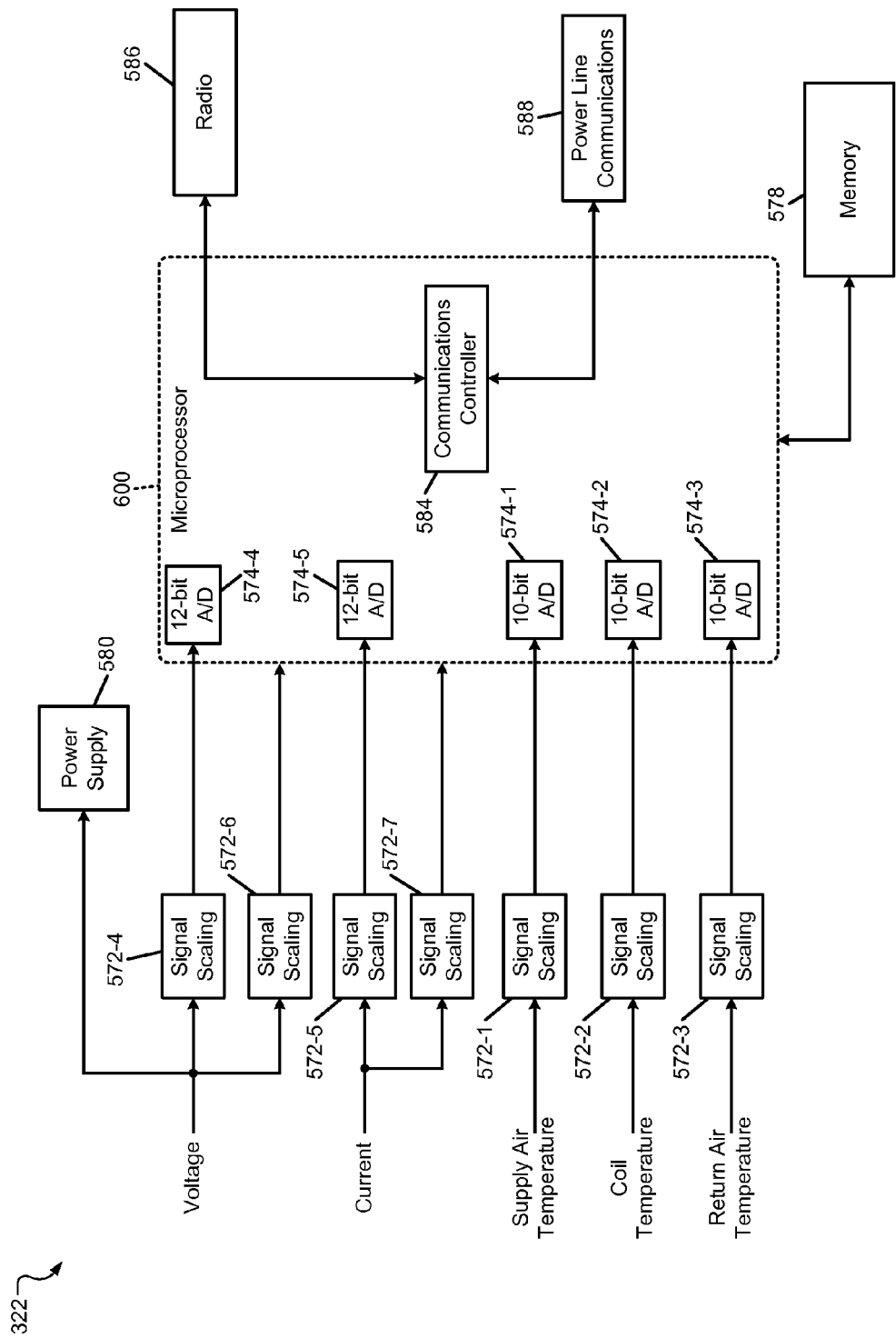

Referring now to FIG. 5F, a microprocessor 600 further integrates the A/D converters 574-4 and 574-5, and in this case, maintains the 12-bit resolution.

Figure 5G:
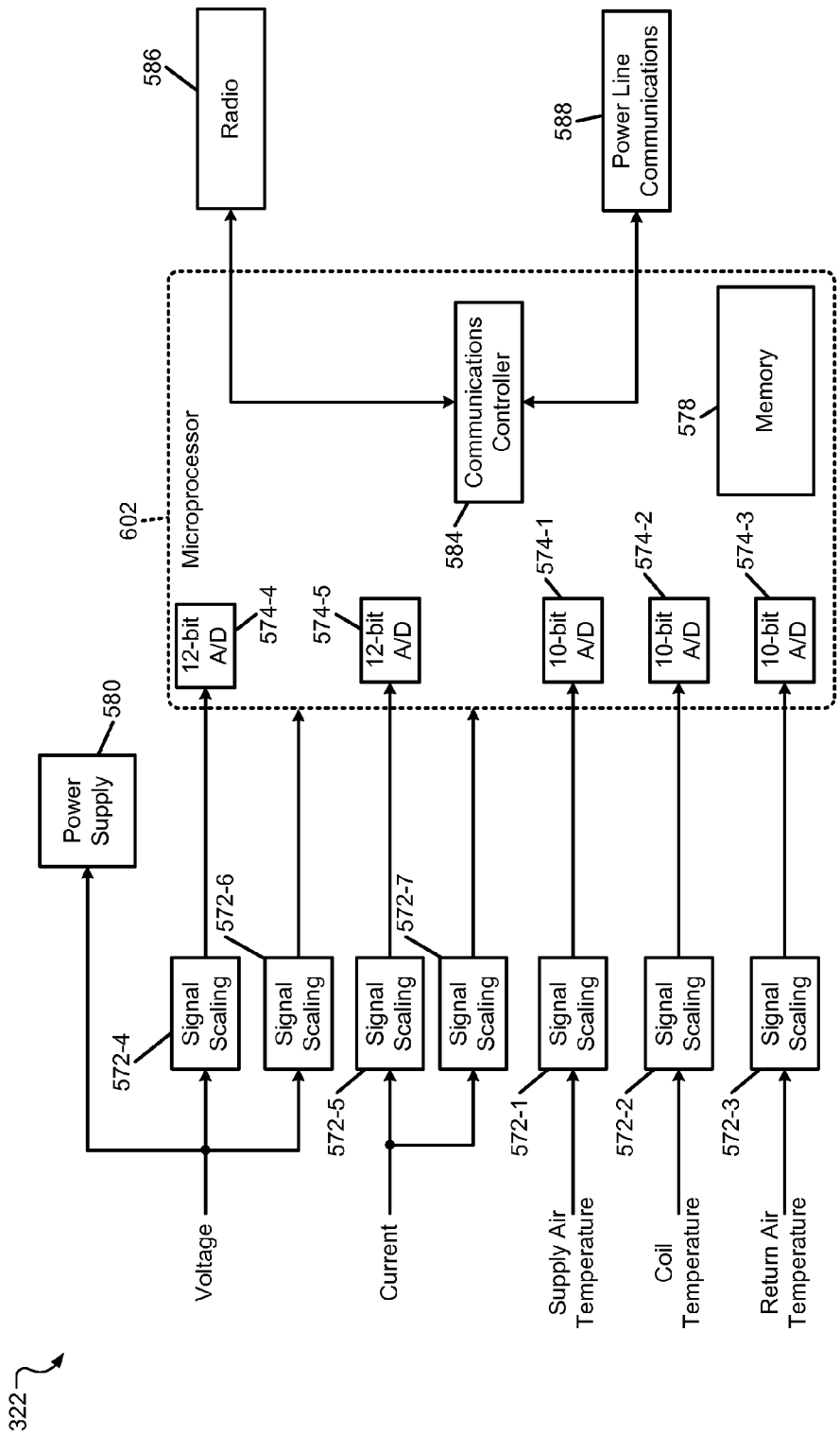

Referring now to FIG. 5G, a microprocessor 602 integrates the memory 578 on chip. Additional memory (not shown) may be provided off chip.

Figure 5H:
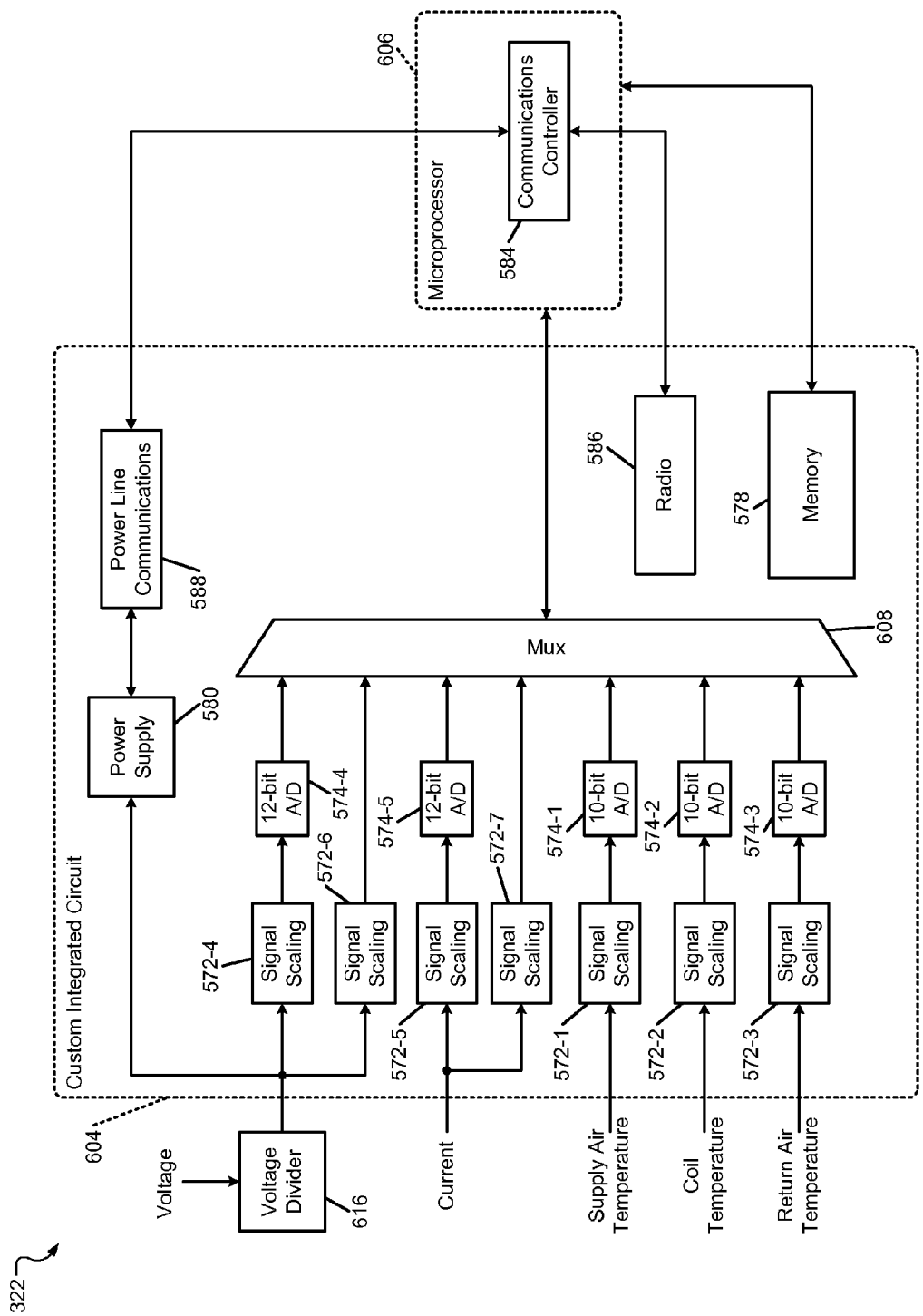

Referring now to FIG. 5H, a custom integrated circuit 604 may integrate many of the functions described above, including the power supply 580, the power line communications module 588, the radio 586, and the memory 578. The custom integrated circuit 604 includes a multiplexer 608, which provides sensed data to a microprocessor 606 over a multiplexed bus. The microprocessor 606 may also implement the communications controller 584. To provide voltage compatible with the custom integrated circuit 604, a voltage divider 616 is located prior to the voltage signal entering the custom integrated circuit 604.

Figure 5I:
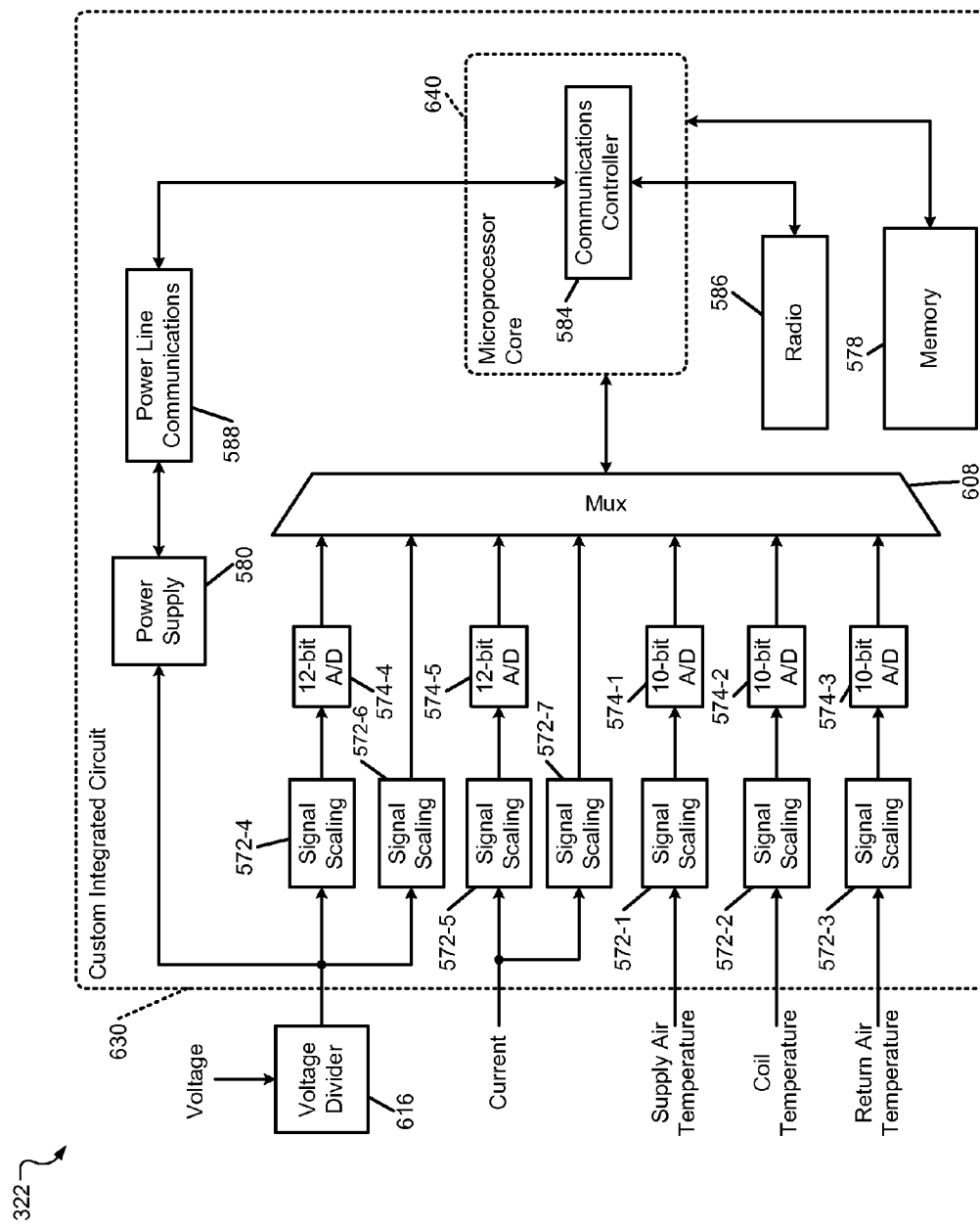

Referring now to FIG. 5I, a custom integrated circuit 630 may implement the modules of the custom integrated circuit 604 of FIG. 5H as well as integrating the microprocessor 606 by using a microprocessor core 640.

Figure 5J:
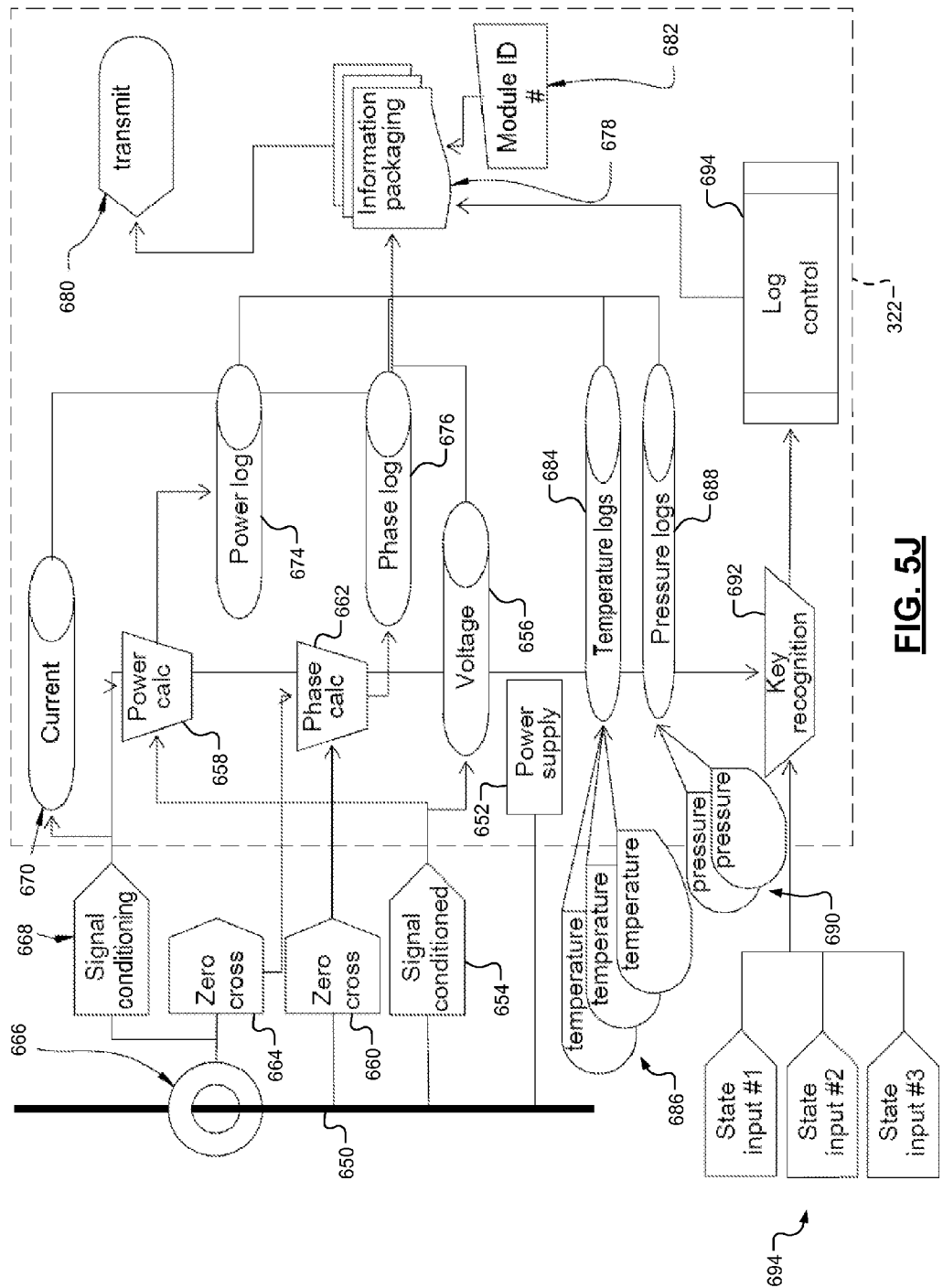
FIG. 5J is a data flow diagram of a monitor module according to the principles of the present disclosure.

Referring now to FIG. 5J, a data flow diagram is shown for a monitoring module, such as the air handler monitor module 322. A power line 650 supplies power to a power supply 652. The voltage of the power line 650 is conditioned by a signal conditioning block 654 and then provided to a voltage log 656 and a power calculator 658. Zero crossings of the voltage are monitored by a zero cross block 660 and transmitted to a phase calculation module 662. The phase calculation module 662 determines phase difference between voltage and current based on zero crossing information from the zero cross block 660 and a current zero cross block 664.

The current zero cross block 664 receives current from a current sensor 666, which also provides current values to a signal conditioning block 668, which conditions the current values, such as by applying filters, and provides them to a current monitor 670 and a power calculation block 658. The power calculation block determines power based on the current and voltage and supplies the result to a power log 674.

The current log 672, the power log 674, a phase log 676, and the voltage log 656 provide information to an information packaging block 678. The information packaging block 678 packages information for transmission by a transmit block 680. The information packaging block 678 may provide identifying information such as a module ID number 682. A temperature log 684 receives one or more temperature signals 686, while a pressure log 688 receives one or more pressures 690.

A key recognition block 692 monitors inputs from a variety of sources, which may include the power calculation block 658, the phase calculation block 662, the voltage log 656, the temperature log 684, the pressure log 688, and state inputs 694, such as call for heat and call for cool control lines. The key recognition block 692 may identify which portions of each of the logs is transmitted by the transmit block 680.

The key recognition block 692 identifies occurrence of certain events, such as the beginning of a call for heat or call for cool. In addition, the key recognition block 692 may recognize when anomalous situations have occurred, such as over-voltage, over-current, or temperatures or pressures out of bounds. In response to identification of events by the key recognition block 692, a log control block 694 may control the information packaging block 678 to discard or only locally store low priority information, to delay transmitting medium priority information, and to transmit higher priority information more quickly or even immediately.

Figure 6:
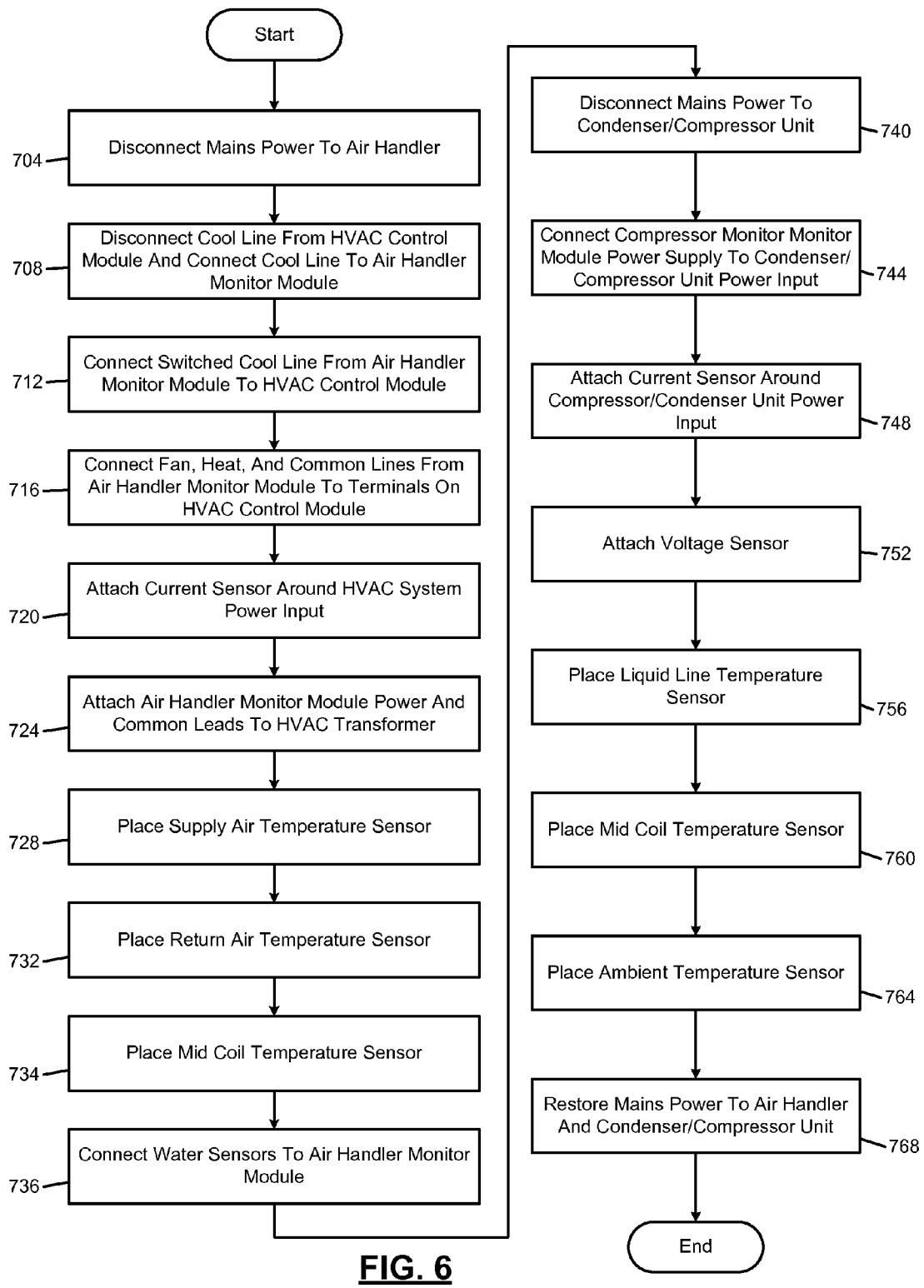
FIG. 6 is a flowchart depicting a brief overview of an example module installation in a retrofit application.
Figure 7:
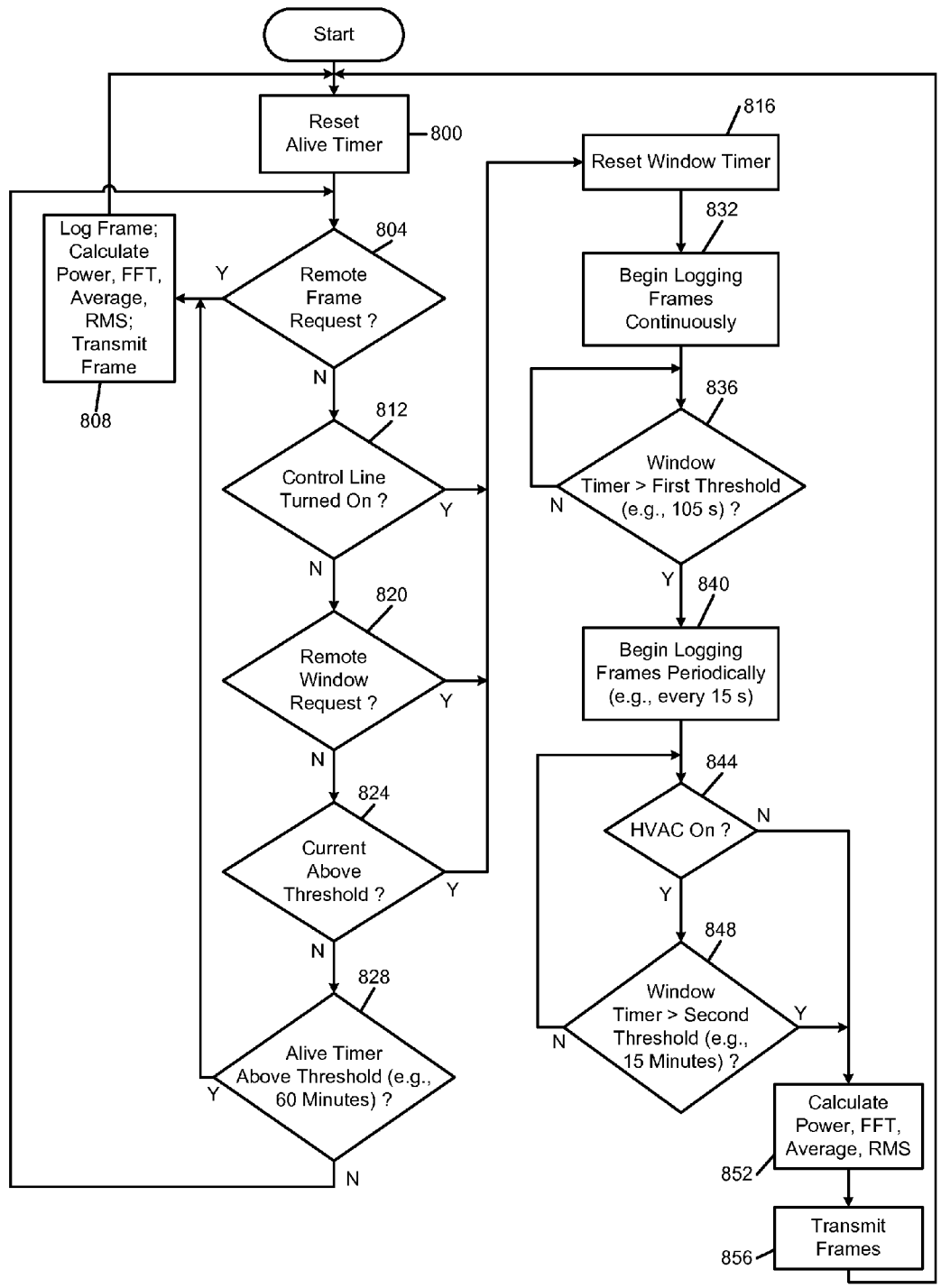
FIG. 7 is a flowchart of example operation in capturing frames of data.

Referring now to FIG. 6, a brief overview of an example monitoring system installation, such as in a retrofit application, is presented. Although FIGS. 6 and 7 are drawn with arrows indicating a specific order of operation, the present disclosure is not limited to this specific order. At 704, mains power to the air handler is disconnected. If there is no outside disconnect for the mains power to the compressor/condenser unit, mains power to the compressor/condenser unit should also be disconnected at this point. At 708, the cool line is disconnected from the HVAC control module and connected to the air handler monitor module. At 712, the switched cool line from the air handler monitor module is connected to the HVAC control module where the cool line was previously connected.

At 716, fan, heat, and common lines from the air handler monitor module are connected to terminals on the HVAC control module. In various implementations, the fan, heat, and common lines originally going to the HVAC control module may be disconnected and connected to the air handler monitor module. This may be done for HVAC control modules where additional lines cannot be connected in parallel with the original fan, heat, and common lines.

At 720, a current sensor such as a snap-around current transformer, is connected to mains power to the HVAC system. At 724, power and common leads are connected to the HVAC transformer, which may provide 24 volt power to the air handler monitor module. In various implementations, the common lead may be omitted, relying on the common lead discussed at 716. Continuing at 728, a temperature sensor is placed in the supply air duct work and connected to the air handler monitor module. At 732, a temperature sensor is placed in the return air duct work and connected to the air handler monitor module. At 734, a temperature sensor is placed in a predetermined location, such as a middle loop, of the evaporator coil. At 736, water sensors are installed and connected to the air handler monitor module.

At 740, mains power to the compressor/condenser unit is disconnected. At 744, the power supply of the compressor monitor module is connected to the compressor/condenser unit's input power. For example, the compressor monitor module may include a transformer that steps down the line voltage into a voltage usable by the compressor monitor module. At 748, a current sensor is attached around the compressor/condenser unit's power input. At 752, a voltage sensor is connected to the compressor/condenser unit's power input.

At 756, a temperature sensor is installed on the liquid line, such as at the input or the output to the condenser. The temperature sensor may be wrapped with insulation to thermally couple the temperature sensor to the liquid in the liquid line and thermally isolate the temperature sensor from the environment. At 760, the temperature sensor is placed in a predetermined location of the condenser coil and insulated. At 764, the temperature sensor is placed to measure ambient air. The temperature sensor may be located outside of the outdoor enclosure 312 or in a space of the outdoor enclosure 312 in which outside air circulates. At 768, mains power to the air handler and the compressor/condenser unit is restored.

Referring now to FIG. 7, a flowchart depicts example operation in capturing frames of data. Control begins upon startup of the air handler monitor module at 800, where an alive timer is reset. The alive timer ensures that a signal is periodically sent to the monitoring system so that the monitoring system knows that the air handler monitor module is still alive and functioning. In the absence of this signal, the monitoring system 330 will infer that the air handler monitor module is malfunctioning or that there is connectivity issue between the air handler monitor module and the monitoring system.

Control continues at 804, where control determines whether a request for a frame has been received from the monitoring system. If such a request has been received, control transfers to 808; otherwise, control transfers to 812. At 808, a frame is logged, which includes measuring voltage, current, temperatures, control lines, and water sensor signals. Calculations are performed, including averages, powers, RMS, and FFT. Then a frame is transmitted to the monitoring system. In various implementations, monitoring of one or more control signals may be continuous. Therefore, when a remote frame request is received, the most recent data is used for the purpose of calculation.

Control then returns to 800. Referring now to 812, control determines whether one of the control lines has turned on. If so, control transfers to 816; otherwise, control transfers to 820. Although 812 refers to the control line being turned on, in various other implementations, control may transfer to 816 when a state of a control line changes—i.e., when the control line either turns on or turns off. This change in status may be accompanied by signals of interest to the monitoring system. Control may also transfer to 816 in response to an aggregate current of either the air handler unit or the compressor/condenser unit.

At 820, control determines whether a remote window request has been received. If so, control transfers to 816; otherwise, control transfers to 824. The window request is for a series of frames, such as is described below. At 824, control determines whether current is above a threshold, and if so, control transfers to 816; otherwise, control transfers to 828. At 828, control determines whether the alive timer is above a threshold such as 60 minutes. If so, control transfers to 808; otherwise, control returns to 804.

At 816, a window timer is reset. A window of frames is a series of frames, as described in more detail here. At 832, control begins logging frames continuously. At 836, control determines whether the window timer has exceeded a first threshold, such as 105 seconds. If so, control continues at 840; otherwise, control remains at 836, logging frames continuously. At 840, control switches to logging frames periodically, such as every 15 seconds.

Control continues at 844, where control determines whether the HVAC system is still on. If so, control continues at 848; otherwise, control transfers to 852. Control may determine that the HVAC system is on when an aggregate current of the air handler unit and/or of the compressor unit exceeds a predetermined threshold. Alternatively, control may monitor control lines of the air handler unit and/or the compressor unit to determine when calls for heat or cool have ended. At 848, control determines whether the window timer now exceeds a second threshold, such as 15 minutes. If so, control transfers to 852; otherwise, control returns to 844 while control continues logging frames periodically.

At 852, control stops logging frames periodically and performs calculations such as power, average, RMS, and FFT. Control continues at 856 where the frames are transmitted. Control then returns to 800. Although shown at the end of frame capture, 852 and 856 may be performed at various times throughout logging of the frames instead of at the end. For example only, the frames logged continuously up until the first threshold may be sent as soon as the first threshold is reached. The remaining frames up until the second threshold is reached may each be sent out as it is captured.

In various implementations, the second threshold may be set to a high value, such as an out of range high, which effectively means that the second threshold will never be reached. In such implementations, the frames are logged periodically for as long as the HVAC system remains on.

A server of the monitoring system includes a processor and memory, where the memory stores application code that processes data received from the air handler monitor and compressor monitor modules and determines existing and/or impending failures, as described in more detail below. The processor executes this application code and stores received data either in the memory or in other forms of storage, including magnetic storage, optical storage, flash memory storage, etc. While the term server is used in this application, the application is not limited to a single server.

A collection of servers, which may together operate to receive and process data from the air handler monitor and compressor monitor modules of multiple residences. A load balancing algorithm may be used between the servers to distribute processing and storage. The present application is not limited to servers that are owned, maintained, and housed by a monitoring company. Although the present disclosure describes diagnostics and processing and alerting occurring in the monitoring system 330, some or all of these functions may be performed locally using installed equipment and/or homeowner resources, such as a homeowner computer.

The servers may store baselines of frequency data for the HVAC system of a residence. The baselines can be used to detect changes indicating impending or existing failures. For example only, frequency signatures of failures of various components may be pre-programmed, and may be updated based on observed evidence from contractors. For example, once a malfunctioning HVAC system has been diagnosed, the monitoring system may note the frequency data leading up to the malfunction and correlate that frequency signature with the diagnosed cause of the malfunction. For example only, a computer learning system, such as a neural network or a genetic algorithm, may be used to refine frequency signatures. The frequency signatures may be unique to different types of HVAC systems and/or may share common characteristics. These common characteristics may be adapted based on the specific type of HVAC system being monitored.

The monitoring system may also receive current data in each frame. For example, when 7.5 frames per seconds are received, current data having a 7.5 Hz resolution is available. The current and/or the derivative of this current may be analyzed to detect impending or existing failures. In addition, the current and/or the derivative may be used to determine when to monitor certain data, or points at which to analyze obtained data. For example, frequency data obtained at a predetermined window around a certain current event may be found to correspond to a particular HVAC system component, such as activation of a hot surface igniter.

Components of the present disclosure may be connected to metering systems, such as utility (including gas and electric) metering systems. Data may be uploaded to the monitoring system 330 using any suitable method, including communications over a telephone line. These communications may take the form of digital subscriber line (DSL) or may use a modem operating at least partially within vocal frequencies. Uploading to the monitoring system 330 may be confined to certain times of day, such as at night time or at times specified by the contractor or homeowner. Further, uploads may be batched so that connections can be opened and closed less frequently. Further, in various implementations, uploads may occur only when a fault or other anomaly has been detected.

Methods of notification are not restricted to those disclosed above. For example, notification of HVAC problems may take the form of push or pull updates to an application, which may be executed on a smart phone or other mobile device or on a standard computer. Notifications may also be viewed using web applications or on local displays, such as the thermostat 364 or other displays located throughout the residence or on the air handler monitor module 322 or the compressor monitor module 316.

Figure 8:
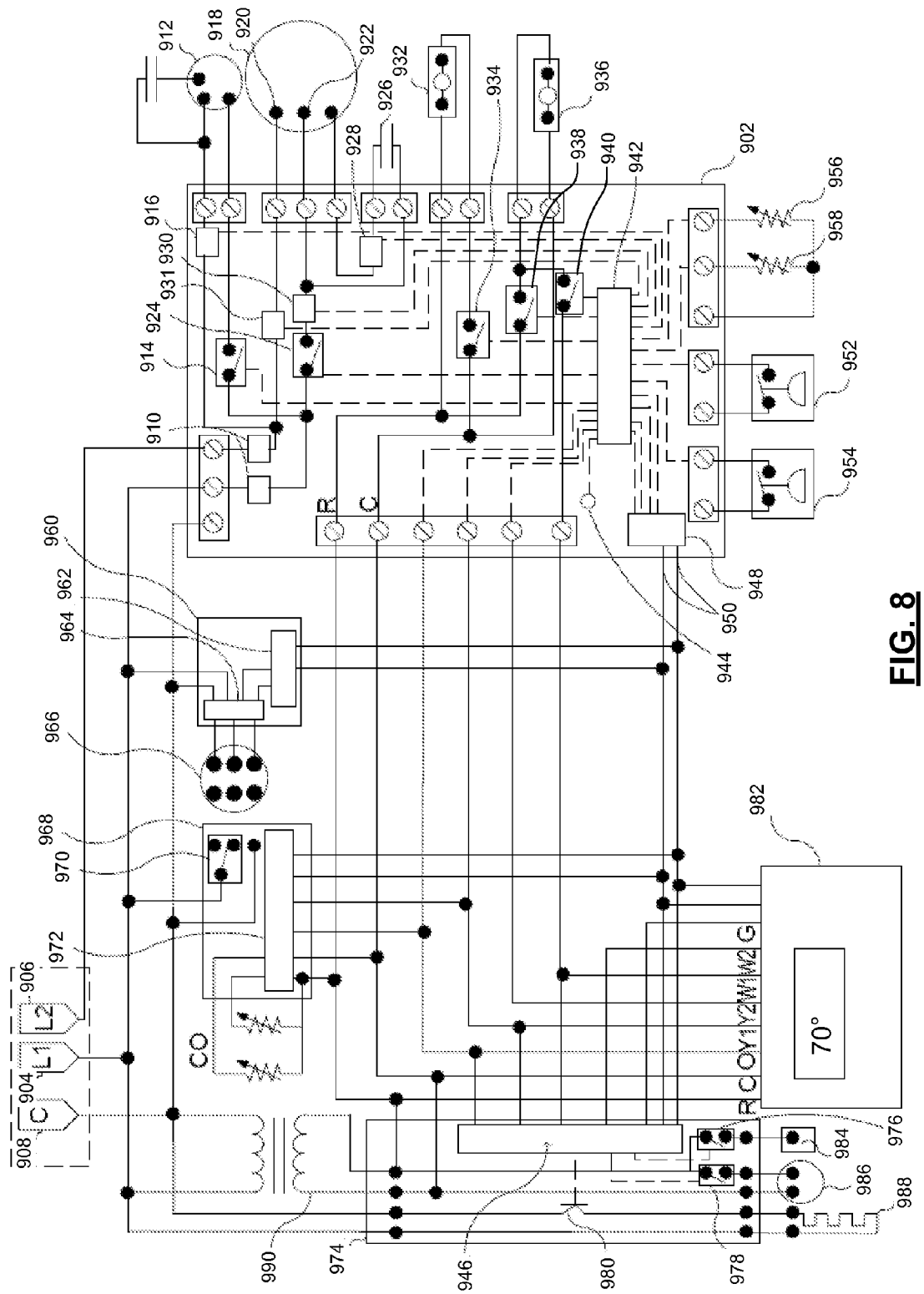
FIG. 8 is an example functional schematic of example HVAC components.

Referring now to FIG. 8, a functional schematic of example HVAC components is shown. An air conditioning unit controller 902 receives power from a first power line 904, a second power line 906, and a neutral line 908 (also called a center tap CT). Current sensors 910 measure current arriving on the first power line 904 and the second power line 906. A condenser fan 912 is controlled by a switch 914. A current sensor 916 that monitors current to the condenser fan may be eliminated according to the principles of the present disclosure.

A compressor motor 918 includes a start winding 920 and a run winding 922 and is controlled by a switch 924. A run capacitor 926 may be connected across terminals of the compressor motor 918. Current sensors 928, 930, and 931, which measure currents supplied to the compressor motor 918, may be eliminated in accordance with the principles of the present disclosure. A mid-capacity solenoid 932 may be actuated by a switch 934. The mid-capacity solenoid 932 may alter the capacity of the compressor motor 918, for example from a high capacity to a medium capacity.

A reversing valve 936 may be controlled by a switch 938 and/or by a switch 940. A processor 942 controls switches 914, 924, 934, 938, and 940. The processor 942 may provide visual indicators of operation, such as on a screen or via a blinking multicolor light-emitting diode 944. The processor 942 may communicate with a furnace control processor 946 via a network port 948 over networking lines 950. The processor 942 may operate in response to a high side refrigerant processor 952 and a low side refrigerant processor 954. The processor 942 may also operate in response to an outside ambient temperature sensor 956 and a condenser coil temperature sensor 958.

A blower motor controller 960 communicates over the network using the networking lines 950. The blower motor controller 960 may include a blower control processor 962 and a inverter driver 964. The inverter driver 964 drives a circulator blower motor 966. A circulator blower controller 968 controls the blower motor controller 960 over the network using the networking lines 950. The circulator blower controller includes a relay 970 and a circulator control processor 972.

A furnace controller 974 includes the furnace control processor 946 and switches 976, 978, and 980. The furnace controller 974 receives power from one of the lines 904 or 906 and the neutral line 908. The furnace control processor 946 receives control signals from a thermostat 982 and actuates the switches 976, 978, and 980 in response. The switch 976 may be a relay and controls a gas valve 984, which regulates combustion fuel to the furnace. The switch 978 controls an inducer motor 986, which exhausts combustion gases. The switch 980 controls an igniter 988, which ignites the fuel. The furnace controller 974 and the thermostat 982 are powered by a transformer 990.

Figure 9:
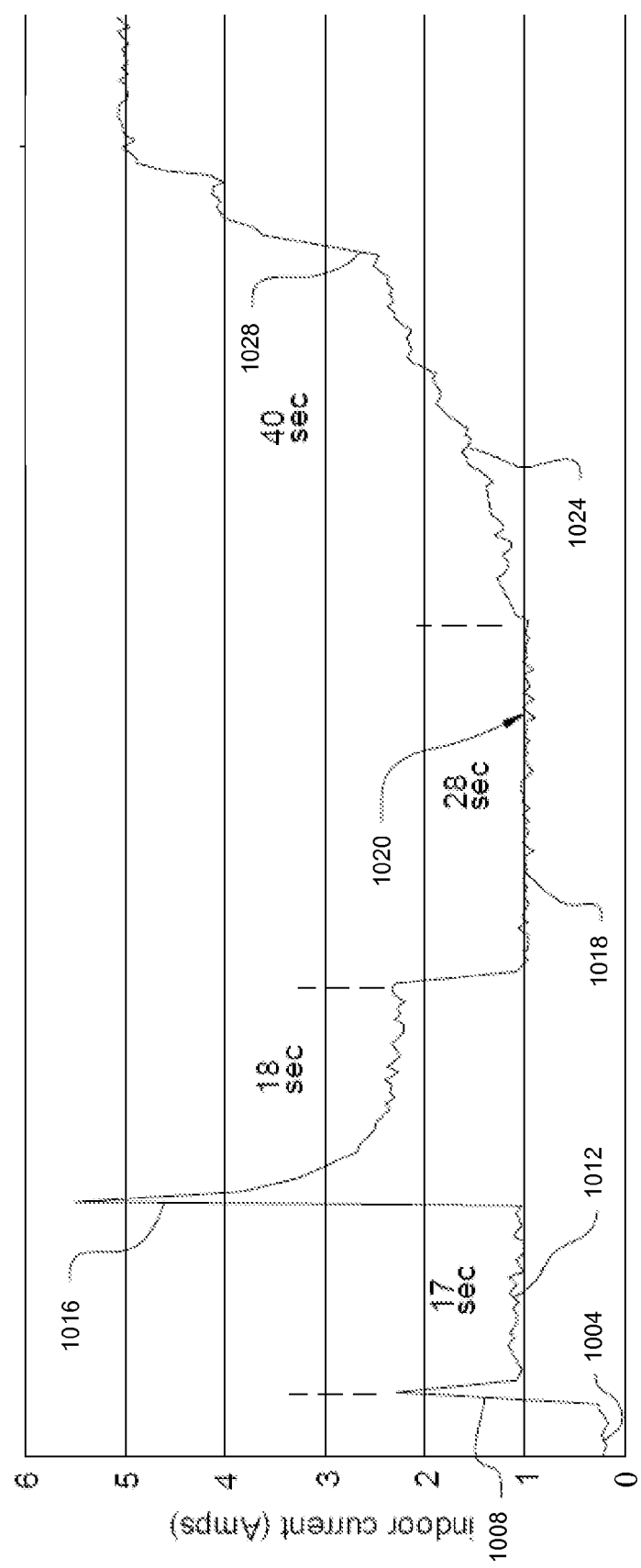
FIG. 9 is an example time domain trace of aggregate current for a beginning of a heat cycle.

Referring now to FIG. 9, an aggregate current level begins at a non-zero current 1004 indicating that at least one energy consuming component is consuming energy. A spike in current 1008 may indicate that another component is turning on. Elevated current 1012 may correspond to operation of the inducer blower. This is followed by a spike 1016, which may indicate the beginning of operation of a hot surface igniter. After opening of a solenoid-operated gas valve, the hot surface igniter may turn off, which returns current to a level corresponding to the inducer blower at 1018. The current may remain approximately flat 1020 until a current ramp 1024 begins, indicating the beginning of circulator blower operation. A spike 1028 may indicate transition from starting to running of the circulator blower.

Figure 10A:
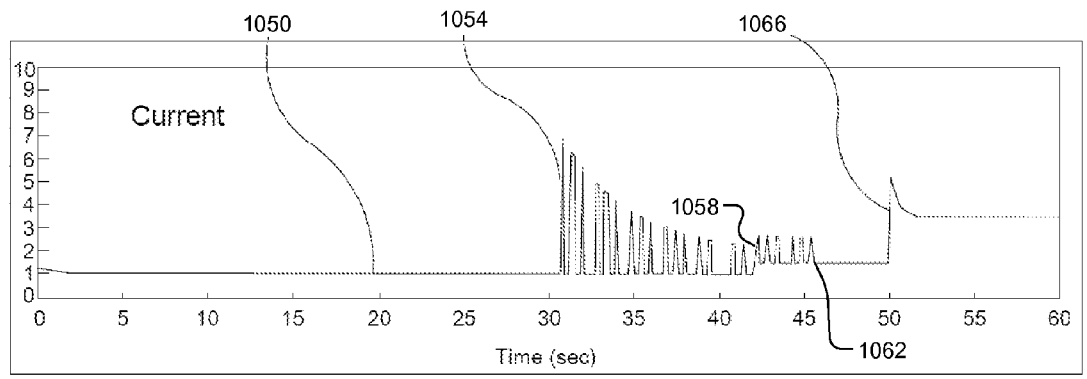
FIGS. 10A-10C are example time domain representations of aggregate current related to the hot surface igniter.

Referring now to FIG. 10A, another example current trace begins at 1050. A spike at 1054 indicates operation of a component, such as a hot surface igniter. Transitions at 1058 and 1062 may indicate operation of other energy consuming components or operating changes of the hot surface igniter. A spike 1066 may indicate the beginning of operation of another energy consuming component, such as a circulator blower.

Figure 10B:
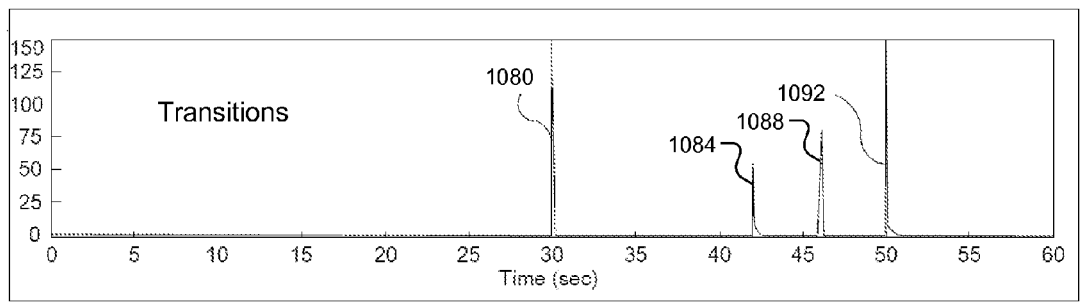

Referring now to FIG. 10B, the transitions shown in FIG. 10A may be isolated to allow the data at these transitions to be carefully inspected, as the data at these times may have greater diagnostic value. In order to identify transitions, such as 1054, 1058, 1062, and 1066, mathematical algorithms, which may include averages and derivatives, are applied to the current trace of FIG. 10A to produce corresponding spikes 1080, 1084, 1088, and 1092.

Figure 10C:
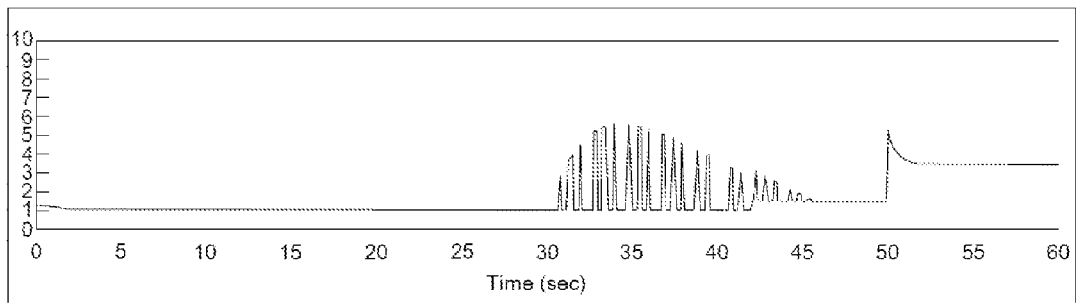

Referring now to FIG. 10C, another example current trace is shown. While the current trace of FIG. 10C is visually different from that of FIG. 10A, it may be difficult to quantify this difference. It may be especially difficult to develop a universal pattern for distinguishing the current trace of FIG. 10C from the current trace of FIG. 10A. The current trace of FIG. 10C may represent a change in operation, such as degradation of the hot surface igniter. In order to more clearly distinguish FIG. 10C from FIG. 10A, frequency domain analysis may be used.

Figure 11A:
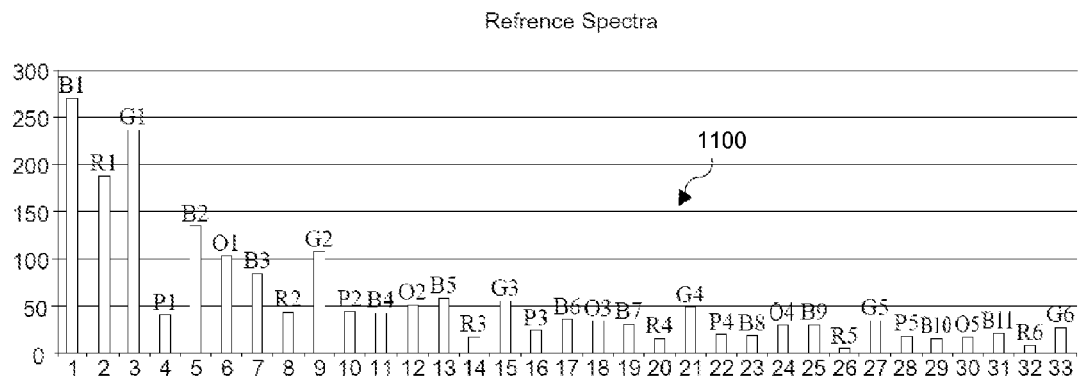
FIGS. 11A-11B show example frequency content corresponding to FIGS. 10A and 10C, respectively.

Referring now to FIG. 11A, a bar chart 1100 depicts relative frequency content in each of 33 frequency bins, which is obtained by a frequency domain analysis of FIG. 10A. For example only, an FFT was performed over a specified period of the time domain trace of FIG. 10A. For example only, the specified time may be keyed to one of the transitions identified in FIG. 10B.

Figure 11B:
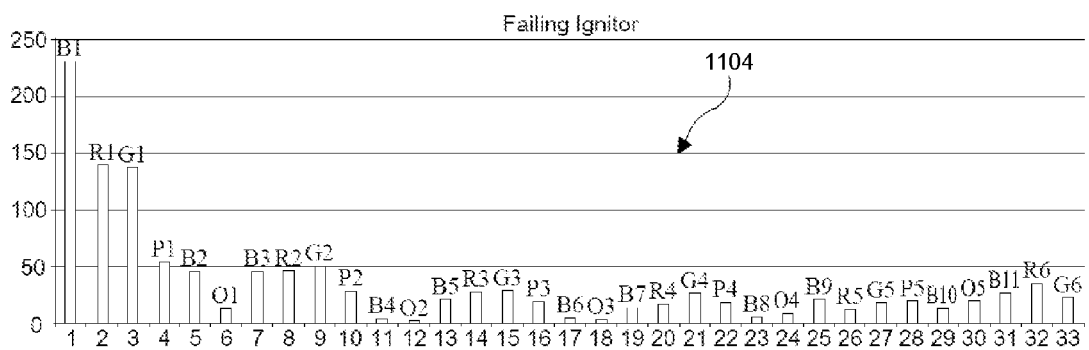
Figure 11C:
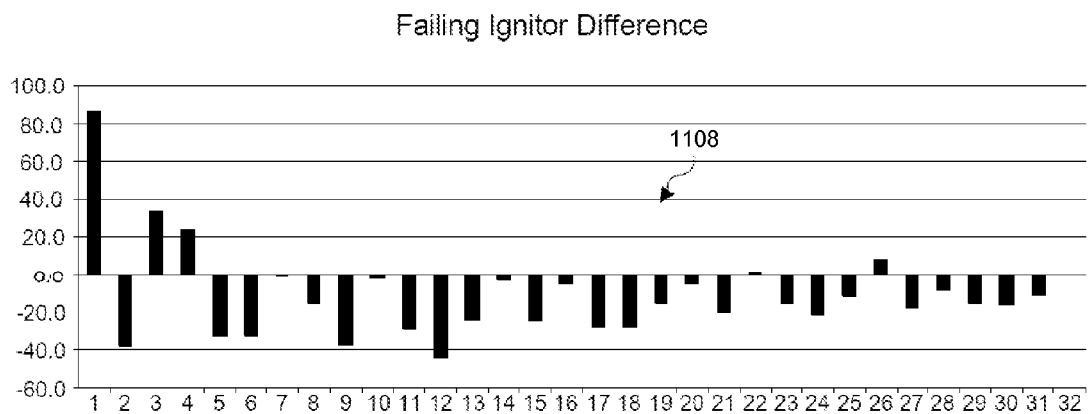
FIG. 11C shows a frequency domain comparison of FIGS. 11A and 11B.

Referring now to FIG. 11B, the bar chart 1104 depicts frequency content corresponding to the time domain trace of FIG. 10C. Referring now to FIG. 11C, a comparison between the frequency domain data of FIGS. 11A and 11B is shown. In various implementations, this difference may be calculated simply by subtracting, bin by bin, the value of FIG. 11B from the value of FIG. 11A. The resulting frequency domain data 1108 may be indicative of a failing igniter. For example only, when certain frequency bins in the difference spectrum 1108 exceed a certain threshold, the monitoring system may determine that the igniter has failed or is failing.

Figure 12A:
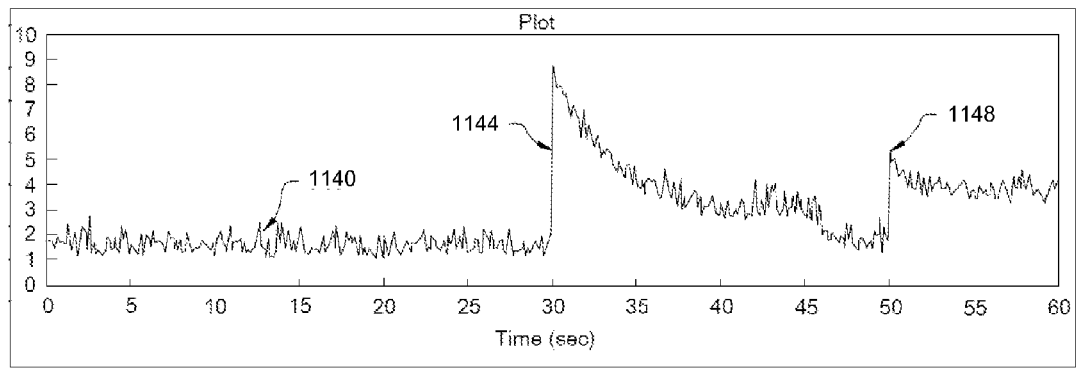
FIGS. 12A-12B are example time domain plots depicting a solenoid-operated gas valve functioning and failing to function, respectively.
Figure 12B:
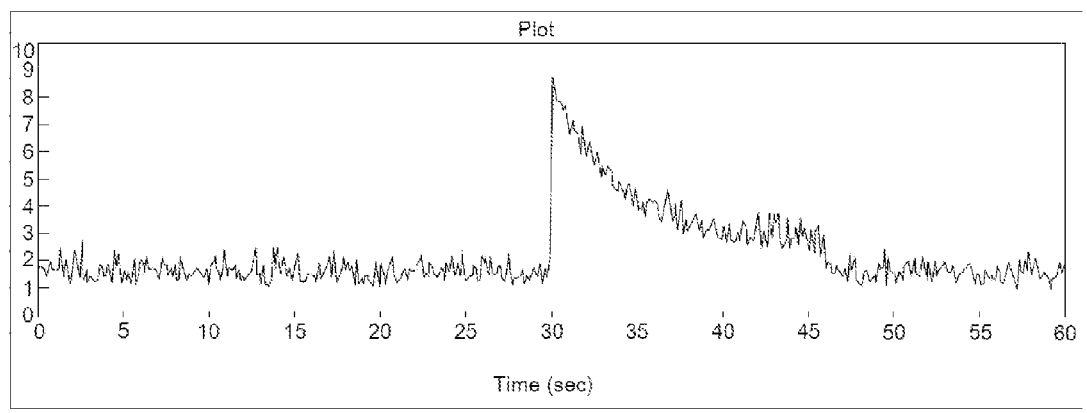
Figure 12C:
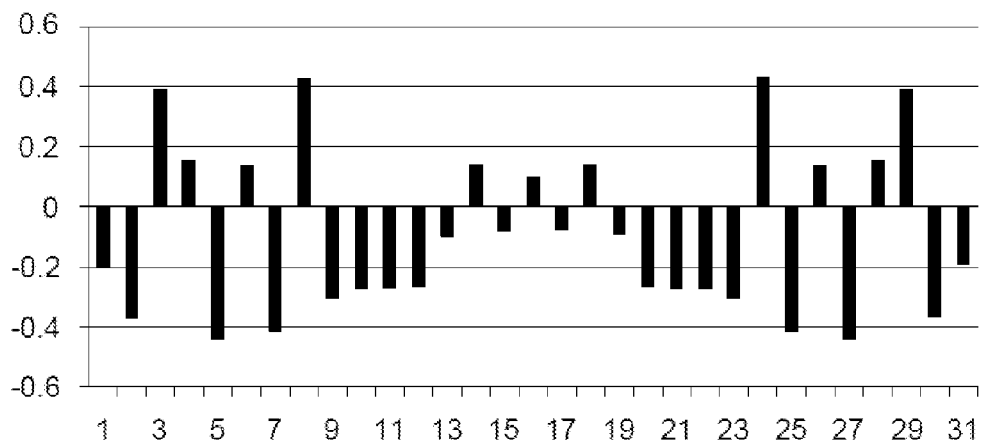
FIG. 12C is a frequency domain comparison of FIGS. 12A and 12B.

Referring now to FIG. 12A, an example current trace has an approximately constant level 1140 until a spike 1144 indicates operation of a hot surface igniter. A second spike 1148 indicates actuation of a solenoid-operated gas valve. Referring now to FIG. 12B, another example current trace shows operation of the hot surface igniter that appears to be missing operation of the solenoid-operated gas valve. Referring now to FIG. 12C, a frequency domain analysis is performed on both FIG. 12A and FIG. 12B, and a difference spectrum between the two frequency domain spectra is shown in FIG. 12C. This frequency domain difference may indicate to the monitoring system that the solenoid-operated gas valve has failed to function.

Figure 13A:
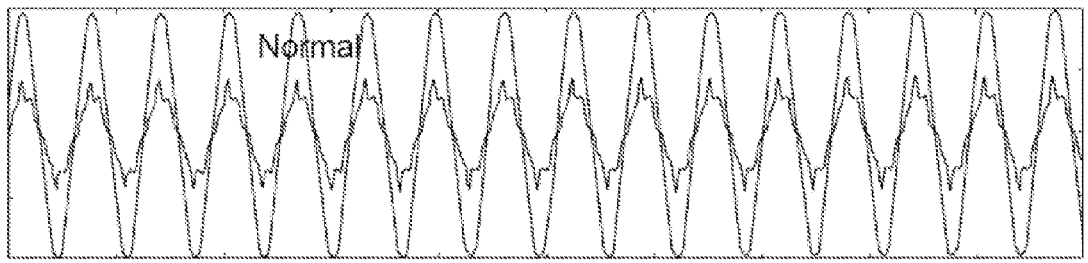
FIGS. 13A-13B are time domain traces of current and voltage of a motor.
Figure 13B:
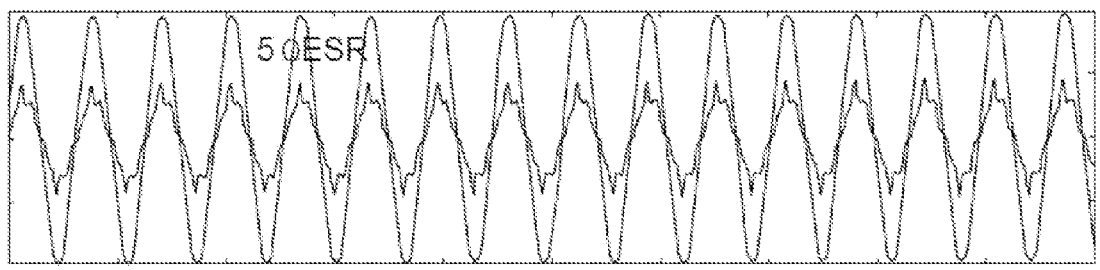
Figure 13C:
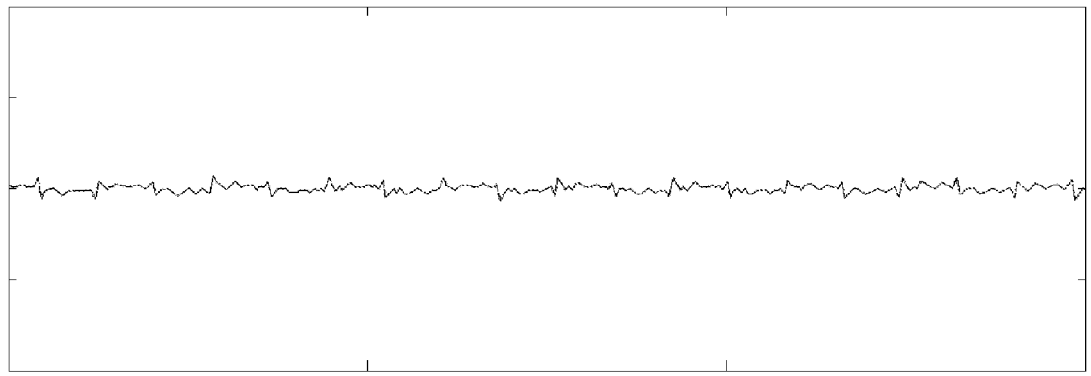
FIG. 13C is a time domain subtraction of FIGS. 13A and 13B.

Referring now to FIG. 13A, voltage and current for a normally operated motor are shown, where the voltage trace appears sinusoidal and the current trace is more jagged. In FIG. 13B, voltage and current traces for a compressor motor with a faulty run capacitor are shown. Visually, it is difficult to determine any difference between the time domain representations in FIGS. 13A and 13B. FIG. 13C shows a time domain subtraction of the current traces of FIGS. 13A and 13B. The difference simply appears to be noise and in the time domain, it may be impossible to distinguish a normally operating motor from one having a faulty run capacitor.

Figure 14A:
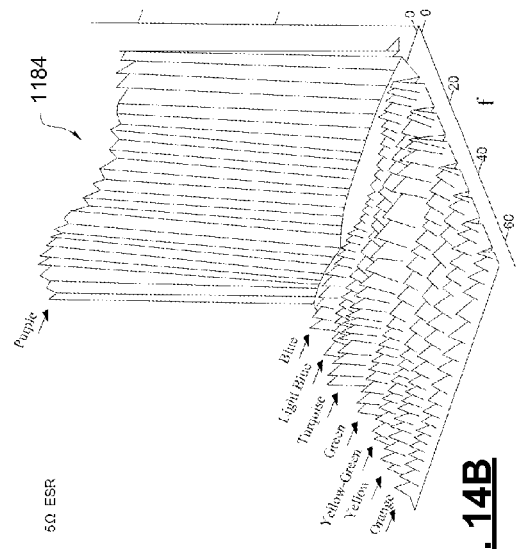
FIGS. 14A-14B are frequency domain analyses of FIGS. 13A and 13B, respectively.
Figure 14B:
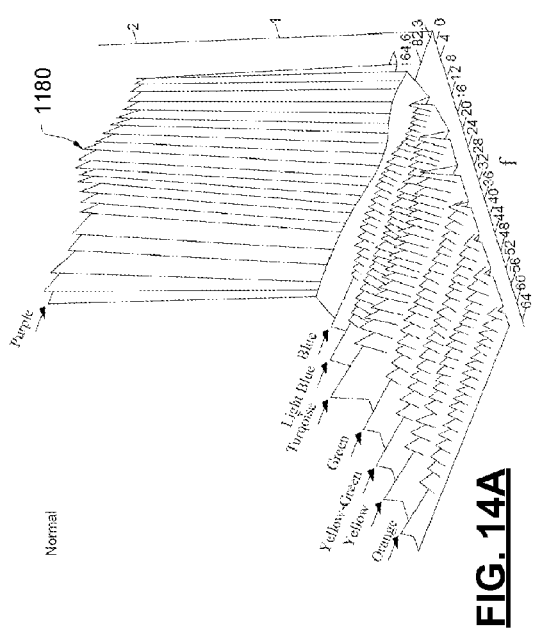
Figure 14C:
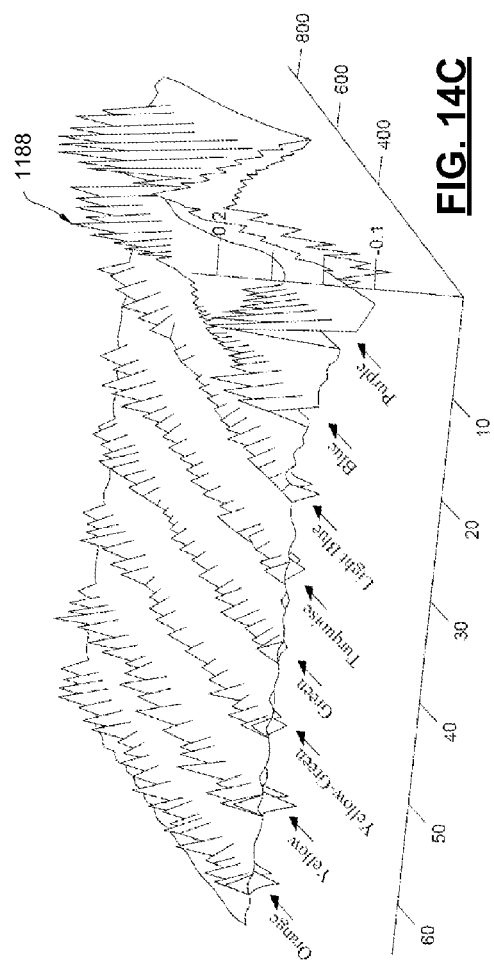
FIG. 14C is a frequency domain comparison of FIGS. 14A and 14B.

Referring now to FIG. 14A, frequency domain content of the current of the normally operating motor of FIG. 13A is shown. Frequency bins are shown along one axis, while relative size of the frequency bin is shown on the vertical axis. Each slice 1180 may correspond to a different time window. In other words, FIG. 14A displays a series of FFTs performed over a number of time windows, which may be consecutive time windows. Meanwhile, FIG. 14B displays frequency domain content 1184 corresponding to the current of the faulty motor of FIG. 13B. In FIG. 14C, a difference 1188 between the frequency domain data of FIGS. 14A and 14B is shown. When a difference at a certain frequency exceeds a threshold, faulty operation of the motor can be diagnosed. Based on which frequency bins exhibit the greatest difference, the source of the problem may be suggested. For example only, the difference spectrum 1188 may indicate a faulty run capacitor.

Figure 15A:
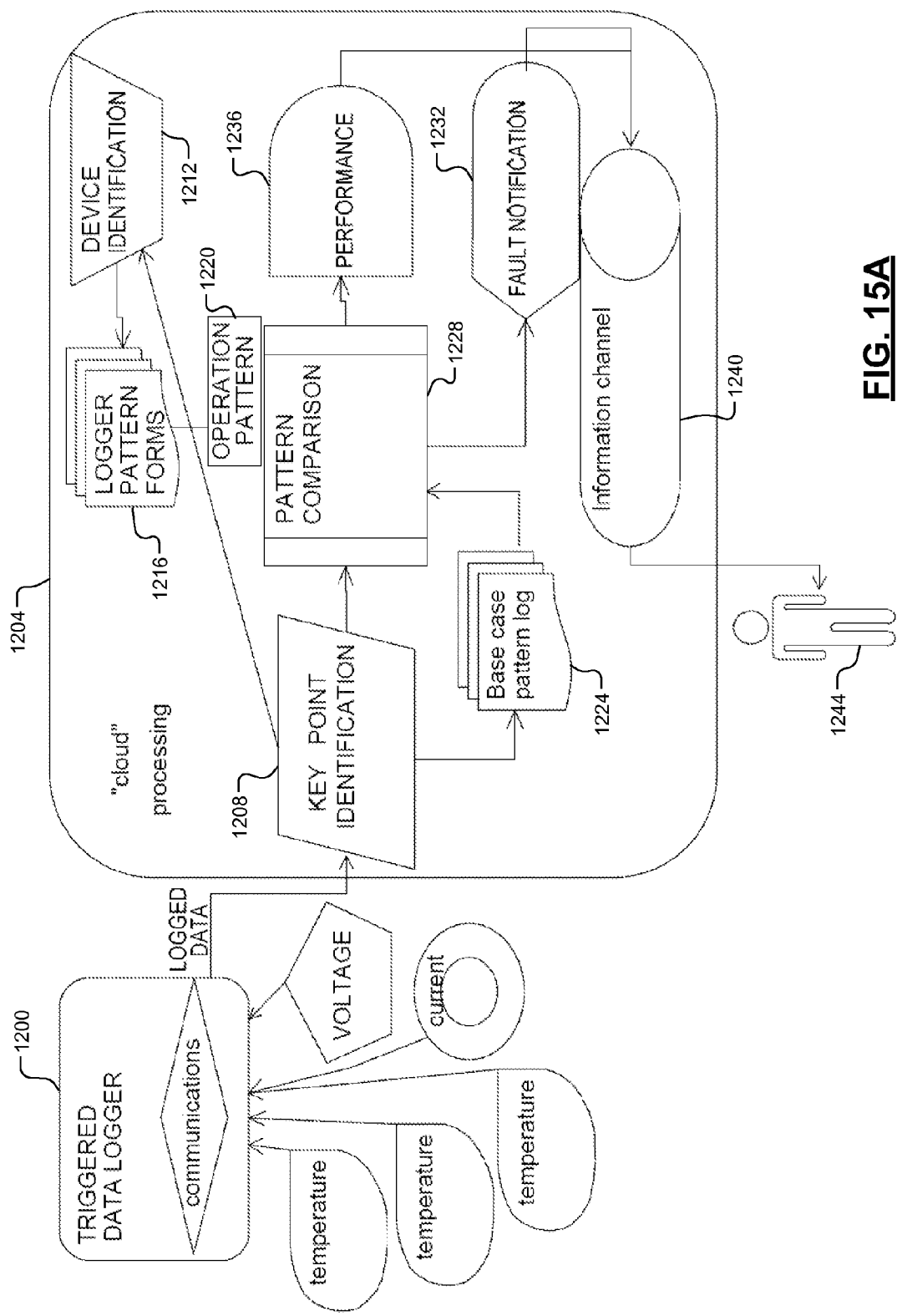
FIGS. 15A-15G depict example implementation of cloud processing of captured data.

Referring now FIG. 15A, a data flow diagram represents the air handler monitor module and compressor monitor module as being a triggered data logger 1200, which supplies logged data to a cloud processor 1204. Although referred to as a cloud processor in this application, one or more of the processes described as being performed by the cloud processor 1204 may instead be performed locally by the triggered data logger 1200. For example, this processing may be performed by the triggered data logger 1200 to reduce the amount of data that needs to be uploaded to cloud processor 1204.

The cloud processor 1204 receives the logged data and identifies key points in the data 1208, such as transitions between operating modes. These transitions may be identified by current spikes, such as are depicted in FIG. 10B. Device identification 1212 specifies characteristics of the HVAC system being monitored, which can be used to interpret the received data. Logger pattern forms 1216 may establish equipment specific operating characteristics from which an operation pattern 1220 is selected.

A base case pattern log 1224 may learn normal operation of the device in question and thereby establish a baseline. Pattern comparison 1228 receives data corresponding to key points and compares that data with base cases and selected operation patterns. Deviations by more than a predetermined amount may result in fault notification 1232. Further, anomalies that may be not be sufficient to trigger a fault may impact performance 1236. Performance 1236 may monitor even properly running equipment to determine if performance has degraded through normal wear and tear or through issues with the home itself, such as low insulation value. An information channel 1240 provides information about identified faults and performance, such as alerts of decreased performance, to a contractor or homeowner, represented at 1244.

Figure 15B:
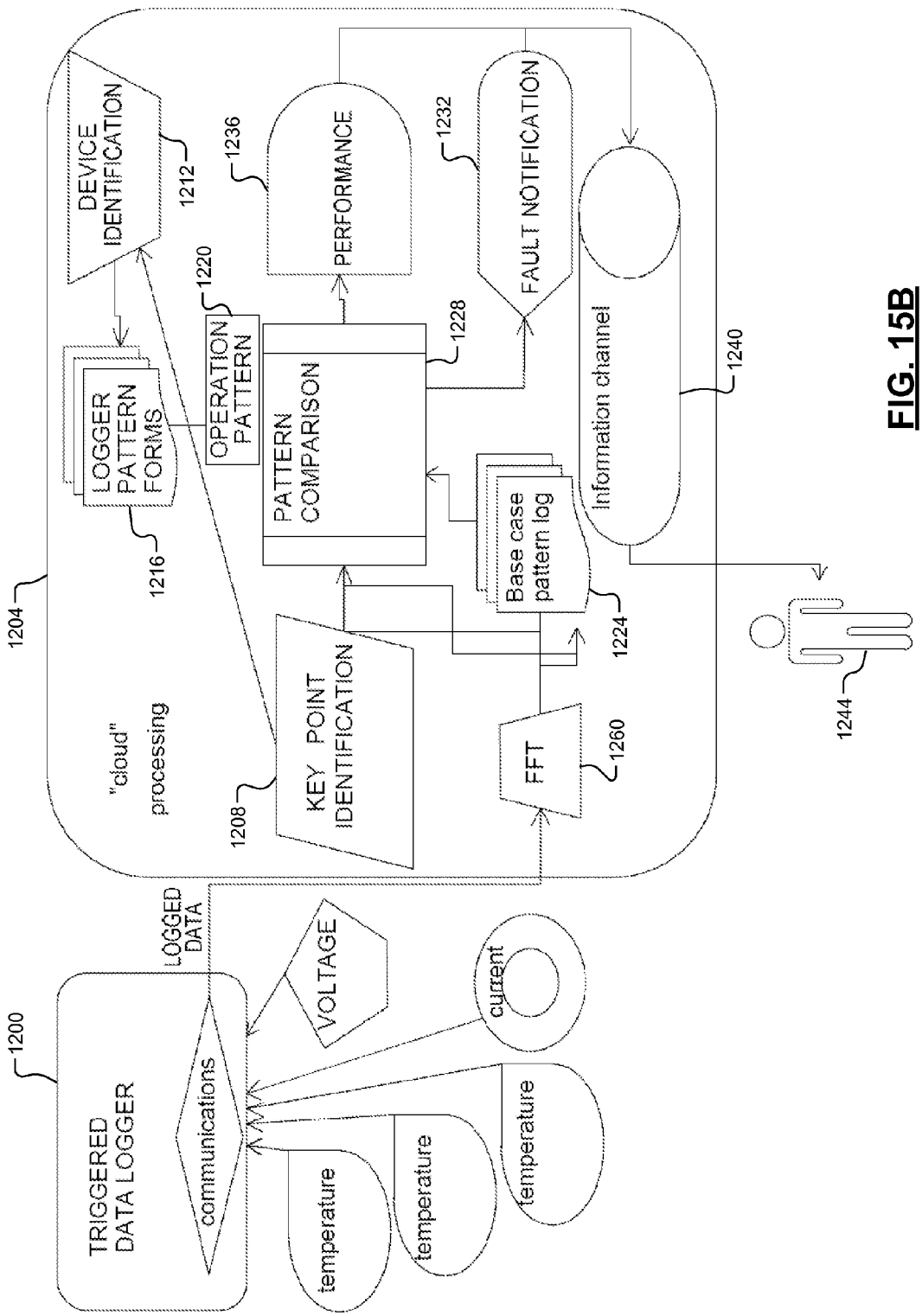

Referring now to FIG. 15B, an FFT 1260 is used to analyze HVAC operation in the frequency domain. This may allow for identification of problems that are difficult or impossible to reliably identify in the time domain.

Figure 15C:
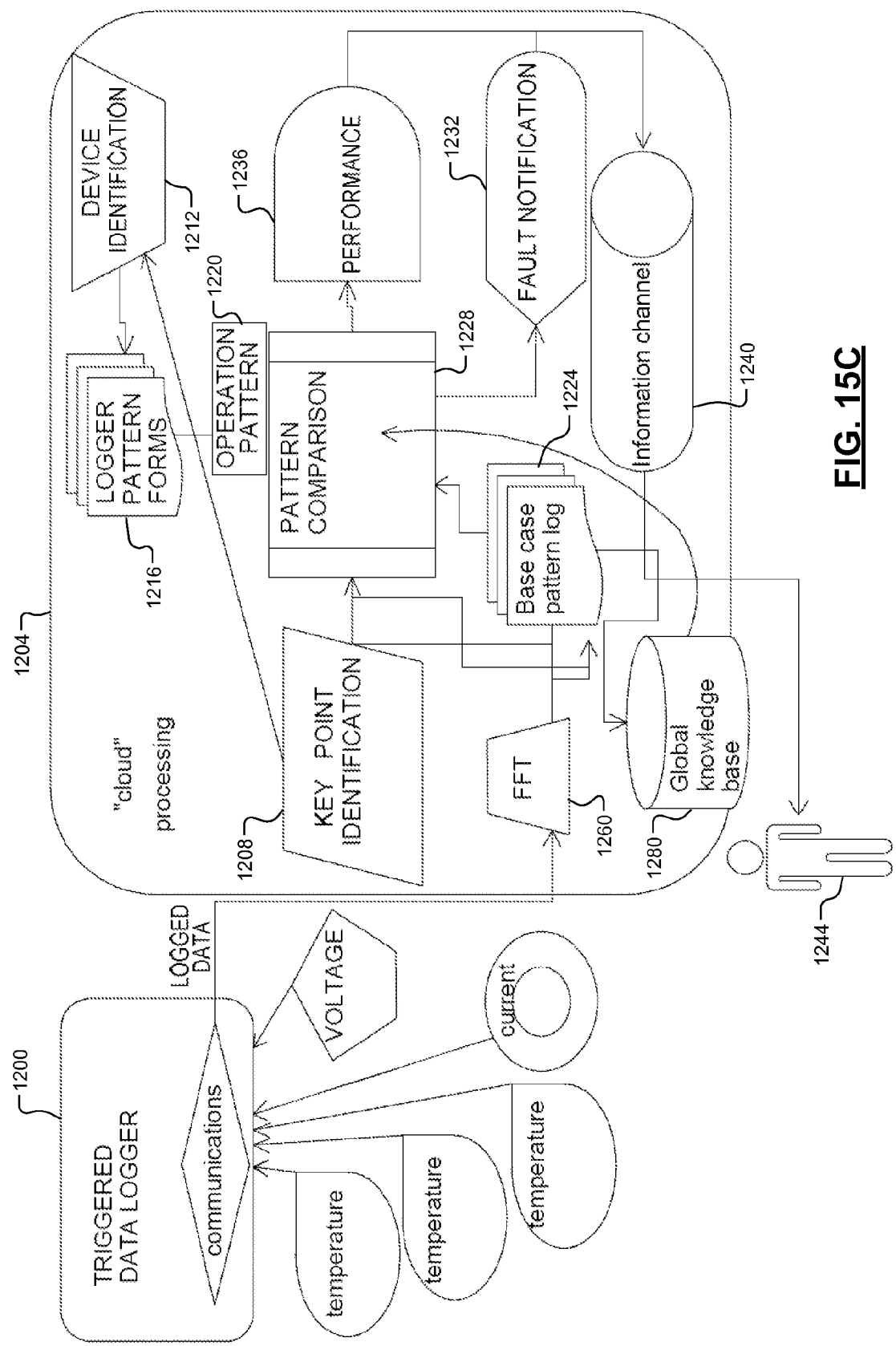

Referring now to FIG. 15C, a global knowledge base 1280 may be populated by the monitoring company and/or installation contractors to identify proper operation of installed systems. The global knowledge base 1280 may also be updated with base cases determined by ongoing monitoring. The global knowledge base 1280 may therefore be informed by all of the monitored installation systems of a given HVAC system configuration.

Figure 15D:
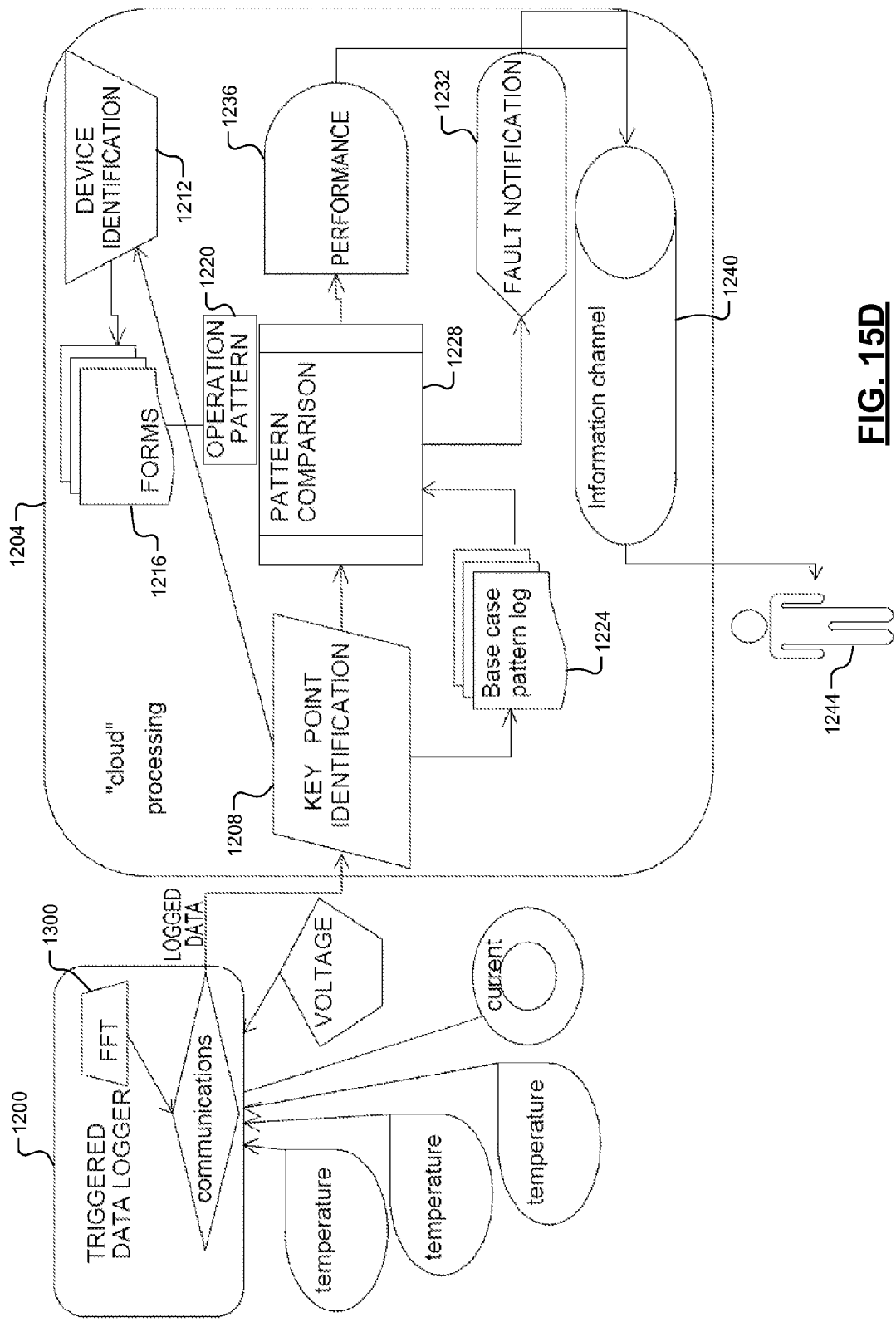

Referring now to FIG. 15D, FFT processing 1300 is shown being performed locally at the triggered data logger. The FFT 1300 may be performed locally to reduce the amount of data uploaded to the cloud processor 1204. For example only, granular time domain current data over a time window may be converted to frequency domain data by the FFT 1300. The triggered data logger 1200 may then upload only an average value of the current over that time window to the cloud processor 1204, not all of the granular current domain data. In addition, performing the FFT 1300 locally may allow for some local detection and diagnosis of faults. This may allow the triggered data logger 1200 to better prioritize uploaded data, such as by immediately uploading data that appears to be related to an impending or present failure.

Figure 15E:
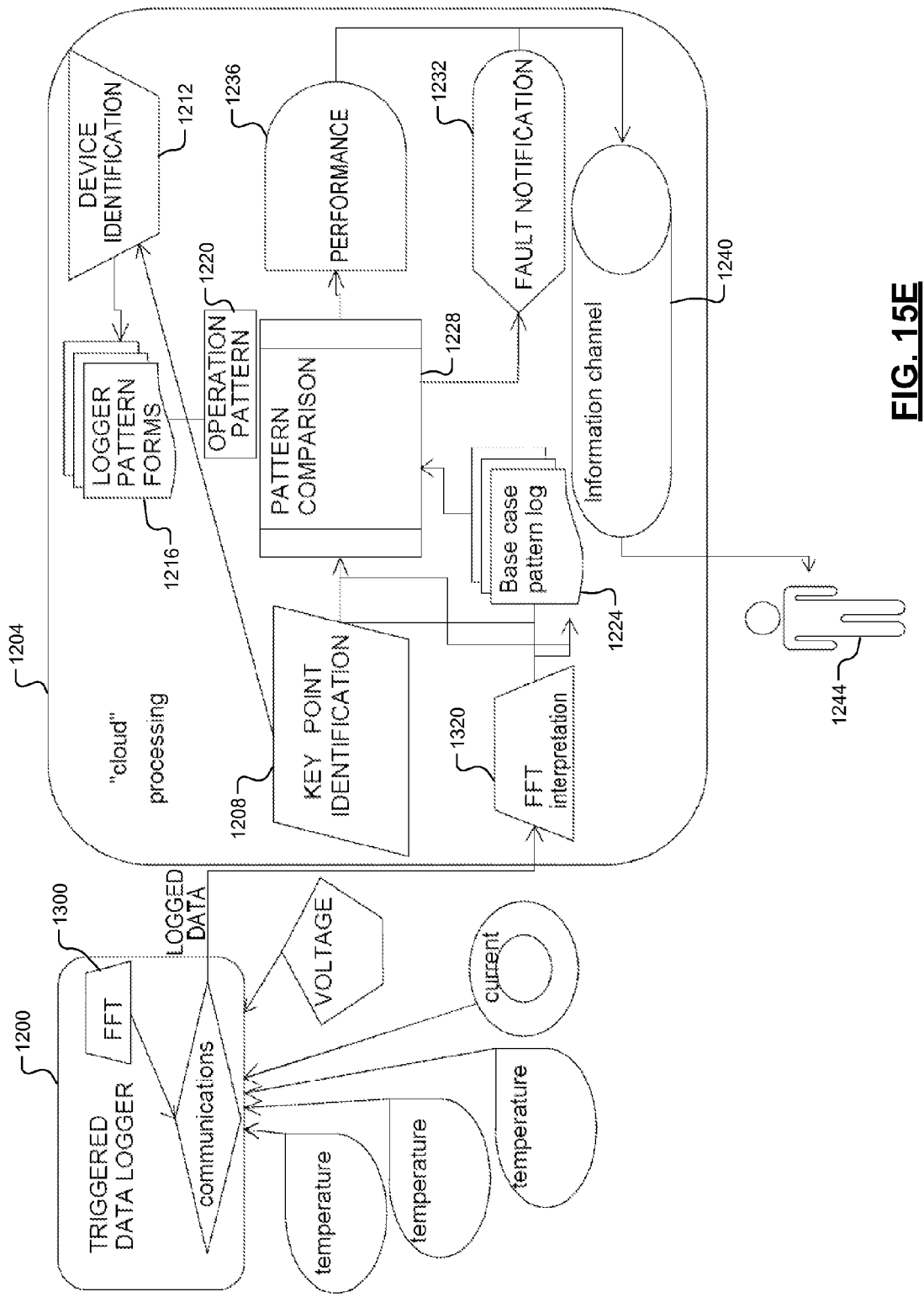

Referring now to FIG. 15E, FFT interpretation 1320 is performed in the cloud processor 1204 before being operated on by key point identification 1208.

Figure 15F:
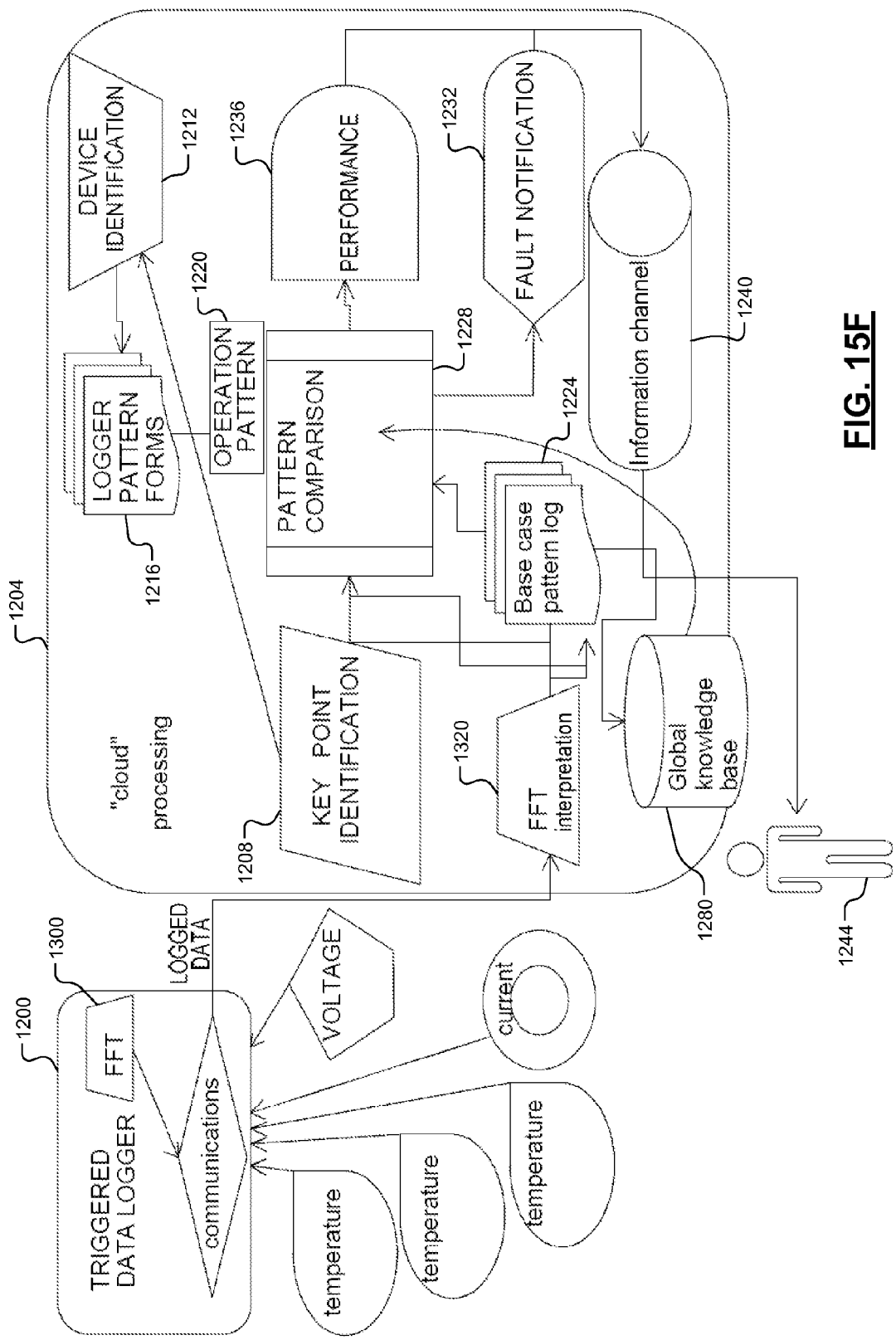

Referring now to FIG. 15F, the global knowledge base 1280 of FIG. 15C is combined with the FFT interpretation 1320 of FIG. 15E in the cloud processor 1204.

Figure 15G:
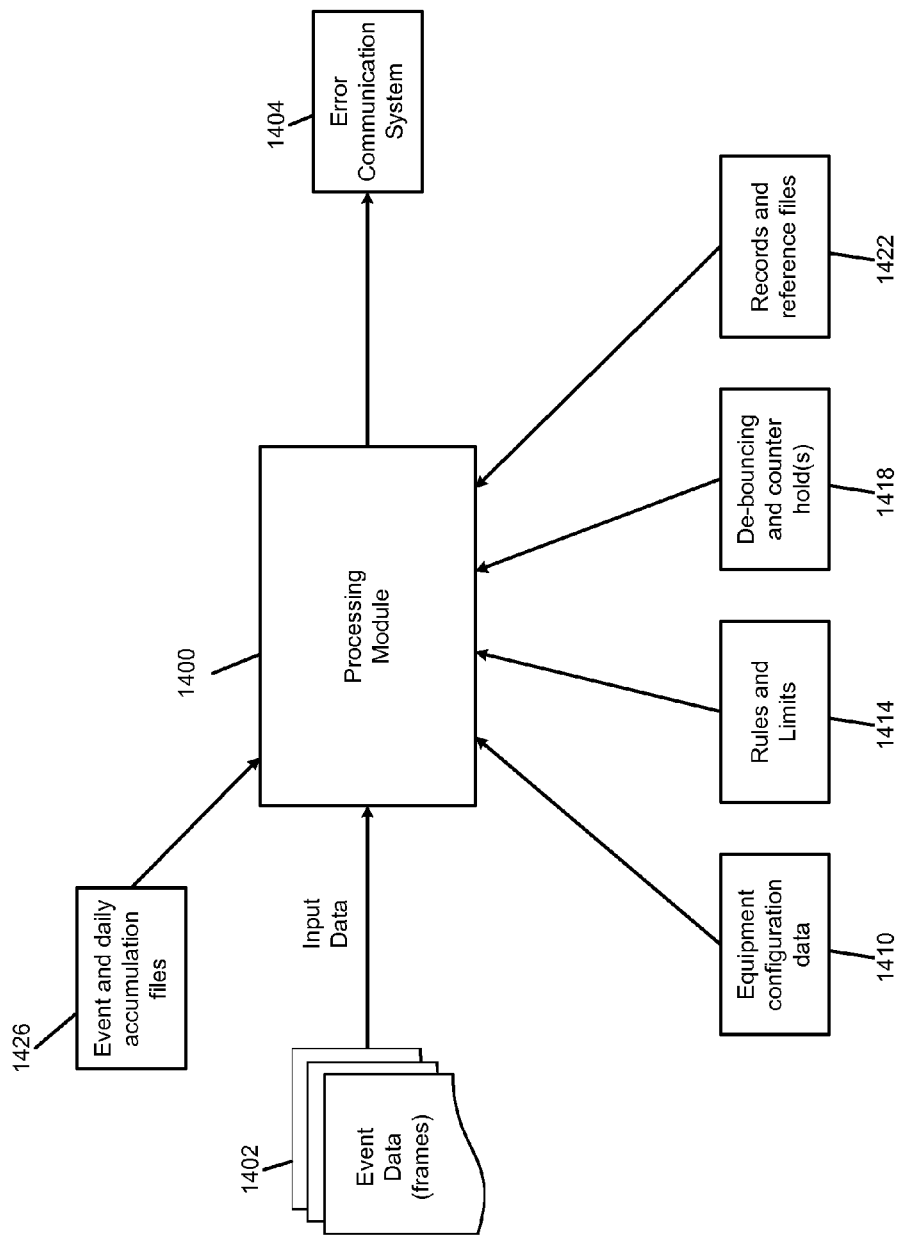

Referring now to FIG. 15G, another example representation of cloud processing is shown, where a processing module 1400 receives event data in the form of frames. The processing module 1400 uses various input data for detection and prediction of faults. Identified faults are passed to an error communication system 1404. The event data 1402 may be stored upon receipt from the air handler monitor module and the compressor monitor module.

The processing module 1400 may then perform each prediction or detection task with relevant data from the event data 1402. In various implementations, certain processing operations are common to more than one detection or prediction operation. This data may therefore be cached and reused. The processing module 1400 receives information about equipment configuration 1410, such as control signal mapping.

Rules and limits 1414 determine whether sensor values are out of bounds, which may indicate sensor failures. In addition, the rules and limits 1414 may indicate that sensor values cannot be trusted when parameters such as current and voltage are outside of predetermined limits. For example only, if the AC voltage sags, such as during a brownout, data taken during that time may be discarded as unreliable.

De-bouncing and counter holds 1418 may store counts of anomaly detection. For example only, detection of a single solenoid-operated gas valve malfunction may increment a counter, but not trigger a fault. Only if multiple solenoid-operated gas valve failures are detected is an error signaled. This can eliminate false positives. For example only, a single failure of energy consuming component may cause a corresponding counter to be incremented by one, while detection of proper operation may lead to the corresponding counter being decremented by one. In this way, if faulty operation is prevalent, the counter will eventually increase to a point where an error is signaled. Records and reference files 1422 may store frequency and time domain data establishing baselines for detection and prediction.

A basic failure-to-function fault may be determined by comparing control line state against operational state based on current and/or power. Basic function may be verified by temperature, and improper operation may contribute to a counter being incremented. This analysis may rely on return air temperature, supply air temperature, liquid line in temperature, voltage, current, real power, control line status, compressor discharge temperature, liquid line out temperature, and ambient temperature.

Sensor error faults may be detected by checking sensor values for anomalous operation, such as may occur for open-circuit or short-circuit faults. The values for those determinations may be found in the rules and limits 1414. This analysis may rely on return air temperature, supply air temperature, liquid line in temperature (which may correspond to a temperature of the refrigerant line in the air handler, before or after the expansion valve), control line status, compressor discharge temperature, liquid line out temperature, and ambient temperature.

When the HVAC system is off, sensor error faults may also be diagnosed. For example, based on control lines indicating that the HVAC system has been off for an hour, processing module 1400 may check whether the compressor discharge temperature, liquid line out temperature, and ambient temperature are approximately equal. In addition, the processing module 1400 may also check that the return air temperature, the supply air temperature, and the liquid line in temperature are approximately equal.

The processing module 1400 may compare temperature readings and voltages against predetermined limits to determine voltage faults and temperature faults. These faults may cause the processing module 1400 to ignore various faults that could appear present when voltages or temperatures are outside of the predetermined limits.

The processing module 1400 may check the status of discrete sensors to determine whether specifically-detected fault conditions are present. For example only, the status of condensate, float switch, and floor sensor water sensors are checked. The water sensors may be cross-checked against operating states of the HVAC system. For example only, if the air conditioning system is not running, it would not be expected that the condensate tray would be filling with water. This may instead indicate that one of the water sensors is malfunctioning. Such a determination could initiate a service call to fix the sensor so that it can properly identify when an actual water problem is present.

The processing module 1400 may determine whether the proper sequence of furnace initiation is occurring. This may rely on event and daily accumulation files 1426. The processing module 1400 may perform state sequence decoding, such as by looking at transitions as shown in FIG. 10B and expected times during which those transitions are expected. Detected furnace sequences are compared against a reference case and errors are generated based on exceptions. The furnace sequence may be verified with temperature readings, such as observing whether, while the burner is on, the supply air temperature is increasing with respect to the return air temperature. The processing module 1400 may also use FFT processing to determine that the sparker or igniter operation and solenoid-operated gas valve operation are adequate.

The processing module 1400 may determine whether a flame probe or flame sensor is accurately detecting flame. State sequence decoding may be followed by determining whether a series of furnace initiations are performed. If so, this may indicate that the flame probe is not detecting flame and the burner is therefore being shut off. The frequency of retries may increase over time when the flame probe is not operating correctly.

The processing module 1400 may evaluate heat pump performance by comparing thermal performance against power consumption and unit history. This may rely on equipment configuration data 1410, including compressor maps when available.

The processing module 1400 may determine refrigerant level of the air conditioning system. For example, the processing module 1400 may analyze the frequency content of the compressor current and extract frequencies at the third, fifth, and seventh harmonics of the power line frequencies. This data may be compared, based on ambient temperature, to historical data from when the air conditioning system was known to be fully charged. Generally, as charge is lost, the surge frequency may decrease. Additional data may be used for reinforcement of a low refrigerant level determination, such as supply air temperature, return air temperature, liquid line in temperature, voltage, real power, control line status, compressor discharge temperature, and liquid line out temperature.

The processing module 1400 may alternatively determine a low refrigerant charge by monitoring deactivation of the compressor motor by a protector switch, may indicate a low refrigerant charge condition. To prevent false positives, the processing module 1400 may ignore compressor motor deactivation that happens sooner than a predetermined delay after the compressor motor is started, as this may instead indicate another problem, such as a stuck rotor.

The processing module 1400 may determine the performance of a capacitor in the air handler unit, such as a run capacitor for the circulator blower. Based on return air temperature, supply air temperature, voltage, current, real power, control line status, and FFT data, the processing module 1400 determines the time and magnitude of the start current and checks the start current curve against a reference. In addition, steady state current may be compared over time to see whether an increase results in a corresponding increase in the difference between the return air temperature and the supply air temperature.

Similarly, the processing module 1400 determines whether the capacitor in the compressor/condenser unit is functioning properly. Based on compressor discharge temperature, liquid line out temperature, ambient temperature, voltage, current, real power, control line status, and FFT current data, control determines a time and magnitude of start current. This start current is checked against a reference in the time and/or frequency domains. The processing module 1400 may compensate for changes in ambient temperature and in liquid line in temperature. The processing module 1400 may also verify that increases in steady state current result in a corresponding increase in the difference between the compressor discharge temperature and the liquid line in temperature.

The processing module may calculate and accumulate energy consumption data over time. The processing module may also store temperatures on a periodic basis and at the end of heat and cool cycles. In addition, the processing module 1400 may record lengths of run times. An accumulation of run times may be used in determining the age of wear items, which may benefit from servicing, such as oiling, or preemptive replacing.

The processing module 1400 may also grade the homeowner's equipment. The processing module 1400 compares heat flux generated by the HVAC equipment against energy consumption. The heat flux may be indicated by return air temperature and/or indoor temperature, such as from a thermostat. The processing module 1400 may calculate the envelope of the residence to determine the net flux. The processing module 1400 may compare the equipment's performance, when adjusted for residence envelope, against other similar systems. Significant deviations may cause an error to be indicated.

The processing module 1400 uses a change in current or power and the type of circulator blower motor to determine the change in load. This change in load can be used to determine whether the filter is dirty. The processing module 1400 may also use power factor, which may be calculated based on the difference in phase between voltage and current. Temperatures may be used to verify reduced flow and eliminate other potential reasons for observed current or power changes in the circulator blower motor. The processing module 1400 may also determine when an evaporator coil is closed. The processing module 1400 uses a combination of loading and thermal data to identify the signature of a coil that is freezing or frozen. This can be performed even when there is no direct temperature measurement of the coil itself.

FFT analysis may show altered compressor load from high liquid fraction. Often, a frozen coil is caused by a fan failure, but the fan failure itself may be detected separately. The processing module 1400 may use return air temperature, supply air temperature, liquid line in temperature, voltage, current, real power, and FFT data from both the air handler unit and the compressor condenser unit. In addition, the processing module 1400 may monitor control line status, switch statuses, compressor discharge temperature, liquid line out temperature, and ambient temperature. When a change in loading occurs that might be indicative of a clogged filter, but the change happened suddenly, a different cause may be to blame.

The processing module 1400 identifies a condenser blockage by examining the approach temperature, which is the difference between the liquid line out temperature and the ambient temperature. When the refrigerant has not been sufficiently cooled from the condenser discharge temperature (the input to the condenser) to the liquid line out temperature (output of the condenser), adjusted based on ambient temperature, the condenser may be blocked. Other data can be used to exclude other possible causes of this problem. The other data may include supply air temperature, return air temperature, voltage, current, real power, FFT data, and control line status both of the air handler unit and the compressor condenser unit.

The processing module 1400 determines whether the installed equipment is oversized for the residence. Based on event and daily accumulation files, the processing module evaluates temperature slopes at the end of the heating and/or cooling run. Using run time, duty cycle, temperature slopes, ambient temperature, and equipment heat flux versus home flux, appropriateness of equipment sizing can be determined. When equipment is oversized, there are comfort implications. For example, in air conditioning, short runs do not circulate air sufficiently, so moisture is not pulled out of the air. Further, the air conditioning system may never reach peak operating efficiency during a short cycle.

The processing module 1400 evaluates igniter positive temperature coefficient based on voltage, current, real power, control line status, and FFT data from the air handler unit. The processing module compares current level and slope during warm-up to look for increased resistance. Additionally, the processing module may use FFT data on warm-up to detect changes in the curve shape and internal arcing.

The processing module also evaluates igniter negative temperature coefficient based on voltage, current, real power, control line status, and FFT data from the air handler unit. The processing module 1400 compares current level and slope during warm-up to look for increased resistance. The processing module 1400 checks initial warm-up and trough currents. In addition, the processing module 1400 may use FFT data corresponding to warm-up to detect changes in the curve shape and internal arcing.

The processing module 1400 can also evaluate the positive temperature coefficient of a nitride igniter based on voltage, current, real power, control line status, and FFT data from the air handler unit. The processing module 1400 compares voltage level and current slope during warm-up to look for increased resistance. In addition, the processing module 1400 uses FFT data corresponding to warm-up to detect changes in the curve shape, drive voltage pattern, and internal arcing. Changes in drive voltage may indicate igniter aging, so those adjustments should be distinguished from changes to compensate for gas content and other furnace components.

Referring now to FIG. 16A, a table depicts example faults and features, with respect to the air handler unit, that can be detected and/or predicted. Each row corresponds to a fault or feature that may be detected or predicted, and an asterisk is located in each column used to make the detection or prediction. For both detection and prediction, some data may be used as the primary data for making the determination, while other data is used for compensation. Temperatures and voltages are used to perform compensation for those rows having an asterisk in the corresponding column.

The primary columns include timing of when events are detected, time domain current information, temperatures (including residence temperature as measured by the thermostat), pressures (such as refrigerant system pressures and/or air pressures), FFT data, and direct detection. Direct detection may occur when a status or control line directly indicates the fault or feature, such as when a water sensor indicates an overfull condensate tray.

Referring now to FIG. 16B, a table depicts example faults and features, with respect to the compressor/condenser unit, that can be detected and/or predicted. In FIG. 16B, outside ambient temperature and voltages may be used to compensate primary data.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. For purposes of clarity, the same reference numbers will be used in the drawings to identify similar elements. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor. For example only, the processor may be a 16-bit PIC24 MCU microprocessor manufactured by Michrochip Technology, Inc.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

What is claimed is:

1. A monitoring system for a heating, ventilation, and air conditioning (HVAC) system of a residence, the monitoring system comprising:
a monitoring device installed at the residence, wherein the monitoring device (i) measures an aggregate current supplied to a plurality of components of the HVAC system; (ii) samples the measured aggregate current over a first time period; (iii) performs a frequency domain analysis on the samples over the first time period; and (iv) transmits current data, wherein the transmitted current data includes a current value and frequency domain data, wherein the current value is based on the samples, and wherein the frequency domain data is based on the frequency domain analysis; and
a server, located remotely from the residence, that receives the transmitted current data and, based on the received current value and the received frequency domain data, assesses whether a failure has occurred in a first component of the plurality of components of the HVAC system and assesses whether a failure has occurred in a second component of the plurality of components of the HVAC system,
wherein the server assesses whether the failure has occurred in the first component by comparing the received frequency domain data to baseline frequency domain data, and
wherein the server generates an alert in response to the comparison indicating that the failure has occurred in the first component.

2. The monitoring system of claim 1 wherein the server identifies transition points in the current data and analyzes the received frequency domain data around the identified transition points.

3. The monitoring system of claim 1 wherein the server adapts the baseline frequency domain data based on normal operation of the HVAC system.

4. The monitoring system of claim 1 wherein the monitoring device transmits the current value to the server without transmitting the samples to the server.

5. The monitoring system of claim 4 wherein the current value is one of a root mean squared current, an average current, and a peak current.

6. The monitoring system of claim 1 wherein the monitoring device:
measures the measured aggregate current over a series of consecutive time periods, wherein the series of consecutive time periods includes the first time period; and
transmits a frame of information to the server for each of the time periods, wherein a first frame of information corresponds to the first time period.

7. The monitoring system of claim 6 wherein the first frame does not include the samples.

8. The monitoring system of claim 6 wherein the first frame includes a voltage measurement of power arriving at the HVAC system, a temperature measurement, and a representation of status of HVAC control lines during the first period.

9. The monitoring system of claim 1 wherein the monitoring device records control signals from a thermostat and transmits information based on the control signals to the server.

10. The monitoring system of claim 9 wherein the control signals include at least one of call for heat, call for fan, and call for cool.

11. The monitoring system of claim 1 wherein the monitoring device is located in close proximity to an air handler unit of the HVAC system.

12. The monitoring system of claim 11 further comprising a second monitoring device located in close proximity to a second enclosure of the HVAC system, wherein the second enclosure includes at least one of a compressor and a heat pump heat exchanger.

13. The monitoring system of claim 12 wherein the second monitoring device (i) measures an aggregate current supplied to a plurality of components of the second enclosure and (ii) transmits current data based on the measured aggregate current to the server.

14. The monitoring system of claim 13 wherein the second monitoring device transmits the current data to the server via the monitoring device.

15. The monitoring system of claim 1 wherein the monitoring device includes a switch that selectively interrupts an enabling signal to a compressor of the HVAC system.

16. The monitoring system of claim 15 wherein the monitoring device interrupts the enabling signal in response to at least one of (i) a value from a water sensor, (ii) a locked rotor condition of the compressor, and (iii) a command from the server.

17. The monitoring system of claim 1 wherein the server sends the alert to at least one of a homeowner of the residence and an installation contractor.

18. The monitoring system of claim 1 wherein the server (i) selectively predicts an impending failure of the first component based on the received current data, (ii) selectively predicts an impending failure of the second component based on the received current data, and (iii) generates an impending failure alert in response to prediction of impending failure.

19. The monitoring system of claim 1 wherein the plurality of components of the HVAC system includes at least two components selected from: a flame sensor, a solenoid-operated gas valve, a hot surface igniter, a circulator blower motor, an inducer blower motor, a compressor, a pressure switch, a capacitor, an air filter, a condensing coil, an evaporating coil, and a contactor.

* * * * *